United States Patent
Kobayashi et al.

(10) Patent No.: US 7,665,867 B2
(45) Date of Patent: *Feb. 23, 2010

(54) LIGHT SOURCE UNIT, METHOD OF MANUFACTURING LIGHT SOURCE UNIT, AND PROJECTOR

(75) Inventors: Hiroyuki Kobayashi, Matsumoto (JP); Shohei Fujisawa, Matsumoto (JP); Yuji Takado, Matsumoto (JP); Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 16 days.

This patent is subject to a terminal disclaimer.

(21) Appl. No.: 11/797,188

(22) Filed: May 1, 2007

(65) Prior Publication Data

US 2007/0285630 A1    Dec. 13, 2007

Related U.S. Application Data

(63) Continuation of application No. 10/849,891, filed on May 21, 2004, now Pat. No. 7,329,011.

(30) Foreign Application Priority Data

| May 22, 2003 | (JP) | ............................... 2003-145125 |
| Sep. 12, 2003 | (JP) | ............................... 2003-321447 |

(51) Int. Cl.
  *F21V 7/00*    (2006.01)
  *G03B 21/28*   (2006.01)
(52) U.S. Cl. ........................... 362/304; 313/114; 353/99

(58) Field of Classification Search ................. 362/255, 362/256, 298, 267, 302, 261–264, 294–297, 362/304, 346; 313/28, 46, 113, 114, 489, 313/635; 353/98, 99

See application file for complete search history.

(56) References Cited

U.S. PATENT DOCUMENTS

| 3,752,579 | A | | 8/1973 | Keller et al. |
| 5,479,065 | A | * | 12/1995 | Sugimoto et al. ........... 313/113 |
| 5,803,592 | A | | 9/1998 | Lawson |
| 5,924,792 | A | * | 7/1999 | Cassarly et al. ............. 362/554 |
| 6,635,012 | B2 | * | 10/2003 | Ayame et al. ................ 600/178 |
| 6,734,628 | B2 | | 5/2004 | Seki et al. |

(Continued)

FOREIGN PATENT DOCUMENTS

JP    A 05-087630    4/1993

(Continued)

*Primary Examiner*—Thomas M Sember
(74) *Attorney, Agent, or Firm*—Oliff & Berridge, PLC

(57) ABSTRACT

A light source unit including an arc tube having a light emitting section, sealed sections, an elliptic reflector, and a secondary reflecting mirror to cover the front side of the light emitting section and reflect a luminous flux radiated from the light emitting section toward the elliptic reflector. The center of discharging emission from the arc tube is disposed at a first focal position of the elliptic reflector, and the secondary reflecting mirror is configured as a separate member from the arc tube, so that the outer peripheral portion of the secondary reflecting mirror is accommodated within a circular cone connecting a second focal position of the elliptic reflector and the distal end of the front sealed section of the arc tube when being mounted to the front sealed section of the arc tube.

64 Claims, 30 Drawing Sheets

U.S. PATENT DOCUMENTS

| | | |
|---|---|---|
| 7,145,665 B2 | 12/2006 | Iwadare et al. |
| 2005/0024880 A1 | 2/2005 | Moench et al. |
| 2005/0218769 A1 | 10/2005 | Ritz et al. |

FOREIGN PATENT DOCUMENTS

| | | |
|---|---|---|
| JP | U 05-031102 | 4/1993 |
| JP | A-05-313117 | 11/1993 |
| JP | A-06-289394 | 10/1994 |
| JP | A 08-031382 | 2/1996 |
| JP | A 08-064180 | 3/1996 |
| JP | A-08-069775 | 3/1996 |
| JP | A 08-069777 | 3/1996 |
| JP | 09-120067 * | 5/1997 |
| JP | A-09-120067 | 5/1997 |
| JP | A 11-143378 | 5/1999 |
| JP | A 2000-357405 | 12/2000 |
| JP | A 2001-125197 | 5/2001 |
| JP | A-2002-006396 | 1/2002 |
| JP | A 2003-109404 | 4/2003 |
| JP | A 2003-109405 | 4/2003 |
| WO | WO 02/055925 | 7/2002 |

* cited by examiner (A)

(B)

(A)

(B)

(A)

(B)

(A)

(B)

(A)

(B)

(A)

(B)

(A)

(B)

(C)

(A)

(B)

(C)

(A)

(B)

(C)

US 7,665,867 B2

LIGHT SOURCE UNIT, METHOD OF MANUFACTURING LIGHT SOURCE UNIT, AND PROJECTOR

This is a Division of application Ser. No. 10/849,891 filed May 21, 2004. The disclosure of the prior application is hereby incorporated by reference herein in its entirety.

BACKGROUND OF THE INVENTION

1. Field of Invention

Exemplary aspects of the present invention relate to a light source unit including: an arc tube having a light emitting section in which discharging emission between electrodes is performed and sealed sections provided at both ends of the light emitting section; an elliptic reflector to emit a luminous flux radiated from the arc tube in a certain uniform direction; and a secondary reflecting mirror having a reflecting surface opposed to a reflecting surface of the elliptic reflector, covering the front side of the arc tube in the direction of emission of the luminous flux and reflecting the luminous flux radiated from the arc tube toward the elliptic reflector, and a projector having the light source unit, and a method of manufacturing the light source unit.

2. Description of Related Art

In the related art, a projector to enlarge and project an optical image by modulating a luminous flux emitted from a light source according to image information is used. Such a projector is used for presentations in conferences or the like with a personal computer. Also, in response to a desire to view movies or the like, on a large screen at home, this kind of projector is used for a home theater.

As a light source for this type of projector, an electric discharging arc tube, such as a metal halide lamp, or a high-pressure mercury lamp is used. The electric discharging arc tube includes a spherical light emitting section in which discharging emission is carried out between a pair of electrodes disposed at a distance from each other, and sealed sections provided at both ends of the light emitting section and containing metal foil to apply voltage to the electrodes therein.

As regards the electric discharging arc tube, as described in JP-A-8-69775 (See [0020] and FIG. 2), for example, an electric discharging arc tube formed with a reflecting and thermal insulating film containing silica/alumina deposited thereon on the front portion of the light-emitting section on the luminous flux outgoing side is proposed.

According to this type of electric discharging arc tube, since the luminous flux radiated from the light-emitting section is converted into heat at the reflecting and thermal insulating film, which contributes to an increase in temperature in the light-emitting section, a vapor pressure of an additive in the arc tube, such as halogen, can be stabilized, whereby unevenness of color or unevenness of illumination intensity of the projected image of the projector caused by the electric discharging arc tube can be reduced or prevented.

SUMMARY OF THE INVENTION

However, since the reflecting and protecting film of the electric discharging arc tube in the related art is formed of a mixture of white alumina and silica coated thereon, there are problems in that the reflecting efficiency of the reflecting and protecting film is low and hence the luminous efficiency of light emitted from the light emitting section is low, so that the illumination intensity of the light source unit is lowered.

Since the reflecting and protecting film is formed by deposition, there is also a problem in that the reflecting surface of the film depends on the external shape of the spherical light emitting section of the arc tube. Hence the optimal reflecting surface for using light from a light source cannot necessarily be formed.

An exemplary aspect of the present invention provides a light source unit which can significantly enhance the luminous efficiency of light from the light source using a secondary reflecting mirror having a reflecting surface disposed so as to oppose to a reflecting surface of an elliptic reflector, a projector, and a method of manufacturing the light source unit.

The light source unit of an exemplary aspect of the present invention includes: an arc tube having a light emitting section in which discharging emission is performed between electrodes and sealed sections provided at both ends of the light emitting section; an elliptic reflector to emit a luminous flux radiated from the arc tube in a certain uniform direction, and a secondary reflecting mirror having a reflecting surface disposed so as to oppose a reflecting surface of the elliptic reflector, covering the front side of the arc tube, and reflecting the luminous flux radiated from the arc tube toward the elliptic reflector. The sealed sections are provided on the front side and the rear side of the light emitting section. The arc tube includes a center of electric discharging light emission disposed at a first focal position of the elliptic reflector. The secondary reflecting mirror is mounted on the front sealed section of the arc tube as a separate member from the arc tube. The outer peripheral portion of the secondary reflecting mirror is accommodated within a circular cone shown by a line connecting a second focal position of the elliptic reflector and the distal end of the front sealed section of the arc tube.

According to the above-described configuration of an exemplary aspect of the present invention, since the secondary reflecting mirror is a separate member, a reflecting film does not depend on the external shape of the light emitting section, as in the case of depositing the reflecting film on the light emitting section of the arc tube. Therefore, since the reflecting surface can be formed into a shape which realizes an effective use of light reflected by the secondary reflecting mirror in the elliptic reflector and, in addition, the positional adjustment can be performed among the arc tube, the secondary reflecting mirror, and elliptic reflector, the luminous efficiency of light from the light source can be significantly enhanced in the light source unit using the secondary reflecting mirror.

Also, since the outer peripheral portion of the secondary reflecting mirror is accommodated within the circular cone shown by the lines connecting between the second focal position of the elliptic reflector and the distal end of the front sealed section of the arc tube, light reflected by the elliptic reflector is not intercepted by the outer peripheral portion of the secondary reflecting mirror and the front sealed section. Hence the luminous efficiency of light from the light source can further be enhanced.

In an exemplary aspect of the present invention, the secondary reflecting mirror may cover the light emitting section so that an angle θ becomes 105° or below, θ represents the maximum angle formed between the rear portion of the center axis of the luminous flux emitted from the elliptic reflector and the luminous flux emitted from the arc tube and directly entering the elliptic reflector.

According to the above-described configuration of an exemplary aspect of the present invention, since the secondary reflecting mirror covers the light emitting section so that the maximum angle θ formed between the rear portion of the center axis of the luminous flux emitted from the elliptic reflector in the direction of emission of the luminous flux and the luminous flux emitted from the arc tube and directly entering the elliptic reflector becomes 105° or smaller, the length of the elliptic reflector in the direction of the center axis of the luminous flux emitted from the elliptic reflector, can be reduced. Hence the light source unit can be downsized.

In an exemplary aspect of the present invention, the rear end surface of the secondary reflecting mirror is formed into an inclined surface such that an angle formed between the rear portion of the center axis of the luminous flux emitted from the elliptic reflector and the rear end surface of the secondary reflecting mirror, is larger than an angle θ, θ represents the maximum angle formed between the rear portion of the center axis of the luminous flux emitted from the elliptic reflector and the luminous flux emitted from the arc tube and directly entering the elliptic reflector.

According to the above-described configuration of an exemplary aspect of the present invention, since the rear end surface of the secondary reflecting mirror, is formed so that the angle formed between the rear portion of the center axis of the luminous flux emitted from the elliptic reflector in the direction of emission of the luminous flux and the rear end surface of the secondary reflecting mirror, is larger than the maximum angle θ formed between the rear portion of the center axis of the luminous flux emitted from the elliptic reflector in the direction of emission of the luminous flux and the luminous flux emitted from the arc tube and directly entering the elliptic reflector, the luminous flux emitted from the arc tube can be guided into the elliptic reflector without being intercepted by the rear end surface of the secondary reflecting mirror in the direction of emission of the luminous flux. Hence the light emitted from the arc tube can be used positively as light from the light source.

In an exemplary aspect of the present invention, the secondary reflecting mirror may have an outer peripheral surface of a truncated conical shape which is tapered gradually toward the distal end of the front sealed section.

In an exemplary aspect of the present invention, the angle of inclination of the outer peripheral surface of the secondary reflecting mirror of a truncated conical shape with respect to the center axis of the luminous flux emitted from the elliptic reflector may be substantially equal to, or larger than, the angle of inclination of the line connecting the second focal position and the distal end of the front sealed section with respect to the center axis of the luminous flux emitted from the elliptic reflector.

According to the above-described configuration of an exemplary aspect of the present invention, since the secondary reflecting mirror has the outer peripheral surface of a truncated conical shape, interception of light around the outer peripheral portion of the secondary reflecting mirror can be reduced or prevented. In particular, interception of light around the outer peripheral portion of the secondary reflecting mirror can be reduced or prevented, by setting the angle of inclination of the outer peripheral surface of the secondary reflecting mirror of a truncated conical shape with respect to the center axis of the luminous flux emitted from the elliptic reflector substantially equal to, or larger than the angle of inclination of the line connecting the second focal position and the distal end of the front sealed section with respect to the center axis of the luminous flux emitted from the elliptic reflector. Thus, the luminous efficiency of light from the light source can further be enhanced. Also, by forming the outer peripheral surface of the secondary reflecting mirror in the shape described above, the cross-sectional area of the secondary reflecting mirror in the direction of optical axis can be increased. The strength of the secondary reflecting mirror can be enhanced.

In an exemplary aspect of the present invention, the reflecting surface of the secondary reflecting mirror may have a spherical surface corresponding to the external shape of the light emitting section, and the outer peripheral surface of the secondary reflecting mirror may be a spherical surface having a center of curvature positioned forward of the center of curvature of the reflecting surface on the center axis of the luminous flux emitted form the elliptic reflector.

According to the above-described configuration of an exemplary aspect of the present invention, since the thicknesses of between the reflecting surface and the outer peripheral surface of the secondary reflecting mirror can be determined to be thinner on the rear portion of the secondary reflecting mirror and thicker on the front portion thereof by displacing the center of the curvature of the outer peripheral surface from the center of the curvature of the reflecting surface forward in the direction of emission of the luminous flux on the center axis of the luminous flux emitted from the elliptic reflector, the secondary reflecting mirror can easily be accommodated within a circular cone shown by the line connecting between the second focal position of the elliptic reflector and the distal end of the front sealed section on the rear portion of the secondary reflecting mirror, and can increase the adhering area on the front side of the secondary reflecting mirror. Hence the adhesive strength between the arc tube and the secondary reflecting mirror can be enhanced.

In an exemplary aspect of the present invention, the secondary reflecting mirror may include a reflecting surface formed by polishing the inner surface of the cylindrical member into a curved surface corresponding to the external shape of the light emitting section, and being formed with a reflecting film on the inner surface of the cylindrical member.

According to the above-described configuration of an exemplary aspect of the present invention, since the reflecting surface can be formed by polishing the multi-purpose cylindrical member and hence accuracy of the curvature of the reflecting surface, for example, can be enhanced, the luminous efficiency of light from the light source can further be enhanced.

In an exemplary aspect of the present invention, the secondary reflecting mirror may be formed into a bowl shape obtained by polishing the outer peripheral portion of the cylindrical member so as to follow the curved polished portion on the inner surface of the cylindrical member.

According to the above-described configuration of an exemplary aspect of the present invention, since surface accuracy of the outer peripheral portion can be ensured by polishing the outer peripheral portion of the secondary reflecting mirror, interception of light by the secondary reflecting mirror is reduced or prevented. Hence the luminous efficiency of light from the light source can further be enhanced.

Also, by polishing the inner surface and the outer peripheral portion, material constituting the secondary reflecting mirror hardly exerts a mechanical load. Hence a compact and light-weight secondary reflecting mirror is achieved.

In an exemplary aspect of the present invention, the secondary reflecting mirror may include an inclined surface that is formed by polishing the end surface of the cylindrical member on the side where the reflecting surface is polished. The angle of the included surface with respect to the rear portion of the center axis of the luminous flux emitted from the elliptic reflector is larger than an angle θ when the secondary reflecting mirror is mounted to the front sealed section of the arc tube. θ represents the maximum angle formed between the rear portion of the center axis of the luminous flux emitted from the elliptic reflector and the luminous flux emitted from the arc tube and directly entering the elliptic reflector.

According to the above-described configuration of an exemplary aspect of the present invention, since the inclined surface formed by polishing the end surface of the cylindrical member on the side where the reflecting surface is polished is formed to have an angle of inclination larger than the maximum angle θ formed between the rear portion of an illumination axis in the direction of emission of the luminous flux and, the luminous flux emitted from the arc tube and directly entering the elliptic reflector when the secondary reflecting mirror is mounted to the sealed section on the distal side of the arc tube, light emitted from the arc tube can enter the elliptic reflector without being intercepted by the end surface of the cylindrical member on the side where the reflecting surface is polished. Hence the luminous efficiency of light from the light source can be enhanced while reducing or preventing the secondary reflecting mirror from intercepting light emitted from the light emitting section.

In an exemplary aspect of the present invention, the secondary reflecting mirror is formed by integrally press-molding the inner surface and the outer peripheral portion in a curved surface corresponding to the external shape of the light emitting section, and is formed with a neck portion extending toward the distal end of the front sealed section at the front end of the secondary reflecting mirror.

According to the above-described configuration of an exemplary aspect of the present invention, since the secondary reflecting mirror can be manufactured by press-molding, the secondary reflecting mirror, with a high degree of accuracy, can be manufactured in large quantities for a short time.

Also, since there is the neck portion formed on the secondary reflecting mirror, the adhering area with respect to the sealed section can be increased. Hence the secondary reflecting mirror can be firmly fixed to the arc tube.

In an exemplary aspect of the present invention, the secondary reflecting mirror is provided with translucency so that the adhering surface can be seen from the outer peripheral surface.

According to the above-described configuration of an exemplary aspect of the present invention, the filling amount of an adhesive agent can be adjusted so as not to flow over the reflecting surface while viewing the filling state of the adhesive agent between the adhering surface and the sealed section from the outside.

Therefore, hindering of the reflective property of the secondary reflecting mirror by the adhesive agent can be reduced or prevented. In addition, since management of filling of the adhesive agent is easy as described above, the areas opposing the adhering surface and the sealed section can be reduced. Hence the large reflecting surface can be secured, thereby contributing to enhancement of the luminous efficiency of light from the light source.

In an exemplary aspect of the present invention, the secondary reflecting mirror has an adhering surface opposing to the outer peripheral surface of the front sealed section of the arc tube, and is fixed to the arc tube by applying the adhesive agent between the outer peripheral surface of the front sealed section and the adhering surface.

In an exemplary aspect of the present invention, the adhering surface may not be applied with a reflecting film which forms the reflecting surface of the secondary reflecting mirror.

According to the above-described configuration of an exemplary aspect of the present invention, since the adhering surface of the secondary reflecting mirror and the outer peripheral surface of the sealed section are fixed by the adhesive agent, and hence the secondary reflecting mirror can be firmly mounted to the front sealed section of the arc tube, positional displacement between the secondary reflecting mirror and the arc tube is reduced or prevented. Hence the optimal state of using of light from the light source can be maintained.

In an exemplary aspect of the present invention, the adhesive agent may be applied entirely between the outer peripheral surface of the front sealed section and the adhesive surface, and it may be applied intermittently.

When applying intermittently, the adhesive agent may be applied on the cross-sections of the sealed section and the secondary reflecting mirror taken along the plane orthogonal to the illumination axis at three or four places about the axis.

According to the above-described configuration of an exemplary aspect of the present invention, when applying the adhesive agent entirely, since the entire surface of the outer peripheral portion of the front sealed section and the adhering surface of the secondary reflective mirror is fixed by the adhesive agent, adhesion and fixation between the arc tube and the secondary reflecting mirror can be enhanced. When applying intermittently, a gap is formed at the adhered portion. Hence the space between the light emitting section and the reflecting surface of the secondary reflecting mirror can communicate with the external space via the space, and cooling of the light emitting section can be performed.

In an exemplary aspect of the present invention, the adhering surface is formed into a tapered surface so as to gradually approach the outer peripheral surface of the front sealed section from a side of the outer peripheral surface of the secondary reflecting mirror toward the reflecting surface.

According to the above-described configuration of an exemplary aspect of the present invention, when the secondary reflecting mirror is mounted to the sealed section on the distal side of the arc tube and thereafter the adhesive agent for fixation is applied thereto to fix the same, the adhesive agent can easily be injected into the space between the outer peripheral surface of the sealed section and the adhering surface. Hence the fixing operation can be facilitated.

In an exemplary aspect of the present invention, the adhering surface is formed into a tapered surface so as to gradually approach the outer peripheral surface of the front sealed section from the side of the reflecting surface of the secondary reflecting mirror to the side of the outer peripheral surface thereof.

In addition, in an exemplary aspect of the present invention, the angle of the tapered surface may be set to a range between 1° and 10° inclusive with respect to the center axis of the luminous flux emitted from the elliptic reflector.

According to the above-described configuration of an exemplary aspect of the present invention, after the adhesive agent, filled between the tapered surface which is formed so as to gradually approach the outer peripheral surface of the front sealed section from the reflecting surface of the secondary reflecting mirror toward the outer peripheral surface and the outer peripheral surface of the front sealed section, has cured, the secondary reflecting mirror may be mechanically restricted from moving rearwardly of the direction of emission of the luminous flux with respect to the arc tube.

By setting the angle of the tapered surface to the range between 1° and 10° inclusive with respect to the center axis of the luminous flux emitted from the elliptic reflector, a sufficient area of the reflecting surface is ensured and the luminous flux radiated from the light emitting section can be utilized laconically, thereby contributing to the luminous efficiency of light from the light source while restricting the movement of the secondary reflecting mirror.

In an exemplary aspect of the present invention, the adhering surface if formed with a shoulder projecting toward the front sealed section. The shoulder includes a surface continuing from the reflecting surface of the secondary reflecting mirror.

According to the above-described configuration of an exemplary aspect of the present invention, since the adhesive agent, filled between the adhering surface and the sealed section, is blocked by the shoulder, the likelihood that adhesive agent flows over and contaminating the reflecting surface, is reduced or eliminated.

Also, on the side of the reflecting surface, since the area of the reflecting surface can be increased due to the presence of the shoulder, the luminous efficiency of light can be enhanced. At the same time, on the side of the outer peripheral surface, the distance between the adhering surface and the sealed section can be increased. Hence the adhesive agent can easily be filled in.

Furthermore, after the adhesive agent has cured, the secondary reflecting mirror may be mechanically restricted from moving rearwardly of the direction of emission of the luminous flux with respect to the arc tube because of the presence of the shoulder.

In an exemplary aspect of the present invention, a chamfered portion is formed at the meeting point between the rear end surface of the secondary reflecting mirror and the adhering surface.

According to the above-described configuration of an exemplary aspect of the present invention, since the chamfered portion is formed at the meeting point between the adhering surface of the secondary reflecting mirror and the outer peripheral surface, the adhesive agent can be easily flowed between the outer peripheral surface of the sealed section and the adhering surface when mounting the secondary reflecting mirror to the sealed section on the distal side of the arc tube and then applying the adhesive agent for fixation thereof and fixing the same, so that fixing operation can be facilitated.

In an exemplary aspect of the present invention, the secondary reflecting mirror is formed with a plurality of grooves by notching the ridge at the meeting point between the rear end surface of the secondary reflecting mirror and the adhering surface.

According to the above-described configuration of an exemplary aspect of the present invention, when the adhesive agent, filled in the groove formed on the ridge at the meeting point between the rear end surface of the secondary reflecting mirror and the adhering surface, is cured, rotation of the secondary reflecting mirror with respect to the arc tube is restricted. Hence displacement of the secondary reflecting mirror can be reduced or prevented. Therefore, lowering of the illumination intensity of illumination emitted from the light source unit is reduced or prevented.

Also, in an exemplary aspect of the present invention, the adhesive agent applied between the adhering surface of the secondary reflecting mirror and the outer peripheral surface of the front sealed section is applied so as to be mounded on the outer peripheral surface of the secondary reflecting mirror.

According to the above-described configuration of an exemplary aspect of the present invention, since the adhesive agent is applied so as to be mounded on the outer peripheral surface of the secondary reflecting mirror, the secondary reflecting mirror may be restricted from moving forward in the direction of emission of the luminous flux with respect to the arc tube, after the adhesive agent is cured. Therefore, the secondary reflecting mirror can be held and fixed to the arc tube reliably.

According to the combination of the tapered surface and the adhesive agent mounded on the outer peripheral surface, the meeting point with respect to the outer peripheral surface of the secondary reflecting mirror is formed into an acute angle. Hence the adhesive agent is filled in such a manner that a portion of the acute angle is stuck in the adhesive agent of the both side of the adhering surface and the outer peripheral surface to achieve firm adhesion, whereby movement of the secondary reflecting mirror is restricted.

A method of manufacturing a light source unit according to an exemplary aspect of the present invention is a method of manufacturing a light source unit to manufacture a light source including an arc tube having a light emitting section in which discharging emission is performed between electrodes and sealed sections provided at both ends of the light emitting section; an elliptic reflector to emit a luminous flux radiated from the arc tube in a certain uniform direction, and a secondary reflecting mirror having a reflecting surface disposed so as to oppose a reflecting surface of the elliptic reflector, covering the front side of the arc tube in the direction of emission of the luminous flux, and reflecting the luminous flux emitted from the arc tube toward the elliptic reflector, including: inserting the secondary reflecting mirror to the sealed section of the arc tube which is positioned and held so that the center of discharging emission is located in the vicinity of a first focal position of the elliptic reflector in advance, and illuminating the arc tube; detecting the illumination intensity of a luminous flux emitted from the elliptic reflector by illuminating the arc tube; adjusting the position of the secondary reflecting mirror with respect to the arc tube while detecting the illumination intensity of the luminous flux so that the detected illumination intensity becomes the largest value; and fixing the secondary reflecting mirror to the arc tube at the position where the detected illumination intensity becomes the largest value.

Here, although detection of the illumination intensity may be performed by directly measuring the illumination flux emitted from the elliptic reflector, it is also possible to measure the illumination flux which is passed through an optical system which constitutes optical instrument in which the light source unit is used. Measurement of the illumination intensity can be made by image processing using a CCD camera, by an illuminometer, or by an integrating sphere.

According to the above-described configuration of an exemplary aspect of the present invention, since the secondary reflecting mirror can be fixed to the arc tube at an optimal illumination intensity by adjusting the position of the secondary reflecting mirror with respect to the arc tube so that the highest illumination intensity is detected while detecting the illumination intensity of the luminous flux from the arc tube reflected directly on the elliptic reflector and the illumination intensity of the luminous flux advancing via the secondary reflecting mirror and reflected on the elliptic reflector, the light source unit in which the luminous efficiency of light from the light source is significantly enhanced and can be manufactured reliably.

Another method of manufacturing a light source unit of an exemplary aspect of the present invention is a method of manufacturing a light source unit including: an arc tube having a light emitting section in which discharging emission is performed between electrodes and sealed sections provided at both ends of the light emitting section; an elliptic reflector to emit a luminous flux radiated from the arc tube in a certain uniform direction, and a secondary reflecting mirror having a reflecting surface disposed so as to oppose a reflecting surface of the elliptic reflector, covering the front side of the arc tube in the direction of emission of the luminous flux, and reflecting the luminous flux radiated from the arc tube toward the elliptic reflector, including: inserting the secondary reflecting mirror to the sealed section of the arc tube which is positioned and held so that the center of discharging emission is located in the vicinity of a first focal position of the elliptic reflector in advance, and illuminating the arc tube; detecting an arc image formed between the electrodes in the arc tube and a reflected arc image formed by being reflected on the secondary reflecting mirror; adjusting the position of the secondary reflecting mirror with respect to the arc tube while detecting the arc image and the reflected arc image, so that the arc image and the reflected arc image overlap partly with each other; and fixing the secondary reflecting mirror to the arc tube at the position where the arc image and the reflected arc image overlap partly with each other.

According to the above-described configuration of an exemplary aspect of the present invention, since both of the arc images contribute to enhance light from the light source by reducing or preventing temperature increase within the light emitting section due to plasma absorption in association with the overlap of the arc image and the reflected arc image, the light source unit in which the luminous efficiency of light from the light source is positively enhanced can be manufactured easily with high degree of accuracy.

Another method of manufacturing a light source unit according to an exemplary aspect of the present invention is a method of manufacturing a light source unit including: an arc tube having a light emitting section in which discharging emission is performed between electrodes and sealed sections provided at both ends of the light emitting section; an elliptic reflector to emit a luminous flux radiated from the arc tube in a certain uniform direction, and a secondary reflecting mirror having a reflecting surface disposed so as to oppose a reflecting surface of the elliptic reflector, covering the front side of the arc tube in the direction of emission of the luminous flux, and reflecting the luminous flux radiated from the arc tube toward the elliptic reflector, including: inserting the secondary reflecting mirror to the sealed section of the arc tube which is held by the elliptic reflector in advance; detecting an image of the electrodes and the reflected image of the electrodes detected as the reflected image of the secondary reflecting mirror; adjusting the position of the secondary reflecting mirror with respect to the arc tube so that displacement of the image of the electrodes and the reflected image of the electrodes become a predetermined amount of deviation while detecting the image of the electrodes and the reflected image of the electrodes; and fixing the secondary reflecting mirror to the arc tube at the position where displacement of the image of the electrodes and the reflected image of the electrodes become to the predetermined amount of deviation.

According to the above-described configuration of an exemplary aspect of the present invention, the position where the image of the electrodes and the reflected image of the electrodes are formed can be figured out without illuminating the arc tube, and illuminating the arc tube can be omitted. Also, since the image of the electrodes and the image of the reflected electrodes are displaced by the predetermined amount of deviation, temperature increase in the light emitting section due to plasma absorption in association with the overlap of the arc image and the reflected arc image, which is generated when the arc tube is illuminated may be reduced or prevented to make both of the arc images contribute to enhance light from the light source. Hence the light source unit in which the luminous efficiency of light from the light source is positively enhanced can be manufactured easily with high degree of accuracy.

Another method of manufacturing a light source unit according to an exemplary aspect of the invention including: an arc tube having a light emitting section in which discharging emission is performed between electrodes and sealed sections provided at both ends of the light emitting section; an elliptic reflector to emit a luminous flux radiated from the arc tube in a certain uniform direction, and a secondary reflecting mirror having a reflecting surface disposed so as to oppose a reflecting surface of the elliptic reflector, covering the front side of the arc tube in the direction of emission of the luminous flux, and reflecting the luminous flux radiated from the arc tube toward the elliptic reflector, including: inserting the secondary reflecting mirror to the sealed section of the arc tube which is positioned and held so that the center of discharging emission is located in the vicinity of a first focal position of the elliptic reflector; calculating the center of curvature of the reflecting surface from the curvature of the reflecting surface of the secondary reflecting mirror; calculating the center of discharging emission between the electrodes from the positions of the electrodes; adjusting the secondary reflecting mirror to the arc tube so that positional displacement between the center of curvature and the center of light emission becomes a predetermined amount of deviation based on the calculated center of curvature of the reflecting surface of the secondary reflecting mirror and center of light emission between the electrodes; and fixing the position of the secondary reflecting mirror with respect to the arc tube at the position where displacement between the center of curvature and the center of light emission becomes the predetermined amount of deviation.

According to the above-described configuration of an exemplary aspect of the present invention, since the center of curvature of the reflecting surface of the secondary reflecting mirror and the center of light emission between the electrodes can be calculated and figured out, without illuminating the arc tube on, the illuminating of the arc tube can be omitted. Also, since the center of curvature of the reflecting surface of the secondary reflecting mirror and the center of light emission between the electrodes are displaced by the predetermined amount of deviation, temperature increase within the light emitting section due to plasma absorption in association with the overlap between the arc image and the reflected arc image generated when the arc tube is illuminated is reduced or prevented to make both of the arc images contribute to enhance light from the light source. Hence the light source unit in which the luminous efficiency of light from the light source is positively increased can be manufactured easily with high degree of accuracy.

In a method of manufacturing a light source unit and another method of manufacturing a light source unit, according to an exemplary aspect of the present invention, fixing the secondary reflecting mirror to the arc tube, performed by applying the adhesive agent to the sealed section and the secondary reflecting mirror and curing the adhesive agent is performed after adjusting the position of the secondary reflecting mirror with respect to the arc tube.

According to the above-described configuration of an exemplary aspect of the present invention, since the adhesive agent is applied to the sealed section and the secondary reflecting mirror after the position of the secondary reflecting mirror with respect to the arc tube is adjusted, the position can be adjusted without the possibility that the adhesive agent is cured during adjustment of the position of the secondary reflecting mirror. In addition, the likelihood that the adhesive agent contaminates other portions of the arc tube during positional adjustment is reduced or eliminated.

In a method of manufacturing a light source unit or another method of manufacturing a light source unit according to an exemplary aspect of the present invention, fixing the secondary reflecting mirror to the arc tube is performed by curing and fixing the adhesive agent applied before adjusting the position of the secondary reflecting mirror with respect to the arc tube.

According to the above-described configuration of an exemplary aspect of the present invention, since the adhesive agent is interposed between the sealed section and the secondary reflecting mirror before adjusting the position of the secondary reflecting mirror with respect to the arc tube, the adhesive agent can be distributed evenly on the adhesive surface of the sealed section and the secondary reflecting mirror upon positional adjustment. Hence the manufacturing method can be simplified and a strong adhesion and fixation are achieved.

The projector according to an exemplary aspect of the present invention is a projector to form an optical image by modulating a luminous flux emitted from a light source according to image information and projecting the enlarged image. The light source unit or the light source unit obtained by the aforementioned method of manufacturing the light source unit is provided for the projector.

According to the above-described configuration of an exemplary aspect of the present invention, since the light source unit has operation and effects as described above, the same operation and the effects may be obtained, and the projector in which the luminous efficiency of light from the light source is significantly enhanced is obtained.

DETAILED DESCRIPTION OF EXEMPLARY EMBODIMENTS

Figure 1:
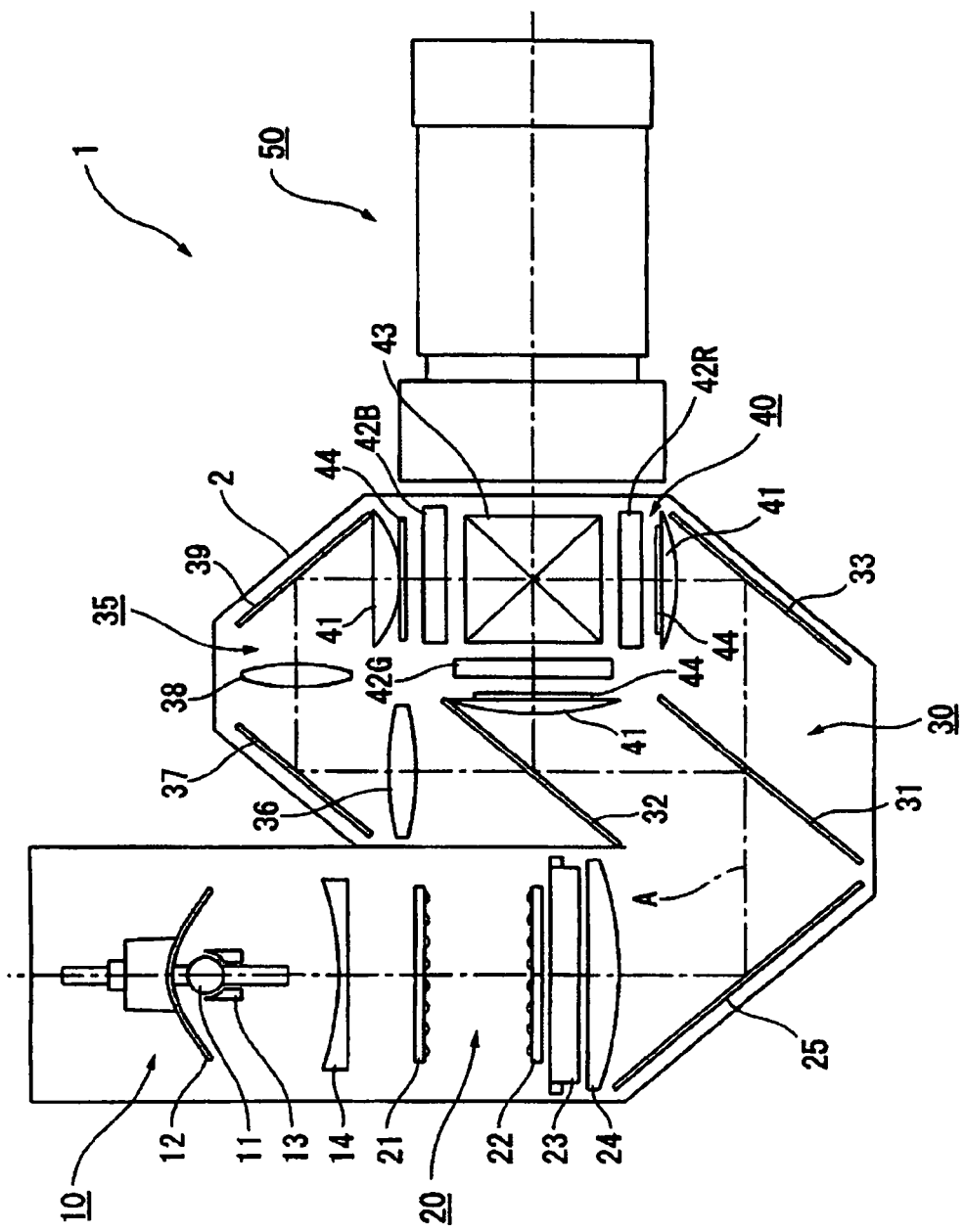
FIG. 1 is a schematic showing the structure of a projector according to an exemplary embodiment of the present invention.

Referring now to the drawings, exemplary embodiments of the present invention will be described.

1 First Exemplary Embodiment

Structure of Projector

FIG. 1 is a schematic showing an optical system of a projector 1 according to a first exemplary embodiment of the present invention. The projector 1 is an optical instrument to form an optical image by modulating a luminous flux emitted from a light source according to image information and projecting an enlarged image on a screen, and includes a light source unit 10, an uniformly illuminating optical system 20, a color separating optical system 30, a relay optical system 35, an optical device 40, and a projecting optical system 50. Optical elements constituting the optical systems 20-35 are positionally adjusted and stored in an optical component enclosure 2 having a preset illumination axis A.

The light source unit 10 emits a luminous flux radiated from a light source lamp 11 in a certain uniform direction to illuminate the optical device 40 and, though details are described later, includes the light source lamp 11, an elliptic reflector 12, a secondary reflecting mirror 13, and a lamp housing, not shown, to hold these members. A parallelizing concave lens 14 is provided on the downstream side of the elliptic reflector 12 in the direction of emission of the luminous flux. The parallelizing concave lens 14 may be integrated with the light source unit 10 or provided separately.

The luminous flux radiated from the light source lamp 11 is emitted as a convergent beam be emitted uniformly toward the front of the light source unit 10 by the elliptic reflector 12, parallelized by the parallelizing concave lens 14, and emitted to the uniformly illuminating optical system 20.

The uniformly illuminating optical system 20 is an optical system to split the luminous flux emitted from the light source unit 10 into a plurality of partial luminous fluxes to uniformize the illumination intensity in the surface of the illuminating area, and includes a first lens array 21, a second lens array 22, a polarized light converting element 23, and a superimposed lens 24, and a reflecting mirror 25.

The first lens array 21 has a function as a luminous flux splitting optical element to split the luminous flux emitted from the light source lamp 11 into a plurality of partial luminous fluxes, and includes a plurality of small lenses arranged in a matrix manner in a plane orthogonal to the illumination axis A. The contours of the respective small lenses are determined so as to be similar to the shapes of the image forming areas of liquid crystal panels 42R, 42G, 42B constituting the optical device 40, which will be described later.

The second lens array 22 is an optical element to converge the plurality of partial luminous fluxes split by the first lens array 21 described above, and has a structure including a plurality of small lenses arranged in a matrix manner in a plane orthogonal to the illumination axis A as in the case of the first lens array 21. However, since it is intended for conversion of light, the contours of the respective small lenses are not required to have shapes corresponding to the image forming areas of the liquid crystal panels 42R, 42G, 42B.

The polarized light converting element 23 is a polarized light converting element to convert the direction of polarization of the respective partial luminous fluxes divided by the first lens array 21 into linearly polarized light in a certain uniform direction.

The polarized light converting element 23, not shown, has a structure in which polarized light splitting films and reflecting mirrors being disposed obliquely with respect to the illumination axis A are arranged alternately. The polarized light splitting film transmits one of P-polarized luminous flux and S-polarized luminous flux contained in the respective partial luminous fluxes, and reflects the other polarized luminous flux. The other polarized luminous flux, which is reflected, is bent by the reflecting mirror, and is emitted in the direction of emission of one of the polarized luminous fluxes, specifically, in the direction along the illumination axis A. Some of the emitted polarized luminous fluxes are polarized by a wave plate provided on a luminous flux emitting surface of the polarized light converting element 23. All the polarized luminous fluxes are directed in the same direction. With such a polarized light converting element 23, since the luminous fluxes emitted from the light source lamp 11 can be polarized and directed into the same direction, the luminous efficiency of light from the light source used in the optical device 40 can be enhanced.

The superimposing lens 24 is an optical element to converge the plurality of partial luminous fluxes passed through the first lens array 21, the second lens array 22, and the polarized light converting element 23 and superimposing them onto the image forming areas of the liquid crystal panels 42R, 42G, 42B. The superimposing lens 24 in this example is a spherical lens having a flat end surface on the incoming side of the luminous flux transmitting area and a spherical end surface on the outgoing side thereof. However, an aspherical lens having a hyperboloidal end surface on the outgoing side may be employed.

The luminous flux emitted from the superimposing lens 24 is redirected on the reflecting mirror 25 and emitted toward the color separating optical system 30.

The color separating optical system 30 includes two dichroic mirrors 31, 32, and a reflecting mirror 33, and has a function to separate the plurality of partial luminous flux emitted from the uniformly illuminating optical system 20 into light in three colors of red (R), green (G), and blue (B) by the dichroic mirrors 31, 32.

The dichroic mirrors 31, 32 each are an optical element formed with a wavelength selecting film which reflects a luminous flux of a predetermined certain range of wavelength and transmits a luminous flux of other wavelength on a base plate. The dichroic mirror 31 disposed on the upstream side of the optical path is a mirror which transmits red light and reflects light in other colors. The dichroic mirror 32 disposed on the downstream side of the optical path is a mirror which reflects green light and transmits blue light.

A relay optical system 35 includes an incoming side lens 36, a relay lens 38, and reflecting mirrors 37, 39, and has a function to guide blue light passed through the dichroic mirror 32 constituting the color separating optical system 30 to the optical device 40. The reason why such a relay optical system 35 is provided in the optical path of blue light is, to reduce or prevent lowering of the luminous efficiency of light due to divergence of light since the length of the optical path of blue light is longer than the optical paths of light in other colors. Since the length of the optical path of blue light in this example, the structure as describe above is employed. However, when the optical path of red light is long, an arrangement in which the relay optical system 35 is provided on the optical path of red light is also applicable.

Red light separated from the above-described dichroic mirror 31 is redirected by the reflecting mirror 33 and supplied to the optical device 40 via a field lens 41. Green light separated by the dichroic mirror 32 is supplied to the optical device 40 via the field lens 41 as is. Further, blue light is converged and redirected by the lenses 36, 38 and the reflecting mirrors 37, 39 which constitute the relay optical system 35 and supplied to the optical device 40 via the field lens 41. The field lens 41, provided on the upstream side of the optical paths of light of the respective colors in the optical device 40, is provided to convert the respective partial luminous flux emitted from the second lens array 22 into a luminous flux parallel with the illumination axis.

The optical device 40 forms a color image by modulating the incoming luminous flux according to image information, and includes the liquid crystal panels 42R, 42G, 42B as optical modulating units, which are objects to be illuminated, and a cross dichroic prism 43 as a color synthesis optical system. An incoming side polarizing plate 44 is interposed between the field lens 41 and the respective liquid crystal panels 42R, 42G, 42B, and an outgoing side polarizing plate is interposed between the respective liquid crystal panels 42R, 42G, 42B and the cross dichroic prism 43, not shown, whereby light modulation of incoming light of the respective colors is performed by the incoming side polarizing plate 44, the liquid crystal panels 42R, 42G, 42B, and the outgoing side polarizing plate.

The liquid crystal panels 42R, 42G, 42B each are formed by hermetically encapsulating liquid crystal, which is an electro-optical substance, into a pair of transparent glass plates, and for example, modulate the polarizing direction of the polarized luminous flux emitted from the incoming side polarizing plate 44 according to supplied image signals with a polysilicon TFT as a switching element. The image forming areas of the liquid crystal panels 42R, 42G, 42B are rectangular, and have a diagonal size of 0.7 inches for example.

The cross dichroic prism 43 is an optical element to form a color image by synthesizing optical images which are modulated for each color of light emitted from the outgoing side polarizing plate. The cross dichroic prism 43 is formed by adhering four rectangular prisms and is square in plan view. On the interfaces between the respective adjacent rectangular prisms, there are formed dielectric multi-layer films in a substantially X-shape. One of the dielectric multi-layer films of the substantially X-shape reflects red light. The other dielectric multi-layer film reflects blue light. Red light and blue light are redirected by the dielectric multi-layer film and directed into the same direction as green light, so that light in three colors are synthesized.

Then, the color image emitted from the cross dichroic prism 43 is enlarged and projected by the projecting optical system 50 to form a big screen image on a screen, not shown.

Structure of Light Source Unit

Figure 2:
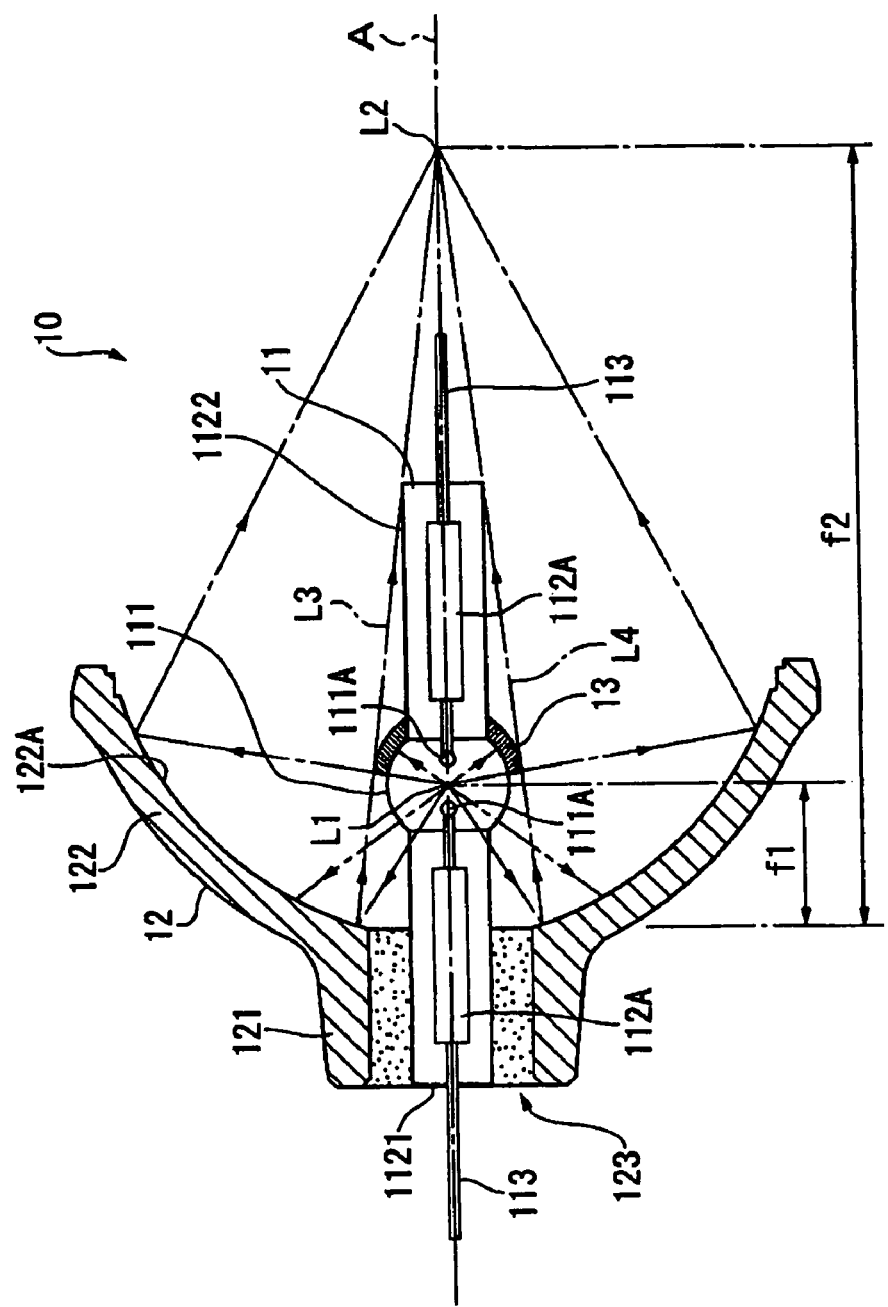
FIG. 2 is a schematic showing the structure of a light source unit according to a first exemplary embodiment of the present invention.

The light source unit 10 has a structure including the light source lamp 11 as an arc tube provided within the elliptic reflector 12 as shown in FIG. 2. In exemplary aspects of the present invention, the direction of emission of the luminous flux of the light source unit 10 is represented as the front side or the distal side. The opposite direction from the direction of emission of the luminous flux of the light source unit 10 is represented as the rear side or the proximal side.

The light source lamp 11, as the arc tube, is formed of a quartz glass tube swelling at the center into a spherical shape. The center portion serves as a light emitting section 111. The sections extending on both the front side and the rear side of the light emitting section 111 are designated as sealed sections 1121, 1122.

A pair of electrodes 111A formed of tungsten and disposed at a distance from each other, mercury, rare gas, and a small amount of halogen are encapsulated in the light emitting section 111.

Molybdenum metallic foils 112A to be electrically connected to the electrodes of the light emitting section 111 are respectively inserted into the sealed sections 1121, 1122 extending on both the front side and the rear side of the light emitting section 111, and are sealed by glass material or the like. The respective metallic foils 112A are connected to lead wires 113 as electrode leader lines, and the lead wires 113 extend to the outside of the light source lamp 11.

Figure 3:
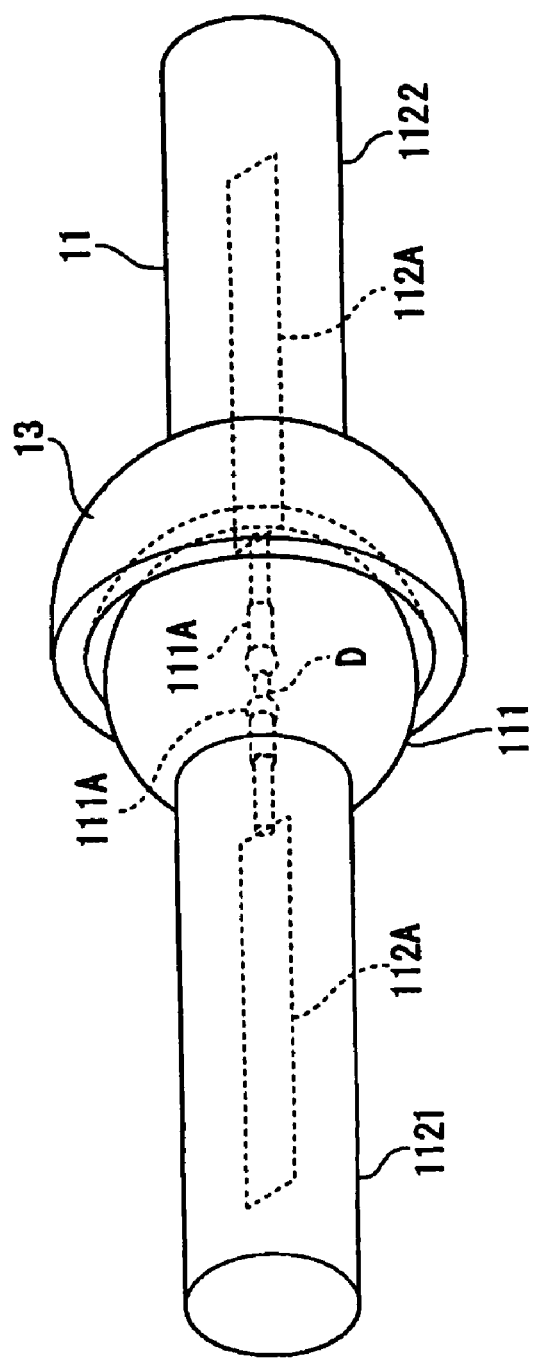
FIG. 3 is a schematic showing the structure of a light source lamp according to the first exemplary embodiment of the present invention.

When a voltage is applied to the lead wires 113, as shown in FIG. 3, a potential difference is generated between the electrodes 111A via the metallic foils 112A. Thus electric discharge occurs, an arc image D is generated, and the light emitting section 111 emits light.

As shown in FIG. 2, the elliptic reflector 12 is an integrally molded member formed of glass and provided with a neck portion 121 through which the proximal (rear) sealed section 1121 of the light source lamp 11 is inserted, and an reflecting portion 122 of an ellipsoidal shape extending from the neck portion 121.

The neck portion 121 is formed with an insertion hole 123 at the center thereof. The sealed section 1121 is disposed at the center of the insertion hole 123.

The reflecting portion 122 is formed by depositing metallic film on the ellipsoidal shaped glass surface. The reflecting surface 122A of the reflecting portion 122 is formed into a cold mirror which reflects visual light and transmits infrared ray and ultraviolet ray.

The reflecting surface 122A of the elliptic reflector 12 is an ellipsoidal shape having a first focal point L1 and a second focal point L2. The first focal point L1 and the second focal point L2 are disposed on the illumination axis A.

The light source lamp 11, disposed in the reflecting portion 122 of such an elliptive reflector 12, is disposed so that the center of light emission between the electrodes 111A in the light emitting section 111 is located in the vicinity of the first focal L1 of the ellipsoidal surface of the reflecting surface 122A of the reflecting portion 122.

Then, when the light source lamp 11 is illuminated, the luminous flux radiated from the light emitting section 111 reflects on the reflecting surface 122A of the reflecting portion 122, and is converted into a converged light which converges at the second focal portion L2 of the elliptic reflector 12. The center axis of the luminous flux emitted from the elliptic reflector 12 substantially coincides with the illumination axis A.

At this time, the area within a circular cone shown by boundaries L3 and L4 which connect the second focal position L2 of the elliptic reflector 12 and the distal end of the distal (front) sealed section 1122 in the direction of emission of the luminous flux of the light source lamp 11, is a luminous flux unusable area in which the luminous flux cannot be guided to the second focal position L2 since the luminous flux reflected on the elliptic reflector 12 is blocked by the sealed section 1122. The boundaries L3 and L4 connecting the second focal position L2 of the elliptic reflector 12 and the distal end of the distal (front) sealed section 1122 in the direction of emission of luminous flux of the light source lamp 11 are boundary beams which define boundaries between beams blocked by the sealed section 1122 and luminous fluxes reflected on the elliptic reflector 12 and reaching the second focal position L2.

The light source lamp 11 is fixed to such an elliptic reflector 12 by inserting the back sealed section 1121 of the light source lamp 11 into the insertion hole 123 of the elliptic reflector 12, disposing the center of light emission between the electrodes 111A in the light emitting section 111 at the location in the vicinity of the first focal position L1 of the elliptic reflector 12, and filling inorganic adhesive agent containing silica/alumina as a main component in the insertion hole 123.

The dimension of the reflecting portion 122 in the direction of the optical axis is shorter than the length of the light source lamp 11. Therefore, when the light source lamp 11 is fixed to the elliptic reflector 12 as described above, the front sealed section 1122 of the light source lamp 11 protrudes from a luminous flux emitting port of the elliptic reflector 12.

Figure 4:
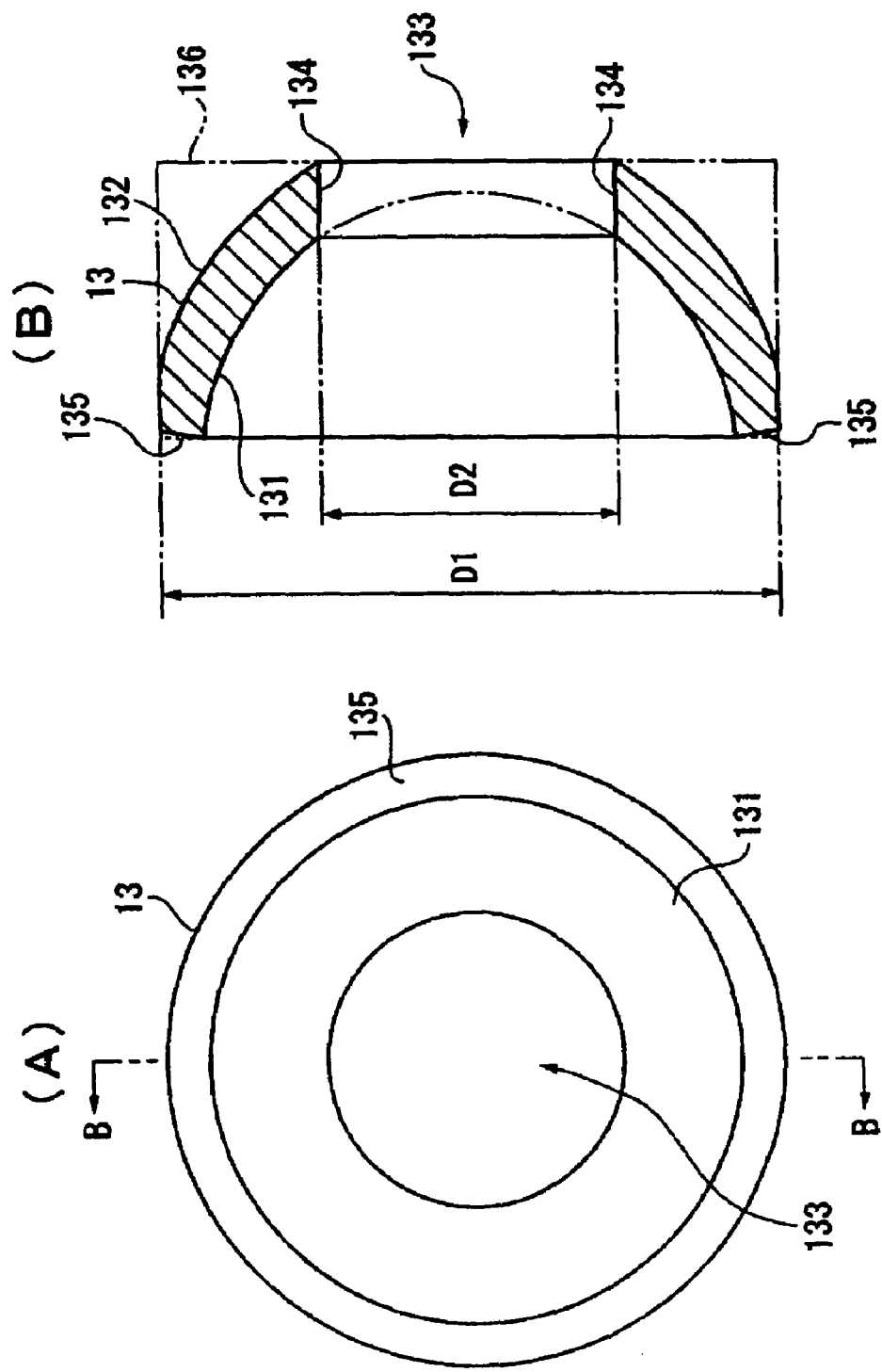
FIGS. 4(A) and 4(B) are schematics of the structure of a secondary reflecting mirror according to the first exemplary embodiment of the present invention.

The secondary reflecting mirror 13 is a reflecting member to cover the substantially front half of the light emitting section 111 of the light source lamp 11. As shown in FIG. 4, the inner side serves as a spherical reflecting surface 131 and the outer peripheral surface 132 is formed into a bowl shape of a curved surface so as to follow the curvature of the reflecting surface 131. The reflecting surface 131 is formed with a reflecting film by depositing metal. The reflecting film serves as a cold mirror as the reflecting surface 122A of the elliptic reflector 12.

An opening 133 is formed on the bowl-shaped bottom portion of the secondary reflecting mirror 13. The inner peripheral surface of the opening 133 is, as described later, used as an adhering surface 134 on which an adhesive agent to fix to the sealed section 1122 is filled.

The bowl-shaped upper end surface (left end surface in FIG. 4(B)) of the secondary reflecting mirror 13 is formed into an inclined surface 135 gradually reduced in height from the edge of the reflecting surface 131 toward the edge of an outer peripheral surface 132.

Figure 5:
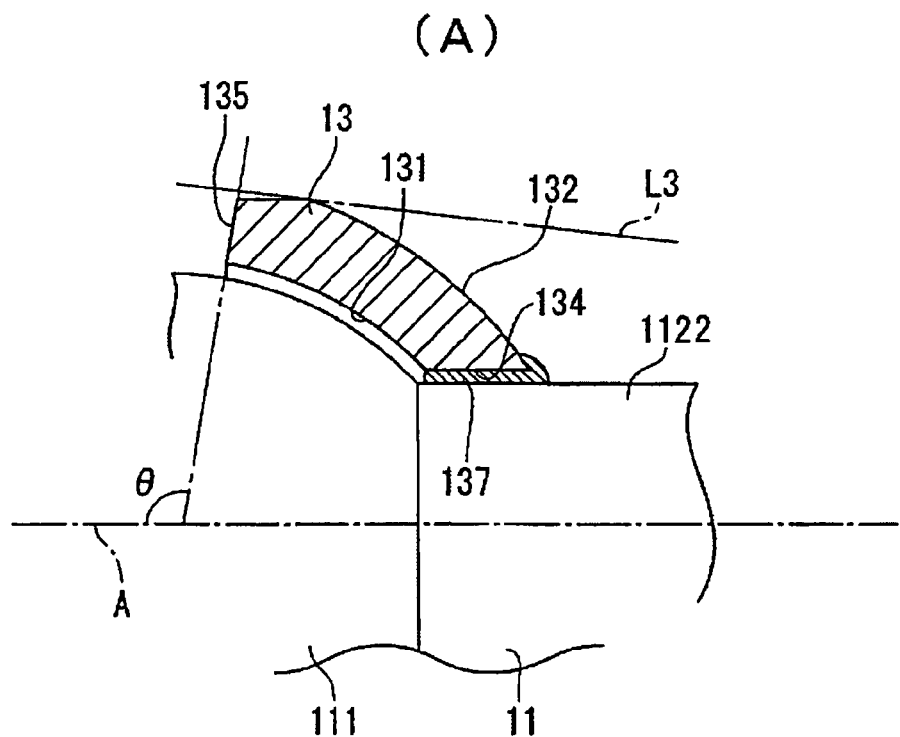
FIGS. 5(A) and 5(B) are schematics taken along the direction of the optical axis showing a state in which the secondary reflecting mirror is fixed to the light source lamp according to the first exemplary embodiment of the present invention.
Figure 5:
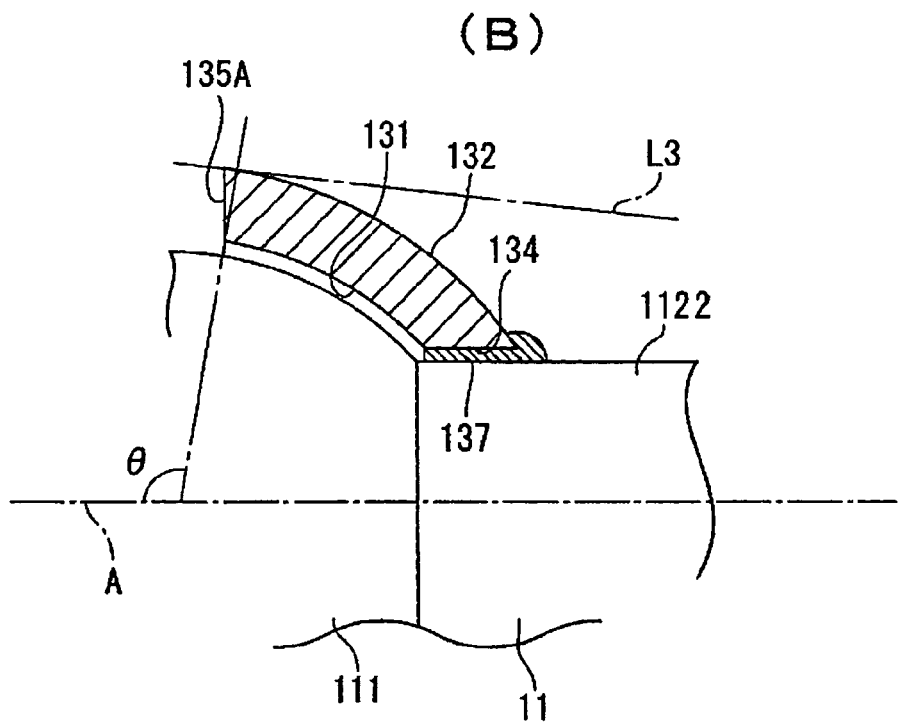

As shown in FIG. 5(A), the inclined surface 135 has a truncated conical shape inclining along the maximum angle θ formed between the proximal side (back side) of the illumination axis A in the direction of emission of the luminous flux and the luminous flux emitted from the light emitting section 111 and directly entering the elliptic reflector 12. The angle θ is the maximum angle formed with respect to the luminous flux emitted from the light emitting section 111 and directly entering the elliptic reflector 12, and may be 105° or below in order to shorten the length of the elliptic reflector 12 in the direction of the illumination axis A.

The secondary reflecting mirror 13, as described above, is formed of inorganic material, such as quartz or alumina ceramics, or crystallized glass, such as quartz, NEO CERAM (trade mark of a product from Asahi Glass Co.,Ltd.), or material, such as sapphire or alumina ceramics. Specifically, as shown in FIG. 4(B), it can be manufactured by polishing a thick cylindrical member 136 having an outer diameter D1 and an inner diameter D2.

First, one of the end surfaces of the cylindrical member 136 is polished into a recessed curved surface to form the reflecting surface 131. Then the outer peripheral surface 132, in the shape of the projecting curved surface, is polished so as to follow the reflecting surface 131, and the inclined surface 135 is polished. As the last procedure, a dielectric multi-layer film of tantalum pentoxide (Ta2O5) and silica dioxide (SiO2) is deposited and formed on the reflecting surface 131.

The mounting position of the secondary reflecting mirror 13 with respect to the light emitting section 111 of the light source lamp 11 is, as shown in FIG. 5(A), at the position where the inclined surface 135 is disposed along the maximum angle θ formed between the proximal (back) side of the illumination axis A in the direction of emission of the luminous flux and the luminous flux radiated from the light emitting section 111 and directly entering the elliptic reflector 12, and at the position in the direction orthogonal to the illumination axis A where the outer peripheral surface 132 of the secondary reflecting mirror 13 does not protrude from the circular cone indicated by the boundaries L3 and L4.

Also, though the inclined surface 135 is an inclined surface along the angle θ in this example, it may be positioned so that the end surface 135A of the secondary reflecting mirror 13, on the side of the light emitting section 111, is orthogonal to the illumination axis A, as long as the amount of the luminous flux, which does not enter the reflecting surface 131 of the secondary reflecting mirror 13 and is blocked by an end surface 135A of the secondary reflecting mirror 13, is small, as shown in FIG. 5(B).

As shown in FIG. 5(A), fixation of the secondary reflecting mirror 13 to the light source lamp 11 is performed by adhering and fixing the secondary reflecting mirror 13 with the intermediary of an adhesive agent 137 between the adhering surface 134 and the outer peripheral surface of the sealed section 1122 of the distal (front) side of the light source lamp 11. The adhesive agent 137 is applied so as to mound on the outer peripheral surface 132 of the secondary reflecting mirror 13. As material of the adhesive agent 137, an inorganic adhesive agent containing silica/alumina, as in the case of adhering and fixing the light source lamp 11 to the elliptic reflector 12, can be employed.

Figure 6:
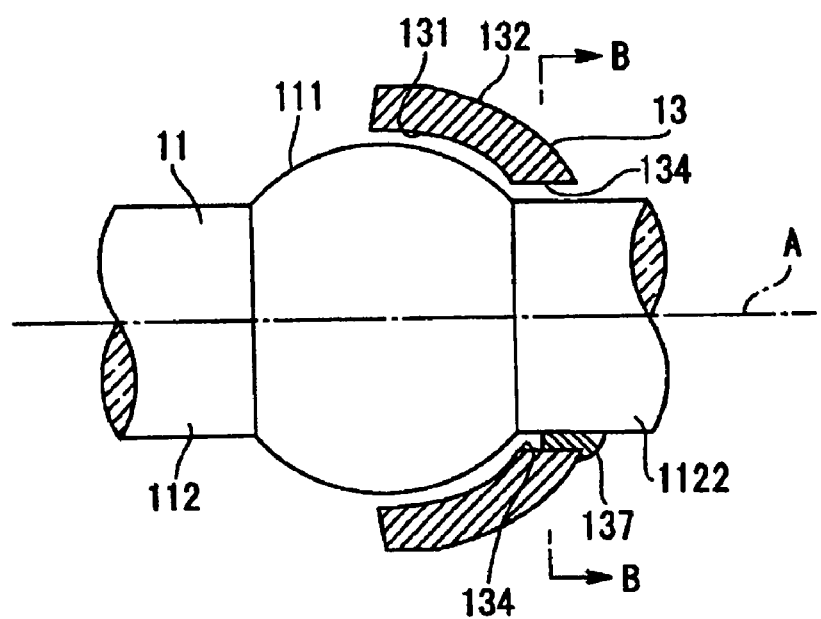
FIGS. 6(A) and 6(B) are schematics taken along the direction of the optical axis and in the direction orthogonal to the optical axis, showing a state in which an adhesive agent is applied according to the first exemplary embodiment of the present invention.
Figure 6:
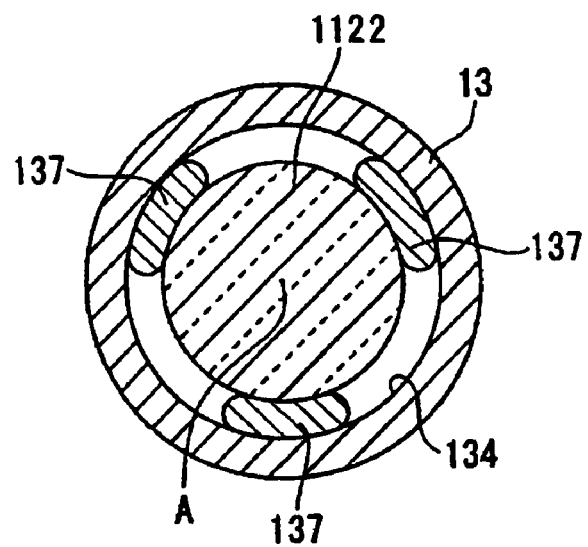
Figure 7:
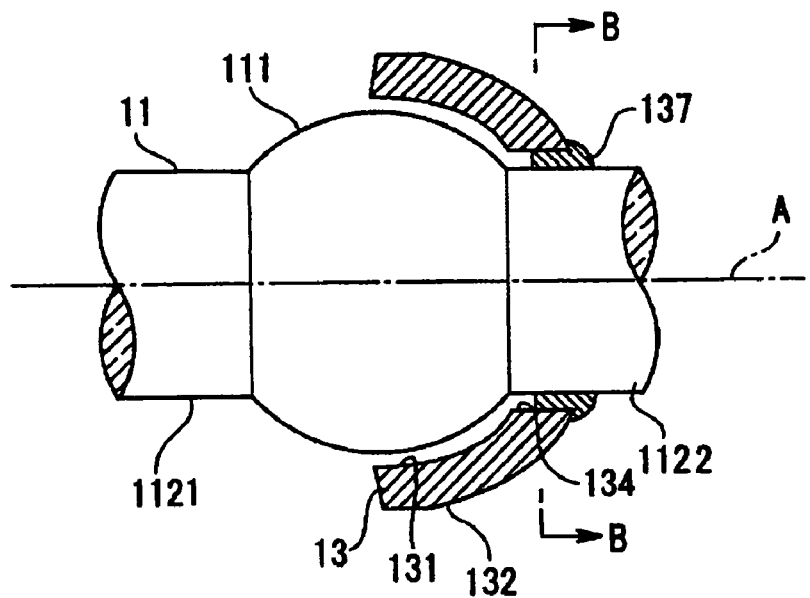
FIGS. 7(A) and 7(B) are schematics taken along the direction of the optical axis and the direction orthogonal to the optical axis, showing a state in which the adhesive agent is applied according to the first exemplary embodiment of the present invention.
Figure 7:
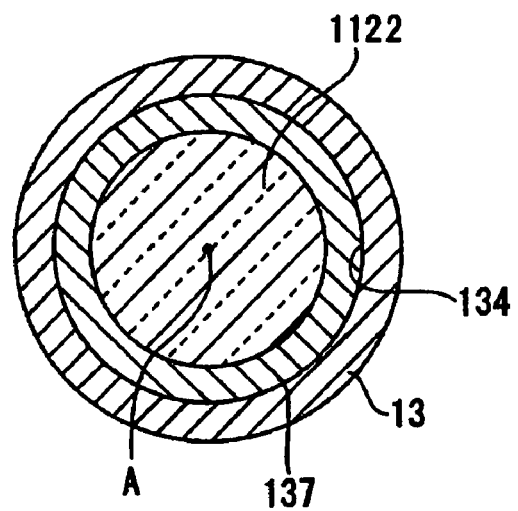

The adhesive agent 137 may be applied intermittently about the illumination axis A as shown in FIG. 6(A), (B), or may be applied entirely around the illumination axis A, as shown in FIG. 7(A), (B).

Structure of Manufacturing Device for Light Source Unit

Figure 8:
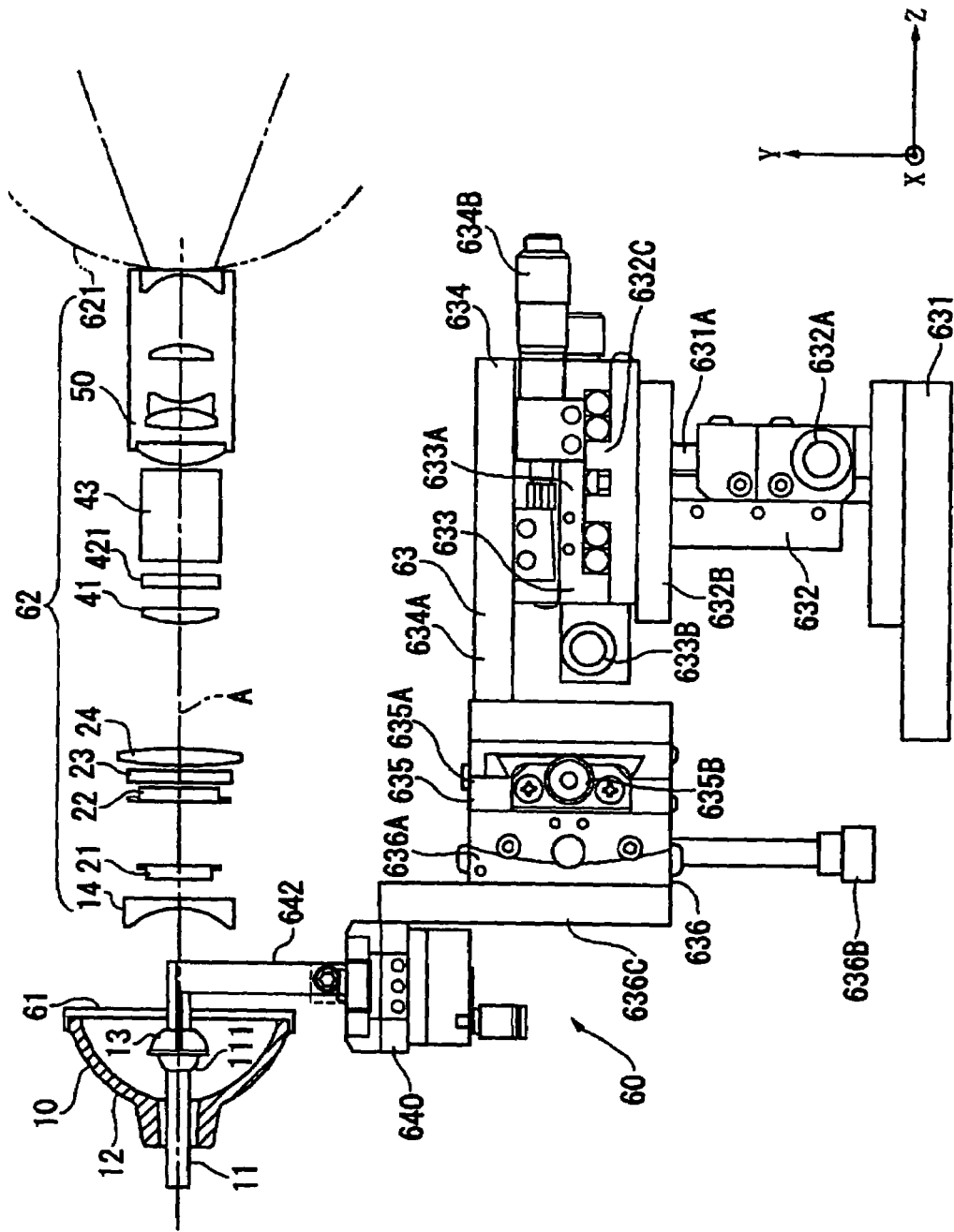
FIG. 8 is a schematic showing a manufacturing device for the light source unit according to the first exemplary embodiment of the present invention.

A manufacturing device 60 to manufacture the above-described light source unit 10 is shown in FIG. 8. The manufacturing device 60 includes a retaining frame 61, a luminous flux detecting unit 62, and a position adjusting mechanism 63.

The retaining frame 61 is a member to retain a main body of the light source unit including the elliptic reflector 12 and the light source lamp 11 built integrally therein, and is formed as a frame-shaped member having an opening corresponding to the luminous flux emitting port of the elliptic reflector 12 to retain the luminous flux emitting port of the reflector by engaging the frame end.

The luminous flux detecting unit 62 is a member to detect the luminous flux emitted from the elliptic reflector 12 when the light source lamp 11 of the light source unit 10 attached to the retaining frame 61 is turned on, and includes an optical elements which is the same as the optical elements 14, 21, 22, 23, 24, 41, 43, 50 constituting the projector 1 and a frame member 421 linearly aligned along the illumination axis A. The disposition of the optical elements 14, 21, 22, 23, 24, 41, 43, 50 are determined corresponding to the length of the optical path of green light of the projector 1. The frame member 421 includes an opening having the same shape as the image forming areas of the respective liquid crystal panels 42R, 42G, 42B of the projector 1 described above, and is disposed on the luminous flux outgoing side of the field lens.

An integrating sphere 621 is provided on the downstream side of the optical path of the projecting optical system 50, which is disposed on the last position on the downstream side, and a luminous flux passed through these optical elements 14, 21, 22, 23, 24, 41, through the opening of the frame member 421, and through the optical elements 43, 50 is measured in illumination intensity by the integrating sphere 621.

The position adjusting mechanism 63 is a mechanism to adjust the position of the secondary reflecting mirror 13 with respect to the light source lamp 11 fixed to the elliptic reflector 12 mounted to the retaining frame 61 three-dimensionally, and is adapted to be capable of adjusting the inclination of the secondary reflecting mirror 13 with respect to the direction of a Z-axis, which corresponds to the direction of emission of the luminous flux of the center axis of the luminous flux emitted from the elliptic reflector 12, the direction of an X-axis and the direction of an Y-axis which are orthogonal to the Z-axis, and a X-Y plane. The position adjusting mechanism 63 includes a base 631, a Y-axis direction adjusting unit 632, an X-axis direction adjusting unit 633, a Z-axis direction adjusting unit 634, an angular position about Y-axis adjusting unit 635, an angular position about X-axis adjusting unit 636, and a secondary reflecting mirror holder 640.

The base 631 is provided with a shaft member 631A extending in the Y-axis direction, and the shaft member 631A supports the Y-axis direction adjusting unit 632 so as to be capable of sliding freely along the direction of extension of the shaft member 631A.

The Y-axis direction adjusting unit 632, not shown, includes a pinion which meshes with a rack formed on the shaft member 631A and moves upward and downward in the Y-axis direction along the shaft member 631A when a micrometer head 632A is rotated.

The top surface of the Y-axis direction adjusting unit 632 is a table 632B, and the table 632B is provided with a rail 632C extending in the X-axis direction thereon.

The X-axis direction adjusting unit 633 is slidably mounted to the rail 632C, and is provided with a table 633A and a micrometer head 633B. The table 633A moves along the X-axis direction when the micrometer head 633B is rotated.

A rail extending in the Z-axis direction, not shown, is provided on the table 633A, and slidably supports the Z-axis direction adjusting unit 634 thereon.

The Z-axis direction adjusting unit 634 is provided with an arm 634A extending in the Z-axis direction and a micrometer head 634B. The arm 634A moves in the Z-axis direction when the micrometer head 634B is rotated.

The distal end surface of the arm 634A, not shown, is formed into an arcuate shape about the Y-axis, which is a convex surface. The angular position about Y-axis adjusting unit 635 is provided on the convex surface.

The angular position about the Y-axis adjusting unit 635 is provided with a main body 635A and a micrometer head 635B. The main body 635A rotates about the Y-axis along the convex surface when the micrometer head 635B is rotated.

Then, the distal end surface of the main body 635A is formed into an arcuate shape about the X-axis, which is a convex surface, and the angular position about X-axis adjusting unit 636 is provided on the convex surface.

The angular position about X-axis adjusting unit 636 is provided with a main body 636A and a micrometer head 636B. The main body 636A rotates about the X-axis when the micrometer head 636B is rotated.

The main body 636A is provided with the secondary reflecting mirror holder 640 at the distal end thereof via an arm 636C.

Figure 9:
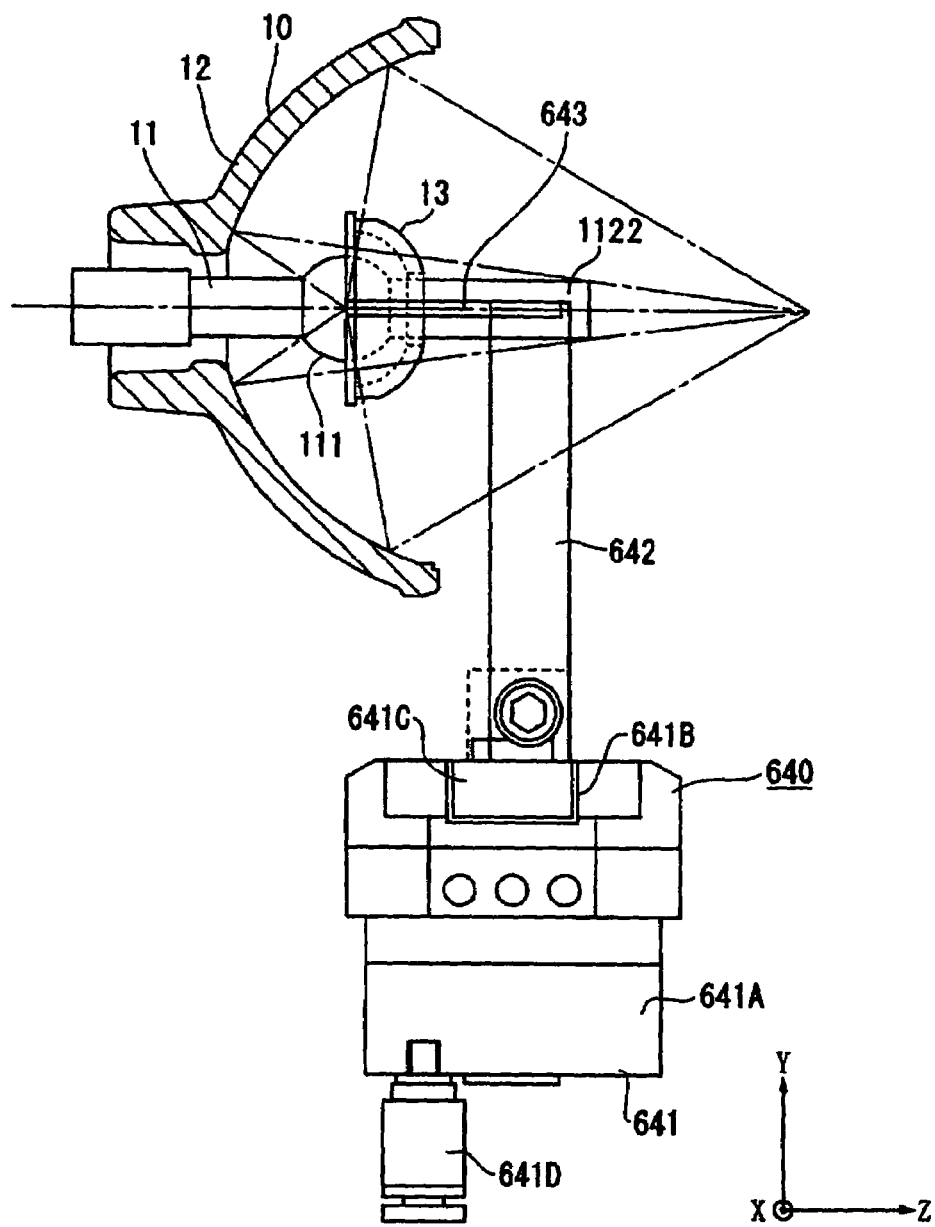
FIG. 9 is a schematic showing the structure of a secondary reflecting mirror holder constituting the manufacturing device according to the first exemplary embodiment of the present invention.
Figure 10:
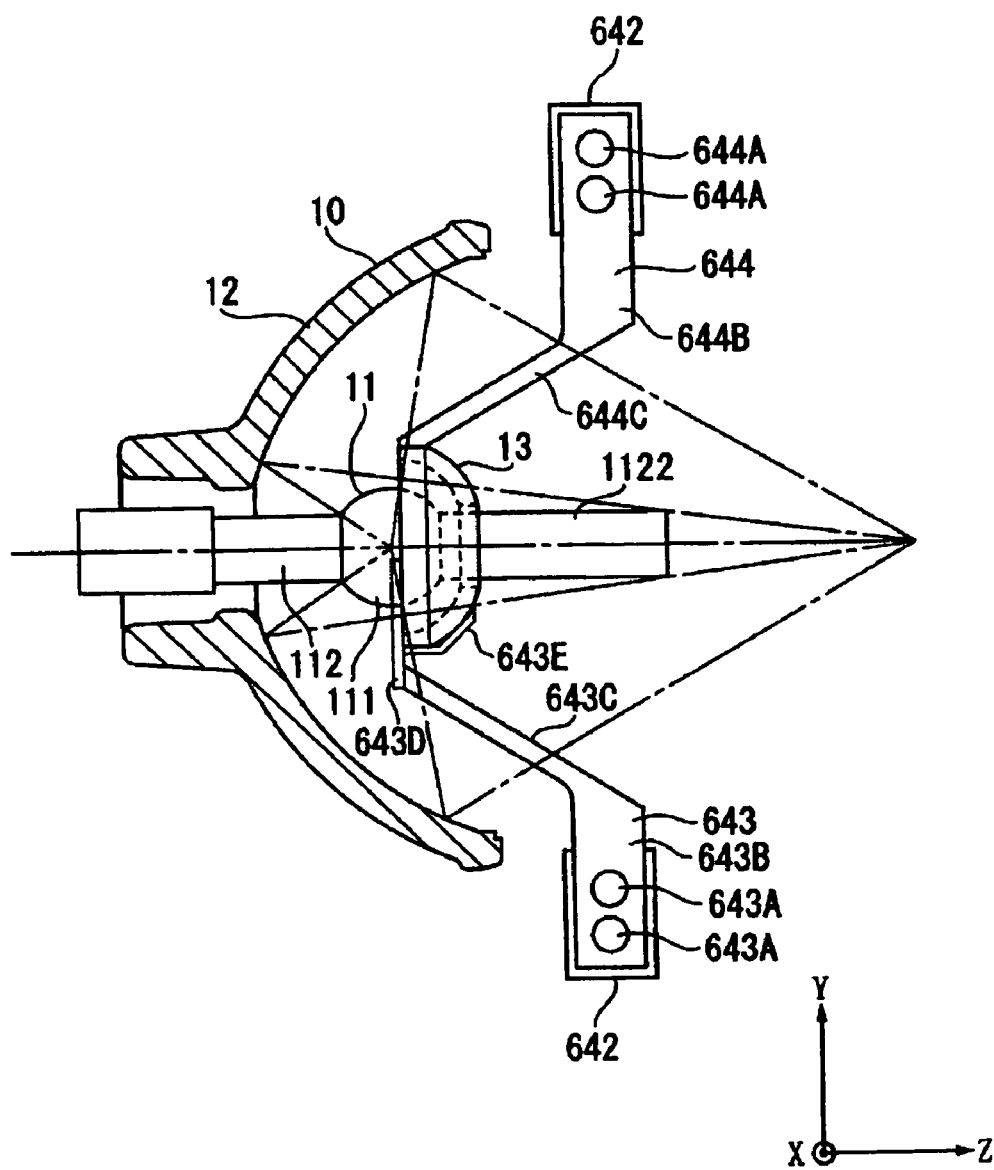
FIG. 10 is a schematic showing the structure of the secondary reflecting mirror holder constituting the manufacturing device according to the first exemplary embodiment of the present invention.

As shown in FIG. 9 and FIG. 10, the secondary reflecting mirror holder 640 is a member to hold and position the secondary reflecting mirror 13 at the light emitting section 111 of the light source lamp 11, and includes a base 641, a pair of shaft members 642, and grip members 643, 644.

The base 641 is provided with a main body 641A to be mounted to the arm 636C of the angular position about X-axis adjusting unit 636. The main body 641A is formed with a groove-shaped rail 641B extending in the X-axis direction on the top surface thereof. The main body 641A is provided with a joint 641D to supply air on the lower surface thereof.

Two sliding pieces 641C are provided on the rail 641B so as to be capable of sliding in the X-axis direction in FIG. 9 and FIG. 10, and the respective sliding pieces 641C slide toward and away from each other.

The pair of shaft members 642 are supporting members to support the grip members 643, 644 respectively, and are column shaped members projecting upright on the pair of sliding pieces 641C respectively. The pair of shaft members 642 are formed with two each of female threaded holes, not shown in FIG. 9 and FIG. 10, on the top surfaces thereof.

The grip members 643, 644 are fixed respectively on the top surfaces of the pair of shaft members 642 at the proximal ends thereof, as shown in FIG. 10, and are machined metal plate members formed with gripping surfaces at the bent distal ends thereof. The proximal portions of the respective grip members 643, 644 are formed with holes 643A, 644A for being fixed to the female threaded holes on the shaft members 642.

Figure 11:
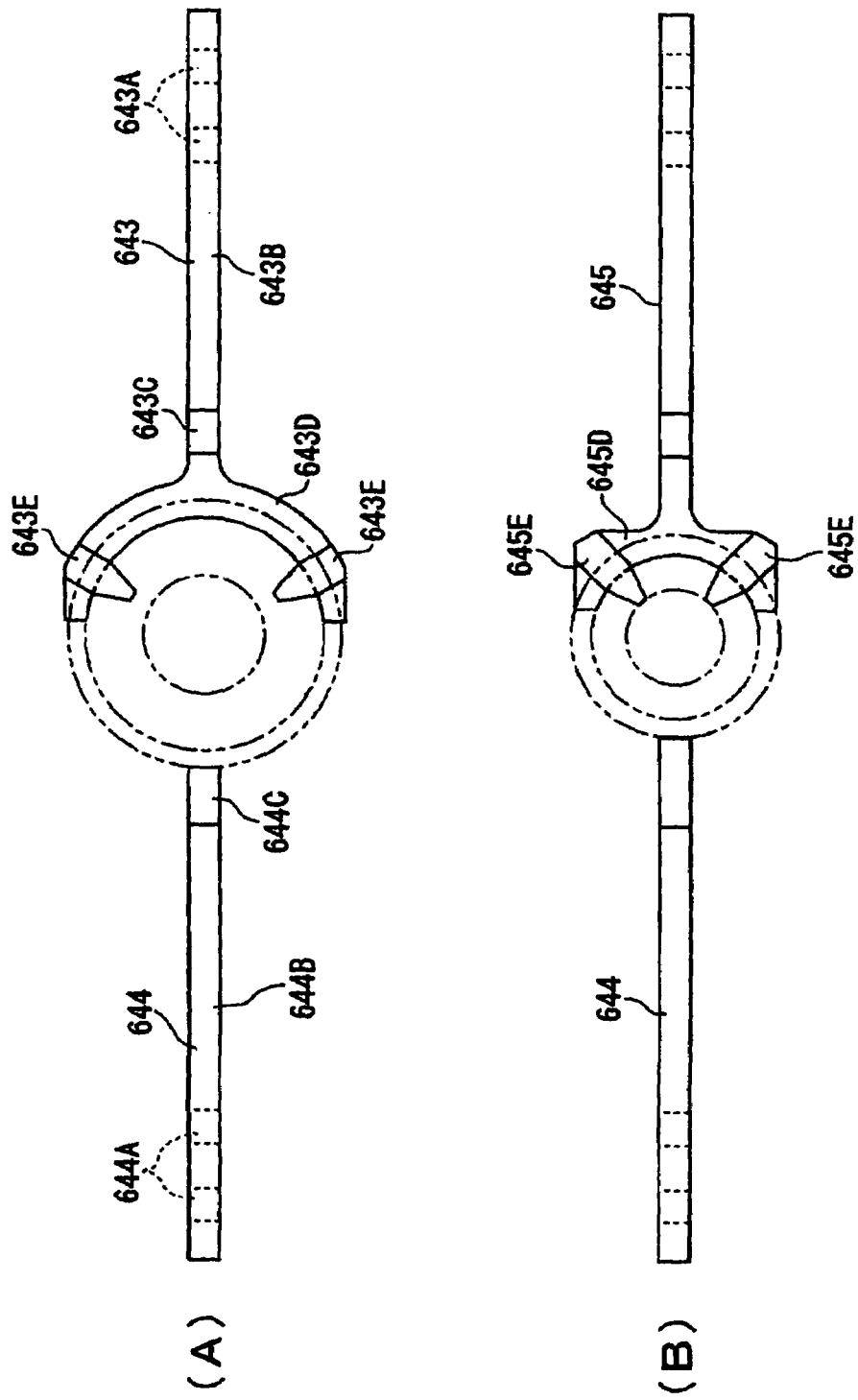
FIG. 11 is a schematic showing the shape of a grip member of the secondary reflecting mirror holder according to the first exemplary embodiment of the present invention.
Figure 12:
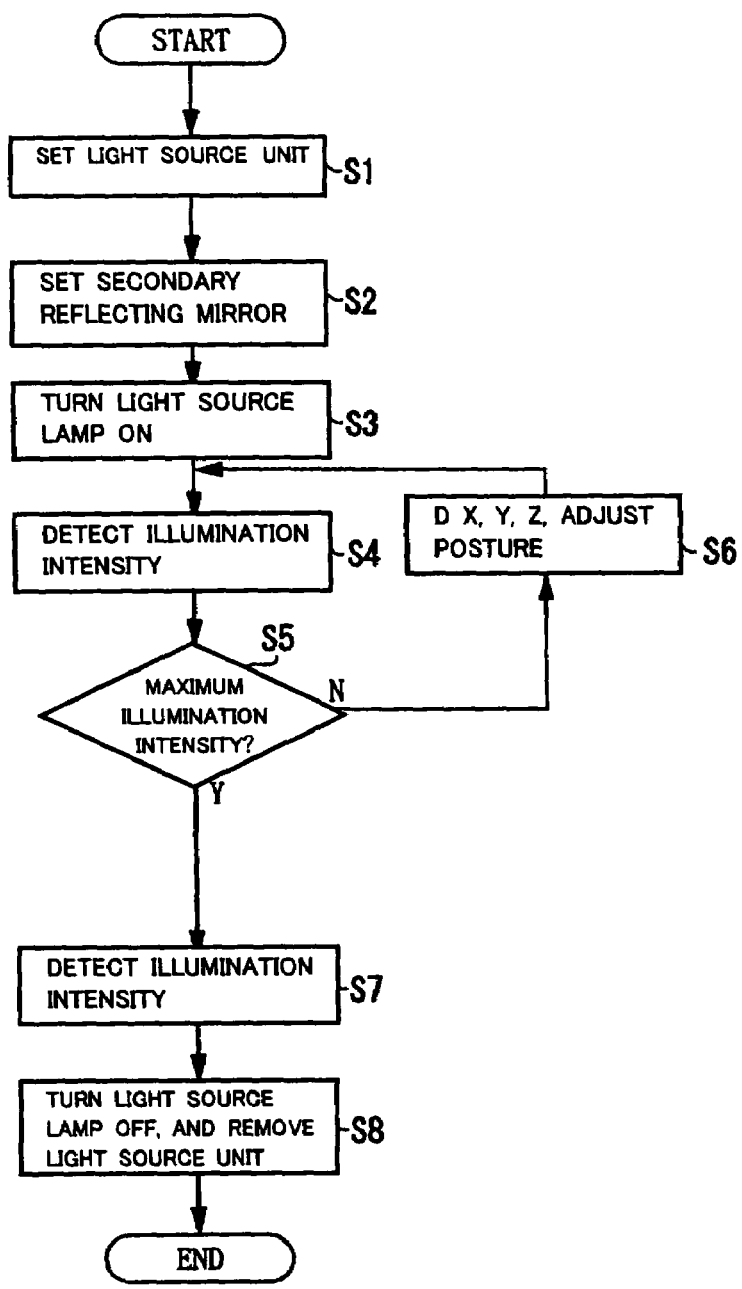
FIG. 12 is a flowchart showing a method of manufacturing the light source unit according to the first exemplary embodiment of the present invention.

The grip member 643 is, as shown in FIG. 10 and FIG. 11(A), provided with a proximal portion 643B and a bent portion 643C. The bent portion 643C is formed with a holding surface 643D to hold the end surface of the luminous flux emitting port of the secondary reflecting mirror 13 and two claws 643E which project outward from the holding surface 643D and come into abutment with the outer peripheral surface of the secondary reflecting mirror 13 at the distal end thereof.

The grip members 643, being configured as described above, may be configured into a plurality of types according to the size of the secondary reflecting mirror 13. For example, in order to allow the secondary reflecting mirror to have a smaller diameter to be gripped than that in the present exemplary embodiment, a grip member 645 may be modified into to have a smaller diameter holding surface 645D at the distal end and have a claw 645E of different shape as shown in FIG. 11(B), so that it can grip the secondary reflecting mirror 13 of various diameters.

The grip member 644 includes a proximal portion 644B and a bent portion 644C as in the case of the grip member 643. However, the distal portions thereof are flat so as to follow the shape of the outer peripheral surface of the opening on the secondary reflecting mirror 13.

The secondary reflecting mirror 13 is held by the above-described grip members 643, 644 by moving the sliding pieces 641C of the main body 641A toward each other, holding the luminous flux emitting port of the secondary reflecting mirror 13 by the holding surface 643D of the holding member 643 as shown in FIG. 10, and supporting the outer surface of the secondary reflecting mirror by the claws 643E.

In this case, the outer peripheral edge of the luminous flux emitting port of the secondary reflecting mirror 13 is held by the distal surface of the grip member 644, whereby the secondary reflecting mirror 13 is gripped by the grip members 643, 644.

Method of Manufacturing Light Source Unit

Subsequently, using the manufacturing device 60 described above, a procedure to manufacture the light source unit 10 will be described based on a flowchart shown in FIG. 2.

Step S1 Set the integrated light source lamp 11 and the elliptic reflector 12 before mounting the secondary reflecting mirror 13 into the retaining frame 61 of the manufacturing device 60.

Step S2 Set the secondary reflecting mirror 13 to the grip members 643, 644 of the secondary reflecting mirror holder 640.

Step S3 Turn the light source lamp 11 on and allow a luminous flux to be emitted form the elliptic reflector 12.

Step S4 Start detection of illumination intensity by the integrating sphere 621 of the luminous flux detecting unit 62.

Step S5 Determine whether or not the maximum illumination intensity of the luminous flux from the light source unit 10 detected by the integrating sphere 621 is achieved.

Step S6 When it is determined that the secondary reflecting mirror 13 is not at the position where the maximum illumination intensity is achieved, operate the Y-axis direction adjusting unit 632, the X-axis direction adjusting unit 633, the Z-axis direction adjusting unit 634, the angular position about Y-axis adjusting unit 635, the angular position about X-axis adjusting unit of the position adjusting mechanism 63 to adjust the posture of the secondary reflecting mirror 13 in the X-, Y-, and Z-axis directions.

Figure 13:
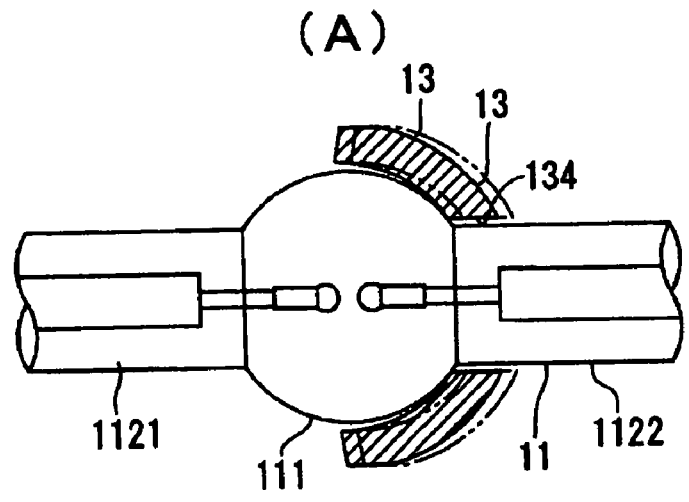
FIGS. 13(A)-13(C) are a schematics showing a method of applying the adhesive agent according to the first exemplary embodiment of the present invention.
Figure 13:
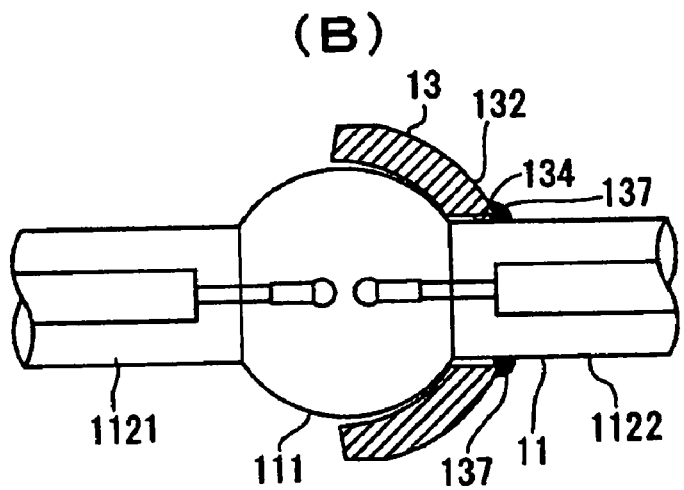
Figure 13:
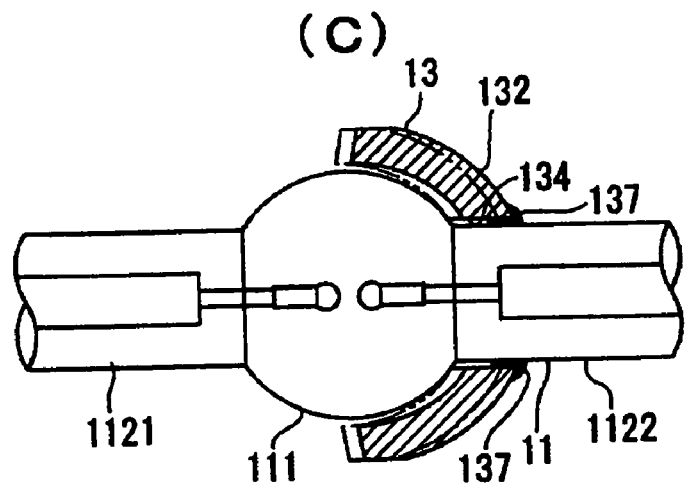

Step S7 When the illumination intensity is determined to be the maximum, as shown in FIG. 13, move the secondary reflecting mirror 13 first from the position where the maximum illumination intensity is achieved toward the light emitting section 111 (FIG. 13(A)), apply an adhesive agent on the end surface on the side of the outer peripheral surface 132 of the adhering surface 134 of the secondary reflecting mirror 13 (FIG. 13(B)), then move the secondary reflecting mirror 13 to equally distribute the adhesive agent between the adhering surface 134 and the outer peripheral surface of the sealed section 1122, and restore the secondary reflecting mirror 13 to the position where the maximum illumination intensity is obtained so that the adhesive agent is mounded on the outer peripheral surface 132 of the secondary reflecting mirror 13 to cure the adhesive agent (FIG. 13(C)).

Step S8 When the adhesive agent is cured, turn the light source lamp 11 off, and remove the light source unit 10 from the retaining frame 61 and the secondary reflecting mirror holder 640.

Effect of the Exemplary Embodiment

According to the present exemplary embodiment described above, the following and/or other effects are achieved.

(1) Since the secondary reflecting mirror 13 is provided separately from the light source lamp 11, the reflecting film does not depend on the external shape of the light emitting section 111 as in the case of depositing the reflecting film on the light emitting section 111 of the light source lamp 11. Therefore, since the reflecting surface of the secondary reflecting mirror 13 can be formed into a shape which realizes an effective use of light reflected by the secondary reflecting mirror 13 in the elliptic reflector 12 and, in addition, the positional adjustment can be performed among the light source lamp 11, the secondary reflecting mirror 13, and elliptic reflector 12, luminous efficiency of light from the light source can be enhanced in the light source unit 10 using the secondary reflecting mirror 13.

(2) Since the outer peripheral surface 132 of the secondary reflecting mirror 13 is accommodated within the circular cone shown by the boundaries L3, L4 connecting between a second focal position L2 of the elliptic reflector 12 and the distal end of the sealed section 1122 on the distal (front) side of the light source lamp 11, light reflected by the elliptic reflector 12 is not intercepted by the outer peripheral surface 132 of the secondary reflecting mirror 13 and the front sealed section 1122. Hence the luminous efficiency of light from the light source can be enhanced.

(3) Since the secondary reflecting mirror 13 can be formed by polishing the cylindrical member 136 and hence accuracy of the curvature of the reflecting surface 131, for example, can be enhanced, the luminous efficiency of light form the light source can further be enhanced.

(4) Since the end surface of the secondary reflecting mirror 13 on the proximal (rear) side of the illumination flux emitting direction is formed into the inclined surface 135, light emitted from the center of light emission of the arc image D of the light emitting section 111 and to be directly reflected on the elliptic reflector 12 can be reflected on the elliptic reflector 12 without being intercepted by the end surface of the secondary reflecting mirror 13 on the proximal (rear) side of the illumination flux emitting direction. Therefore, the,luminous efficiency of light from the light source can be enhanced.

(5) Since the outer peripheral surface 132 is polished so as to follow the spherically polished portion of the reflecting surface 131 of the secondary reflecting mirror 13, the surfaced accuracy of the outer peripheral surface 132 is ensured, and interception of light by the secondary reflecting mirror 13 may be reliably reduced or prevented. In addition, by polishing the reflecting surface 131 and the outer peripheral surface 132, material is hardly subjected to a mechanical load when machining the cylindrical member 136, whereby compact, light-weight, and low-profile secondary reflecting mirror 13 is achieved.

(6) In order to fix the secondary reflecting mirror 13 to the front sealed section 1122 of the light source lamp 11, by applying the adhesive agent entirely between the adhering surface 134 and the outer peripheral surface of the sealed section 1122 without forming a gap, the secondary reflecting mirror 13 can be firmly fixed to the light source lamp 11. By applying the adhesive agent intermittently at three or four places, there are formed gaps at other places, whereby they can be utilized as air flow paths to cool the heated light emitting section 111, which is advantageous to cool the light emitting section 111.

(7) Since the light source unit 10 is employed in the projector 1, the projector 1 in which the effects described above are achieved can be obtained, and downsizing and increase in brightness are achieved in the projector 1.

(8) Since the secondary reflecting mirror 13 can be fixed to the light source lamp 11 at the relative position where the optimal illumination intensity is obtained by adjusting the position of the secondary reflecting mirror 13 so as to obtain the optimal illumination intensity while detecting the luminous intensities of the luminous flux emitted from the light source lamp 11 and reflected directly on the elliptic reflector 12 and luminous flux reflected on the elliptic reflector 12 via the secondary reflecting mirror 13, the light source unit 10 in which the luminous efficiency of light from the light source is enhanced can reliably be manufactured.

(9) When applying the adhesive agent between the adhering surface 134 of the secondary reflecting mirror 13 and the outer peripheral surface of the front sealed section 1122 of the light source lamp 11 the secondary reflecting mirror 13 is moved from the position where the maximum illumination intensity is achieved, toward the light emitting section 111. Then the adhesive agent is applied on the end surface of the adhering surface 134 on the side of the outer peripheral surface 132 before restoring the secondary reflecting mirror 13 to the position where the maximum illumination intensity is achieved again, so that the adhesive agent is evenly distributed between the adhering surface 134 and the reflecting surface 132. Thus, the adhesive agent can be sufficiently distributed evenly between the adhering surface 134 and the outer peripheral surface of the sealed section 1122 where the gap is small. In addition, even the adhesive agent which is cured in a short time can be sufficiently distributed evenly between the adhering surface 134 and the outer peripheral surface of the sealed section 1122 within a short time. Therefore, the secondary reflecting mirror 13 can be firmly fixed to the sealed section 1122 at the position where the maximum illumination intensity is achieved, whereby the light source unit 10 with the high luminous efficiency can be manufactured.

(10) Since the adhesive agent 137 is applied so as to be mounded on the outside of the outer peripheral surface 132 of the secondary reflecting mirror 13, after the adhesive agent 137 is cured, the secondary reflecting mirror 13 can be restricted from moving toward the front (right in FIG. 5(A)) of the center axis of the luminous flux emitted from the elliptic reflector 12 in the direction of emission of the luminous flux with respect to the light source lamp 11. Therefore, lowering of the illumination intensity of illumination emitted form the light source unit 10 can be reduced or prevented.

2 Second Exemplary Embodiment

Subsequently, a second exemplary embodiment of the present invention will be described. In the description below, parts and members which have already been described are represented by the identical numerals and the description will be omitted or simplified.

In the first exemplary embodiment described above, the outer peripheral surface 132 of the secondary reflecting mirror 13 is a curved surface so as to follow the curvature of the reflecting surface 131, and the secondary reflecting mirror 13 is formed with the reflecting surface 131 and the outer peripheral surface 132 by polishing the cylindrical member 136.

Figure 14:
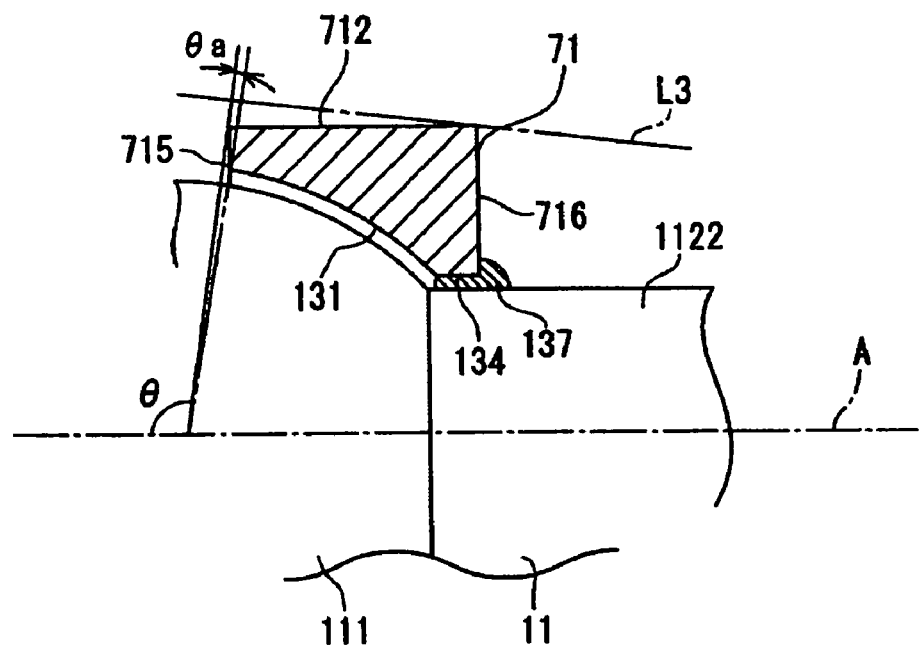
FIGS. 14(A) and 14(B) are schematics showing the structure of a principal portion of the secondary reflecting mirror according to a second exemplary embodiment of the present invention.
Figure 14:
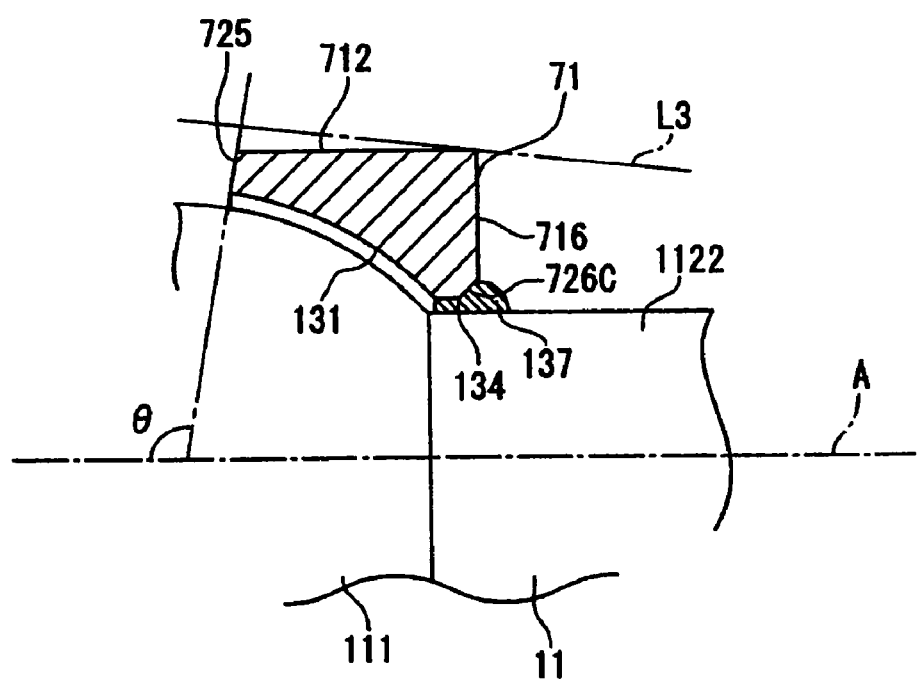
Figure 15:
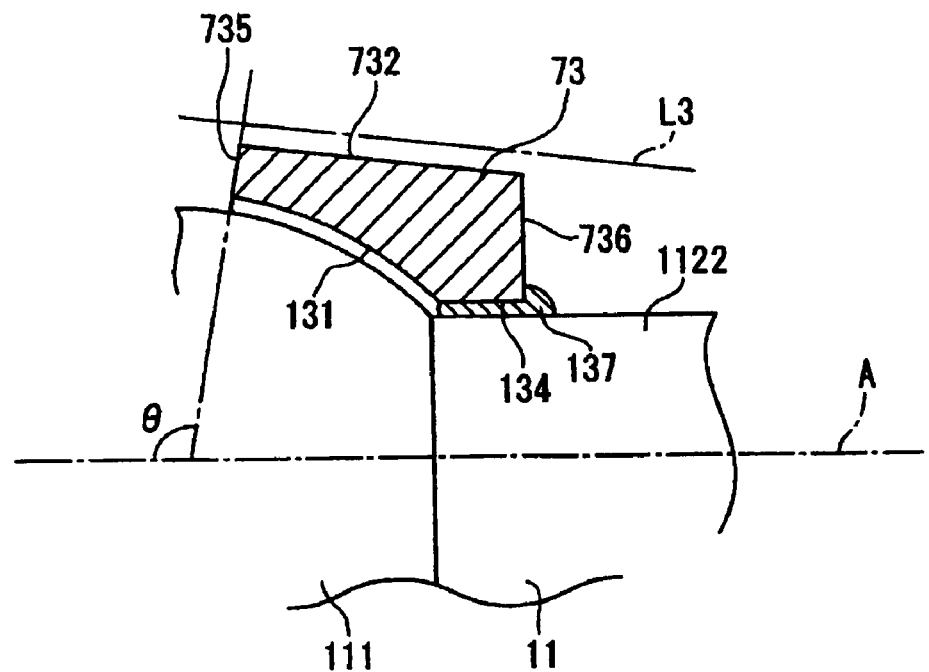
FIGS. 15(A) and 15(B) are schematics showing the structure of the principal portion of the secondary reflecting mirror according to the second exemplary embodiment of the present invention.
Figure 15:
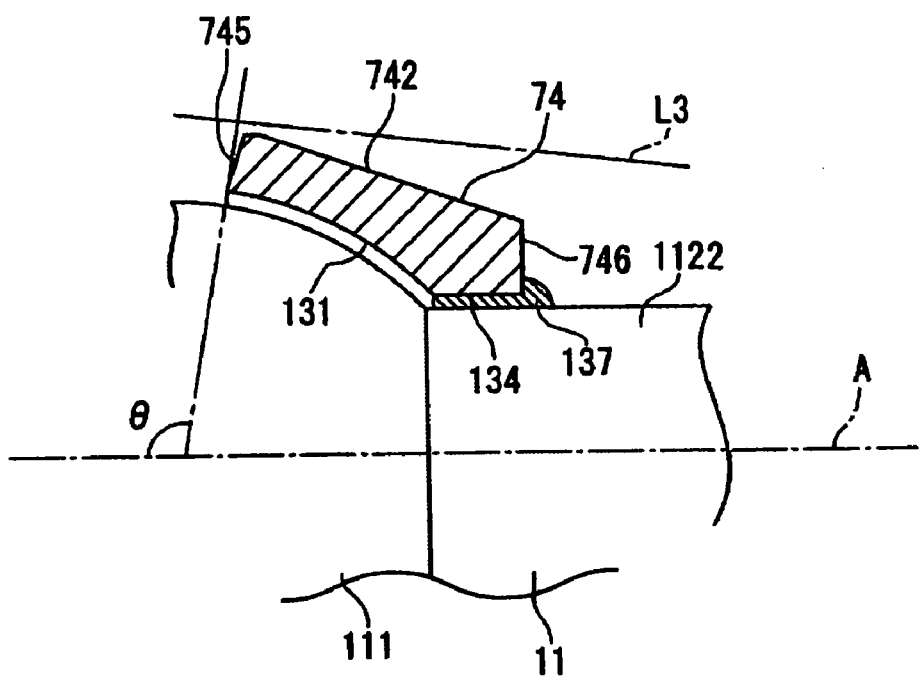

In contrast, secondary reflecting mirrors 71-74 according to the second exemplary embodiment are, as shown in FIG. 14 and FIG. 15, different in that outer peripheral surfaces 712, 722, 732, 742 are of a substantially cylindrical shape or of a substantially truncated conical shape. The reflecting surface 131 of each of the secondary reflecting mirrors 71-74 is formed by polishing the cylindrical member 136. But the outer peripheral surfaces 712, 722, 732, 742 are not machined at all or formed only by a simple cutting operation.

The secondary reflecting mirror 71 according to the second exemplary embodiment includes, as shown in FIG. 14(A), the cylindrical outer peripheral surface 712, a proximal end surface 715 being an end surface of the secondary reflecting mirror 71 on the side where the reflecting surface 131 is formed and being vertical to the outer peripheral surface 712, a distal end surface 716 being an end surface on the opposite side from the proximal end surface 715, and the reflecting surface 131 having a center of curvature at the center axis of the cylindrical outer peripheral surface 712, and has opposed cross sections being substantially trapezoidal shape. The secondary reflecting mirror 71 can be manufactured by machining the cylindrical member 136, and is formed only by machining the reflecting surface 131 without machining the outer peripheral surface and the end surface of the cylindrical member 136. Thus the outer peripheral surface 712, and the end surfaces 715, 716 are cut surfaces of the base material.

On the distal (front) side of the secondary reflecting mirror 71 of the illumination axis A in the direction of emission of the luminous flux, the end of the distal end surface 716 and the outer peripheral surface 712 are accommodated within the circular cone defined by the boundaries L3, L4. Since the proximal end surface 715 is an end surface vertical to the illumination axis A, the luminous flux emitted from the light emitting section 111 in the range of an angle θa shown in FIG. 14(A) is intercepted by the proximal end surface 715. However, the proximal end surface 715 is small so as to reduce or prevent the luminous efficiency of light emitted from the light emitting section 111 from lowering.

The distal end surface 715 of the secondary reflecting mirror 71 may be formed into an inclined surface 725 which matches the angle θ formed between the proximal (rear) side of the illumination axis A in the direction of emission of the luminous flux and the luminous flux radiated from the light emitting section 111 and directly entering the elliptic reflector 12, as shown in FIG. 14(B), as in the case of the inclined surface 135 in the first exemplary embodiment.

Furthermore, the secondary reflecting mirror 71 is chamfered at the meeting point between the distal end surface 716 and the adhering surface 134 so that a tapered surface 726C is formed.

The tapered surface 726C is formed so that the adhesive agent can easily be injected between the outer peripheral surface of the sealed section 112 and the adhering surface 134.

As shown in FIG. 15(A), the secondary reflecting mirror 73 has a distal end surface 736 and a proximal end surface 735 being the same as the distal end surface 725 and a proximal end surface 726 of the secondary reflecting mirror 72. The outer peripheral surface 732 has a truncated conical shape accommodated within the circular cone indicated by the boundaries L3 and L4 and defined by the straight lines substantially parallel to the boundaries L3 and L4. The angle of inclination of the outer peripheral surface 73 with respect to the illumination axis A and the angle of inclination of the boundaries L3 or L4 with respect to the illumination axis A are substantially the same. The secondary reflecting mirror 73 can be manufactured by machining the cylindrical member. The reflecting surface 131 of the secondary reflecting mirror 73 is formed by polishing and the outer peripheral surface 732 is formed by cutting entirely the side surface of the substantially truncated conical shape. In this shape, the length of the secondary reflecting mirror 73 in the direction of the illumination axis A can be increased. Hence the sufficient length of the adhering surface 134 can be secured, so that the area of the adhering surface can be increased.

As shown in FIG. 15(B), the secondary reflecting mirror 74 has a distal end surface 746 which is the same as the distal end surface 736 of the secondary reflecting mirror 73, and a proximal end surface 745 is an inclined surface such that an angle of inclination between the proximal (rear) side of the illumination axis A in the direction of emission of the luminous flux and the proximal end surface 745 is larger than the angle θ, so that interception of light can be reduced or prevented reliably. The angle of inclination of the outer peripheral surface 742 of the secondary reflecting mirror 74 with respect to the illumination axis A is steeper, or larger, than the angle of inclination of the boundary L3 or L4 with respect to the illumination axis A, so that the gap, between the circular cone shown by the boundaries L3 and L4 and the outer peripheral surface 742, is increased. The secondary reflecting mirror 74 has a shape in which the outer peripheral surface 742 thereof can hardly be projected from the circular cone shown by the boundaries L3 and 14 even when the position of the secondary reflecting mirror 74 is adjusted with respect to the light source lamp 11. The secondary reflecting mirror 74 can be manufactured by machining the cylindrical member. The reflecting surface 131 of the secondary reflecting mirror 74 is formed by polishing. The outer peripheral surface 742 is formed by entirely cutting the side surface of the substantially truncated conical shape.

The light source unit, provided with the secondary reflecting mirrors 71-74, can be manufactured in the same manner as the method of manufacturing in the first exemplary embodiment using the manufacturing device 60 in the first exemplary embodiment.

According to the second exemplary embodiment described above, the following effects in addition to the effects (1) to (4), (6) to (10) described in the aforementioned exemplary embodiment, and other effects, are achieved.

(11) By forming the outer peripheral surfaces 732, 742 into a truncated conical shape, as in the case of the secondary reflecting mirrors 73, 74, interception of light emitted from the elliptic reflector 12 can be reduced or prevented. The luminous efficiency of light emitted from the light source lamp 11 can further be enhanced, so that illumination having a high illumination intensity can be emitted from the light source unit.

In this structure, since the sizes of the secondary reflecting mirrors 73, 74 in the direction of the illumination axis A can be increased to obtain a larger area for the adhering surface, the adhesive strength of the secondary reflecting mirrors 73, 74 with respect to the light source lamp 11 can be enhanced. Therefore, the likelihood that the illumination intensity of illumination emitted from the light source unit 10 is lowered can be reduced or eliminated.

(12) In the case of the secondary reflecting mirror 71, since the outer peripheral portion is not machined, manufacturing of the secondary reflecting mirror 71 can further be simplified.

(13) In the case of the secondary reflecting mirror 71, since the meeting point between the distal end surface and the adhering surface, which is a portion to which the adhesive agent is applied, is chamfered and hence is formed with the tapered surface 726C, the adhesive agent can be injected between the adhering surface 134 and the outer peripheral surface of the sealed section 1122 easily, and hence the adhesive strength can further be enhanced. Therefore, the likelihood that the illumination intensity of illumination emitted from the light source unit 10 is lowered can be reduced or eliminated.

3 Third Exemplary Embodiment

Subsequently, a third exemplary embodiment of the present invention will be described. In the description below, parts and members which have already been described are represented by the identical numerals and the description will be omitted or simplified.

In the case of the secondary reflecting mirror 13 according to the first exemplary embodiment and the secondary reflecting mirrors 71, 73, 74 according to the second exemplary embodiment, the meeting points between the outer peripheral surfaces 132, 712, 732, 742 and the adhering surface 134 are not machined at all, as shown in FIG. 4, FIG. 14, and FIG. 15.

Figure 16:
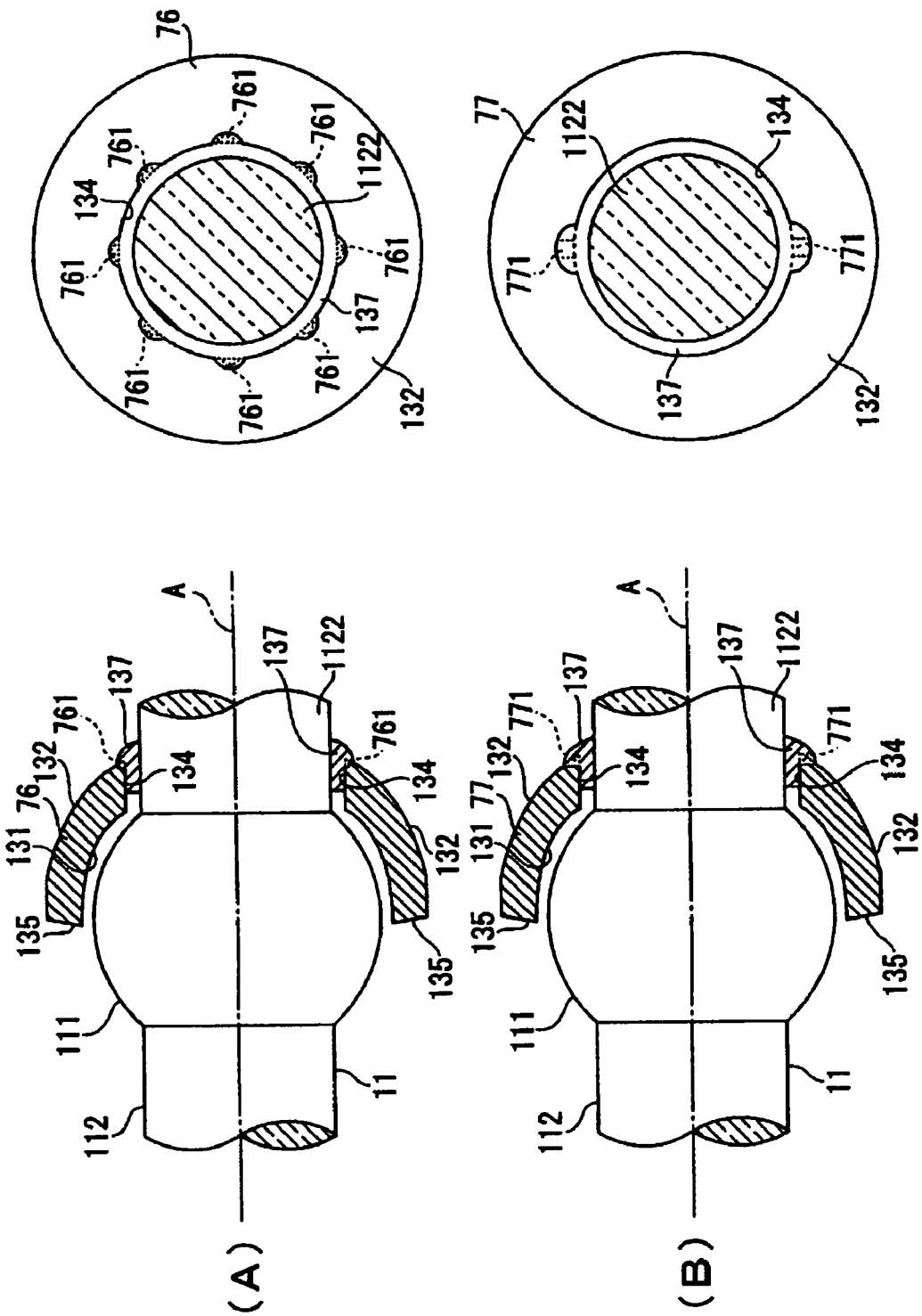
FIGS. 16(A) and 16(B) are schematics showing the structure of the principal portion of the secondary reflecting mirror constituting the light source unit according to a third exemplary embodiment of the present invention.

In contrast, as shown in FIG. 16(A), the secondary reflecting mirror 76 according to the third exemplary embodiment is different in that a plurality of notched grooves 761 are formed along the ridged line at the meeting point between the outer peripheral surface 132 and the adhering surface 134.

The notched grooves 761 are formed so as to extend outward from the peripheral edge of the opening to insert the sealed section 1122 of the secondary reflecting mirror 76, and the shape of each notched groove 761 is substantially triangular when viewed from the front.

Such notched grooves 761 can be formed by generating intentionally chipping of 0.1 mm or larger along the peripheral edge of the opening on the outer peripheral surface 132 when machining the opening on the secondary reflecting mirror 76. Although the nothced grooves 761 are formed at eight positions so as to extend outward from the opening in FIG. 16(A), the positions and the number of the notched grooves 761 may be varied as needed depending on the quality of the adhesive agent 137.

In addition to the notched grooves 761 by chipping, the secondary reflecting mirror 77 having grooves 771 formed along the peripheral edge of the opening on the outer peripheral surface 132 by grinding or the like, may also be employed, as shown in FIG. 16(B).

The light source unit provided with the secondary reflecting mirrors 76 and 77 may be manufactured in the same manner as the method of manufacturing in the first exemplary embodiment using the manufacturing device 60 in the first exemplary embodiment.

However, when applying the adhesive agent 137 of silica/alumina between the adhering surface 134 and the outer peripheral surface of the sealed section 1122, the adhesive agent is applied so as to be mounded on the outer peripheral surface 132 on the outside of the opening so that the adhesive agent 137 is filled also within the respective notched grooves 761 or the grooves 771 to achieve fixation.

According to the secondary reflecting mirrors 76 and 77 of the third exemplary embodiment, the following effects in addition to the effects described in (1) to (10) are achieved.

(14) Since the notched grooves 761 or the grooves 771 are formed along the peripheral edges of the opening on the secondary reflecting mirrors 76, 77, and hence the adhesive agent 137 can be filled in the notched grooves 761 and the grooves 771, the likelihood that the secondary reflecting mirrors 76, 77 rotate with respect to the light source lamp 11 after the adhesive agent 137 is cured can be reduced or eliminated, so that displacement of the secondary reflecting mirrors 76, 77, which have been positioned with respect to the light source lamp 11, after the adhesive agent 137 is cured may be reduced or prevented. Therefore, the likelihood that the illumination intensity of illumination emitted from the light source unit 10 is lowered may be reduced or eliminated.

4 Fourth Exemplary Embodiment

A fourth exemplary embodiment of the present invention will now be described. In the description below, parts and members which have already been described are represented by the identical numerals and the description will be omitted or simplified.

As described above, the secondary reflecting mirror 13 according to the first exemplary embodiment has the outer peripheral surface 132 being a curved surface so as to follow the curvature of the reflecting surface 131. The outer peripheral surface 132 is polished so as to follow the reflecting surface 131 and the thickness thereof are substantially uniform (FIG. 4(B)).

In contrast, a secondary reflecting mirror 81 according to the present exemplary embodiment is different in cross-sectional shape.

Also, when depositing and forming the dielectric multi-layer film on the reflecting surface, the preparation as described later is performed.

Figure 17:
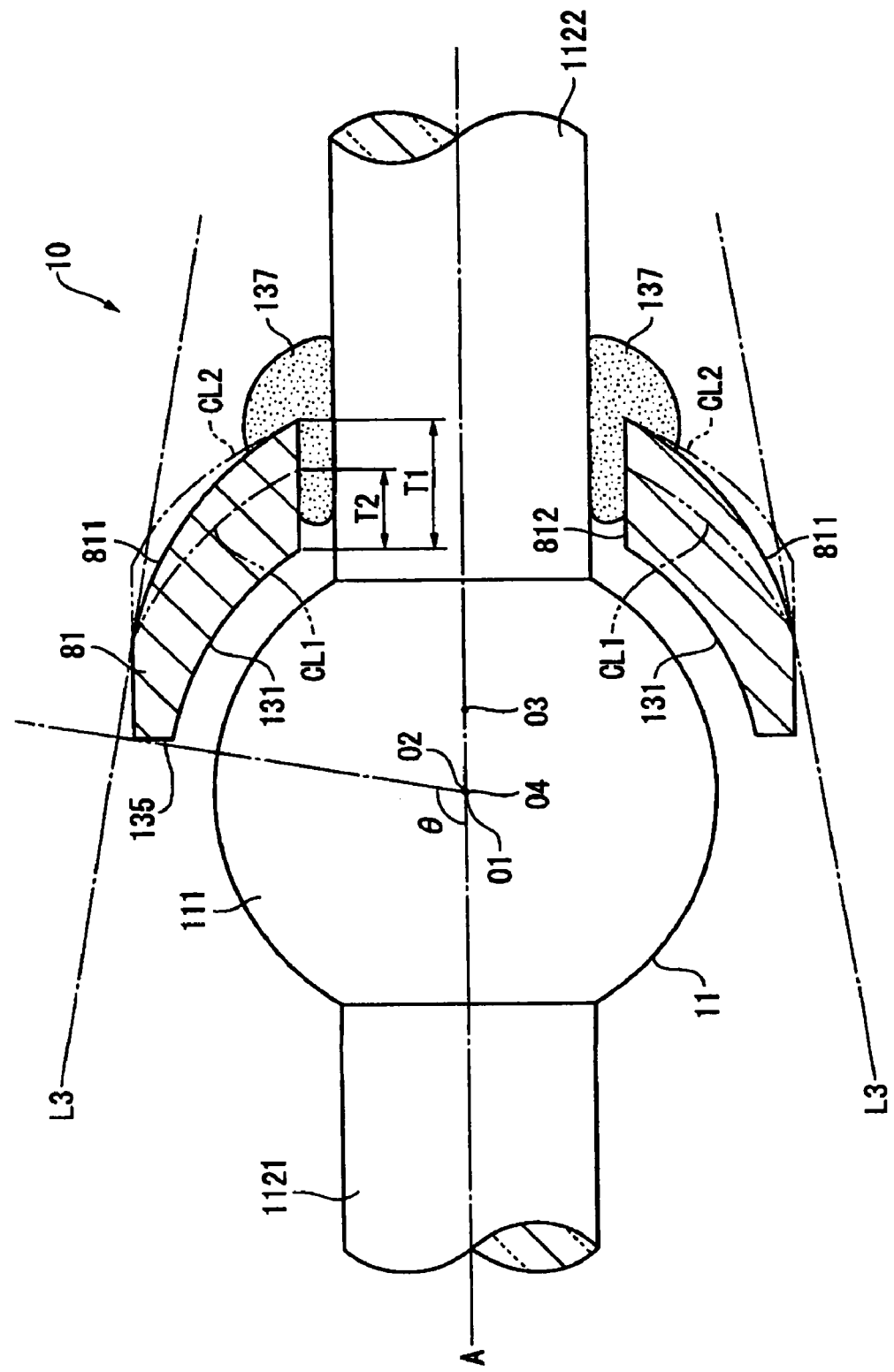
FIG. 17 is a schematic showing the structure of the principal portion of the secondary reflecting mirror constituting the light source unit according to a fourth exemplary embodiment of the present invention.

In the secondary reflecting mirror 81, as shown in FIG. 17, both of the reflecting surface 131 and an outer peripheral surface 811 are spherical surfaces. The portion where an adhering surface 812 is to be mounted to the front sealed section 1122 is formed having a larger thickness in comparison with the end where the reflecting surface 131, which comes into contact with the light emitting section 111, is formed. Therefore the area of the adhering surface 812 is large.

Such a difference in thickness results from the fact that the center O3 of curvature of the outer peripheral surface 811 and the center O1 of curvature of the reflecting surface 131 are displaced from each other on the illumination axis A.

The secondary reflecting mirror 81, as described above, almost occupies the space defined by the circular cone (See also FIG. 2) shown by the above-described boundaries L3 and L4 and the light source lamp 11.

Here, although the distance between the center O3 of curvature of the outer peripheral surface 811 and the center O1 of curvature of the reflecting surface 131 varies depending on the shape of the secondary reflecting mirror 81 or the light source lamp 11, it is set to 1.7 mm in the present exemplary embodiment.

Figure 29:
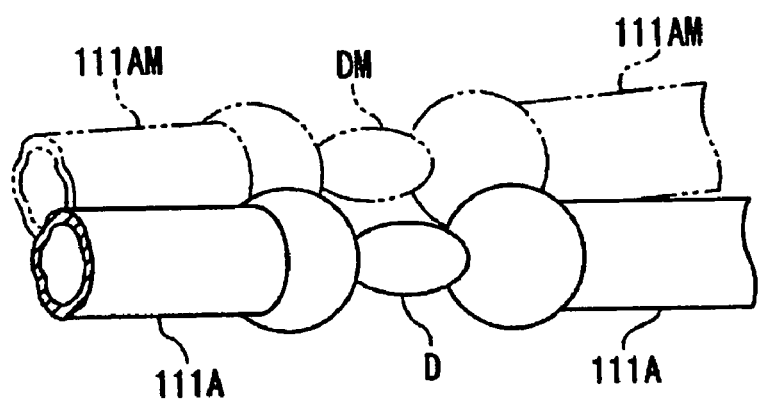
FIGS. 29(A) and 29(C) are schematics showing a procedure of determination of the optimal value for the amount of displacement between an arc image and a reflected arc image according to the eleventh exemplary embodiment of the present invention.
Figure 29:
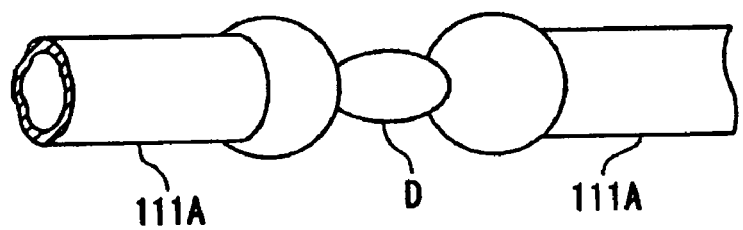
Figure 29:
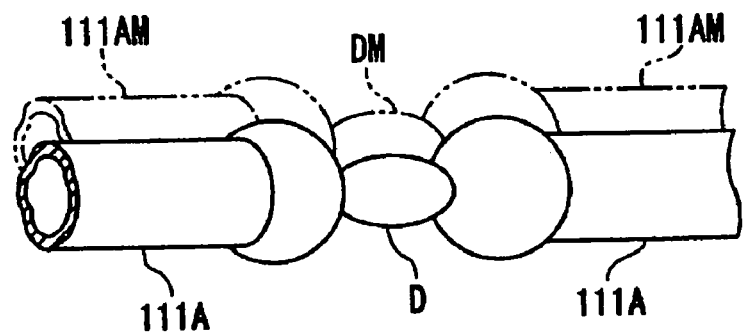

In the present exemplary embodiment, the center O4 of the sphere of the light emitting section 111 substantially matches the center O2 (FIG. 29) of light emission between electrodes 111A in the light emitting section 111. The outer peripheral surface 811 is formed into a spherical shape of Φ14.4 mm. When mounting the secondary reflecting mirror 81 to the front sealed section 1122, the center O4 of sphere of the light emitting section 111 and the center O1 of the curvature of the reflecting surface 131 are matched and the distance between the center L4 of the sphere of the light emitting section 111 and the outer peripheral surface 811 is set to 7.2 mm, which corresponds to the radius of the sphere including the outer peripheral surface 811. Accordingly, the outer peripheral portion of the secondary reflecting mirror 81 is accommodated within the circular cone shown by the boundaries L3 and L4. The angle θ formed between the portion of the illumination axis A on the proximal (rear) side in the direction of emission of the luminous flux and the luminous flux radiated from the light emitting section 111 and directly entering the elliptic reflector 12 is 105° or below.

Here, for example, the outer peripheral surface of the secondary reflecting mirror having the centers of curvature O1, O3 of the reflecting surface 131 and the outer peripheral surface 811 being coaxial is such that the thickness T2 of the portion on which the adhering surface on the front sealed section 1122 is formed is thinner than the thickness TI of the secondary reflecting mirror 81, which has the center O3 of curvature deviated from the center O1 of curvature, as shown by the two-dot chain line CL1 in FIG. 17. Hence a sufficient area of the adhering surface 812 cannot be secured.

The outer peripheral surface of the secondary reflecting mirror having the entire thickness set to the same value as the thickness T1 protrudes from the circular cone shown by the boundaries L3 and L4, as shown by the two-dot chain line CL2 in FIG. 17. Hence the luminous flux reflected by the elliptic reflector 12 is intercepted.

Such a secondary reflecting mirror 81 is formed, for example, by polishing a thick cylindrical member 136a (14 mm in outer diameter Φ in this case), and the center of curvature of polishing is moved after having formed the reflecting surface 131 and then the outer peripheral surface 811 is formed.

In this case, the plurality of notched grooves 761, 771 as in the third exemplary embodiment described above (FIGS. 22(A), (B)) may be formed along the ridge at the meeting point between the outer peripheral surface 811 of the secondary reflecting mirror 81 and the adhering surface 812.

Then, a dielectric multi-layer film of tantalum pentoxide (Ta2O5) and silica dioxide (SiO2) is deposited and formed on the reflecting surface 131. As a preparation, masking of the adhering surface 812 is performed in the following manner.

Figure 18:
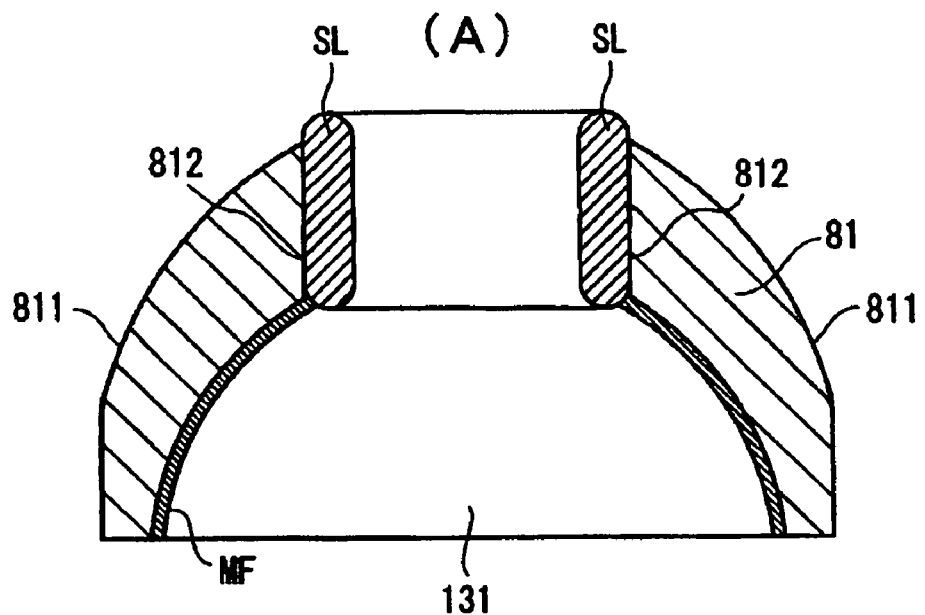
FIGS. 18(A) and 18(B) are schematics showing a masking state of the secondary reflecting mirror according to the fourth exemplary embodiment of the present invention.
Figure 18:
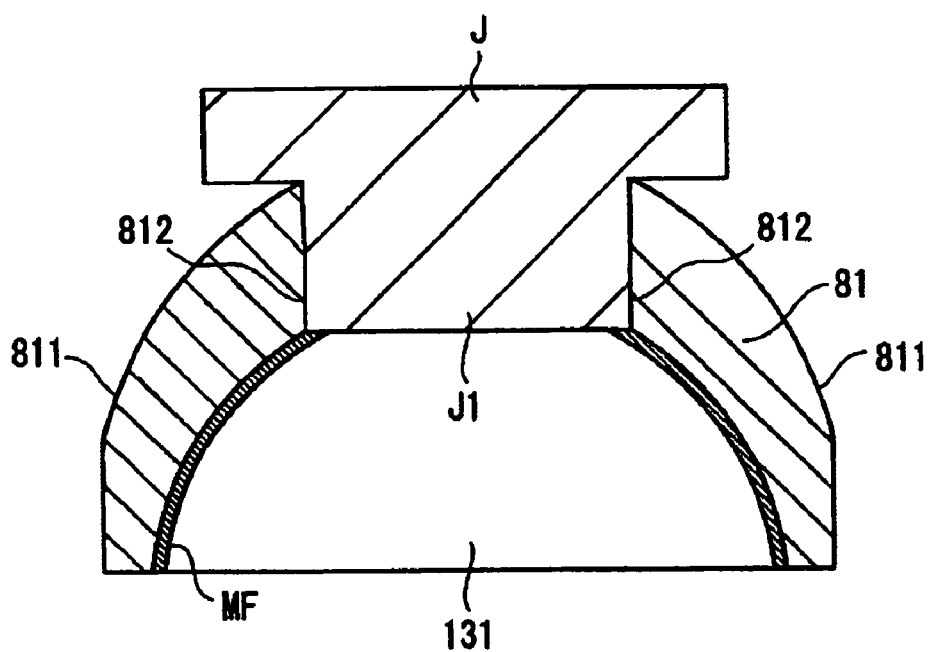

The secondary reflecting mirror 81 on which masking is performed is shown in FIGS. 18(A), (B).

The adhering surface 812 is coated with a sealing material SL which cures like rubber (or gel) to form a masking, as shown in FIG. 18(A). When deposition of a dielectric multi-layer film MF of the reflecting surface 131 is performed in this state, the dielectric multilayer film does not extend over and attach onto the adhering surface 812, so that the adhering surface 812 can be maintained in a flat and smooth state. The sealing material SL is to be removed after the dielectric multilayer film MF is formed.

Masking on the adhering surface 812 may be performed by covering the adhering surface 812 with a jig J which fits the opening to insert the sealed section 1122 of the secondary reflecting mirror 81, as shown in FIG. 18(B) as well. The distal portion of the jig J forms a disk-shaped fitting portion J1 which entirely comes into abutment with the adhering surface 812. Deposition and formation of the dielectric multilayer film MF is performed with the respective openings of the secondary reflecting mirror 81 closed with the jigs J and the adhering surface 812 masked.

Then, the secondary reflecting mirror 81, manufactured in the manner described above, is mounted to the sealed section 112 of the light source lamp 11 and the adhesive agent 137 of silica/alumina is applied from the side of the outer peripheral portion 811. In this case, it is applied so as to be mounded on the outside of the outer peripheral surface 811.

The light source unit, having the secondary reflecting mirror 81, can be manufactured in the same manner as the method of manufacturing in the first exemplary embodiment using the manufacturing device 60 in the first exemplary embodiment.

According to the fourth exemplary embodiment as described above, the following effects and/or the effects (1) to (10) described in the aforementioned exemplary embodiments are achieved.

(15) Since the center O3 of the curvature of the outer peripheral surface 811 is displaced at the position forward of the center O1 of the curvature of the reflecting surface 131 on the illumination axis A so that the secondary reflecting mirror 81 is accommodated within the circular cone shown by the boundaries L3 and L4, interception of light emitted from the elliptic reflector 12 is reduced or prevented and the luminous efficiency of light emitted from the light source lamp 11 can further be enhanced, whereby illumination of high illumination intensity can be emitted form the light source unit.

In this structure, the area of the adhering surface 812 may be increased by increasing the length of the secondary reflecting mirror 81 in the direction of the illumination axis A within the range in which the secondary reflecting mirror 81 is accommodated within the circular cone shown by the boundaries L3 and L4. Specifically, within the area in which luminous flux cannot be used, thereby being adhered firmly to the light source lamp 11. Therefore, of the likelihood that the illumination intensity of illumination emitted from the light source unit 10 is lower can be reduced or eliminated.

(16) Since the area of the secondary reflecting mirror 81 extending toward the proximal (rear) side of the illumination axis A in the direction of emission of the luminous flux and covering the light emitting section 111 between the circular cone shown by the boundaries L3 and L4 and the outer peripheral portion of the light source lamp 11 may be increased, and hence the maximum angle θ formed between the rear portion of the illumination axis A in the direction of emission of the luminous flux and the luminous flux entering from the light emitting section 111 directly to the elliptic reflector 12 may be reduced, the size of the elliptic reflector 12 in the direction of the illumination axis A may further be reduced.

(17) Since masking is performed on the adhering surface 812 so that the dielectric multi-layer film is not adhered dispersedly on the adhering surface 812 when depositing and forming the dielectric multi-layer film on the reflecting surface 131, the adhering strength can be enhanced. Therefore, the likelihood that the illumination intensity of illumination emitted from the light source unit 10 is lowered can be reduced or eliminated.

5 Fifth Exemplary Embodiment

Subsequently, a fifth exemplary embodiment of the present invention will be described. In the description below, parts and members which have already been described are represented by the identical numerals and the description will be omitted or simplified.

The secondary reflecting mirrors 13, 71, 73, 74, 76, 81 are manufactured by cutting or polishing the cylindrical member as a base in the aforementioned exemplary embodiments.

In contrast, the secondary reflecting mirror according to the fifth exemplary embodiment is different in that base material, such as quartz or alumina ceramics, is brought into a melted state, and press-molded.

Figure 19:
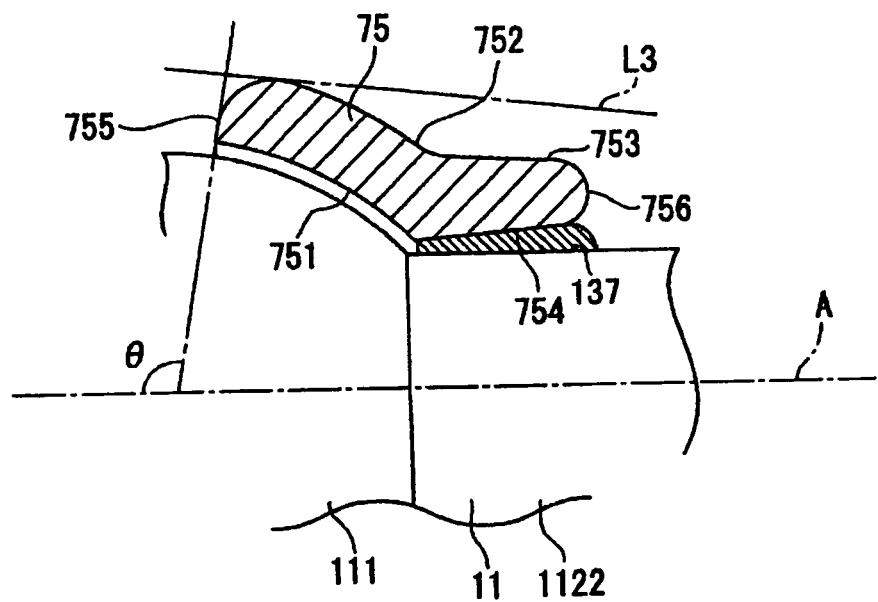
FIG. 19 is a schematic showing the structure of a principal portion of the secondary reflecting mirror constituting the light source unit according to a fifth exemplary embodiment of the present invention.

As shown in FIG. 19, the secondary reflecting mirror 75 according to the fifth exemplary embodiment is formed with a necked portion 753 extending from a reflecting surface 751 and an outer peripheral surface 752 toward the distal (front) side of the light source lamp 11, and is formed with an adhering surface 754 on the inner surface side of the neck portion 753. The adhering surface 754 is formed as an inner peripheral surface of a truncated conical shaped hole which gradually increases in diameter from the reflecting surface 751 toward the distal (front) side, so that the adhesive agent can easily be injected therein from the distal (front) side of the secondary reflecting mirror 75.

A proximal end surface 755 of the secondary reflecting mirror 75 is formed as an inclined surface extending along the maximum angle θ formed between light emitted from the light emitting section 111 and directly entering the elliptic reflector 12 and the portion of the illumination axis A on the proximal (rear) side in the direction of emission of the luminous flux. The meeting point with the outer peripheral surface 752 is chamfered with corner radius, so as to be accommodated within the circular cone shown by the boundaries L3 and L4.

A distal end surface 756 of the secondary reflecting mirror 75 is configured as a cross-section of corner radius.

Formation of the corner radius at the end of the secondary reflecting mirror 75 is employed considering removal from the die after press-molding and devised to reduce or prevent deformation of the reflecting surface 751 by being caught on the die at the time of removal form the die at the end thereof.

The light source unit provided with the secondary reflecting mirror 75 can be manufactured in the same manner as the method of manufacturing in the first exemplary embodiment using the manufacturing device 60 in the first exemplary embodiment.

Since the secondary reflecting mirror 75 is formed with the adhering surface 754 in the form of the truncated conical shaped hole, which is gradually increasing in diameter from the reflecting surface 751 toward the distal (front) side, if the sufficient adhesive agent can be injected between the adhering surface 754 of the secondary reflecting mirror 75 which is adjusted to the position at which the maximum illumination intensity is achieved and the outer peripheral surface of the light source lamp 11, the operation to move the secondary reflecting mirror 75 to distribute the adhesive agent evenly may be omitted in (Step S7).

According to the fifth exemplary embodiment, the following effects in addition to the effects shown in (1), (2), (4), (6) to (10) described in the exemplary embodiment described above are achieved.

(18) Since the secondary reflecting mirror 75 is formed by press-molding, the secondary reflecting mirrors 75 with a high degree of accuracy can be manufactured in large quantities for a short time in comparison with the case of machining the cylindrical member.

Also, since press-molding is employed, flexibility in shape of the secondary reflecting mirror 75 is high in comparison with cutting or polishing, various shapes of secondary reflecting mirror can be manufactured.

(19) Since the secondary reflecting mirror 75 is formed with the neck portion 753, a sufficient length of the adhering surface 754 can be secured so that the adhering area with respect to the sealed section 1122 is increased to assure firm fixation to the light source lamp 11. In addition, by forming the adhering surface 754 into the truncated conical inner periphery broadening toward the distal (front) side, the adhesive agent can easily be injected therein and hence further strong adhesion and fixation are achieved. Therefore, the likelihood that the illumination intensity of illumination emitted from the light source unit 10 is lowered can be reduced or eliminated.

(20) Since the secondary reflecting mirror 75 is formed with the adhering surface 754 in the form of a truncated conical shaped hole gradually increasing in diameter from the reflecting surface 751 toward the distal (front) side, the adhesive agent can easily be injected from the distal (front) side of the illumination axis A in the direction of emission of the luminous flux onto the adhering surface 754 of the secondary reflecting mirror 75.

After the adhesive agent 137 is cured, the secondary reflecting mirror 75, having the adhering surface 745 in such a shape, can restrict movement of the secondary reflecting mirror 75 toward the direction of emission of the luminous flux (right side in FIG. 19) of the illumination axis A with respect to the light source lamp 11. Therefore, the likelihood that the illumination intensity of illumination emitted from the light source unit 10 is lowered can be reduced or eliminated.

(21) In a method of manufacturing the light source unit provided with the secondary reflecting mirror 75, since the secondary reflecting mirror 75 is formed with the adhering surface 754 in the form of the truncated conical shaped hole gradually increasing in diameter toward the distal (front) side from the reflecting surface 751, so that the adhesive agent can easily be injected from the distal (front) side of the illumination axis A in the direction of emission of the luminous flux onto the adhering surface 754 of the secondary reflecting mirror 75 and the adhesive agent 137 can be filled sufficiently between the adhering surface 754 and the outer peripheral surface of the sealed section 1122, the operation to move the secondary reflecting mirror 75 to distribute the adhesive agent evenly can be omitted. Hence the manufacturing operation may be simplified.

6 Sixth Exemplary Embodiment

Subsequently, a sixth exemplary embodiment of the present invention will be described. In the description below, parts and members which have already been described are represented by the identical numerals and the description will be omitted or simplified.

The adhering surfaces 134, 812, according to the exemplary embodiment described above, are formed into a cylindrical shape having the same diameter from the reflecting surface 131 to the outer peripheral surface or the distal end surface.

A secondary reflecting mirror 84 according to the present exemplary embodiment is different in that an adhering surface 841 is formed into a conical truncated shaped tapered surface gradually reducing in diameter from the outer peripheral surface 132 toward the reflecting surface 131. As regards other structures, such as the outer peripheral surface, the exemplary embodiments described above can be applied.

Figure 20:
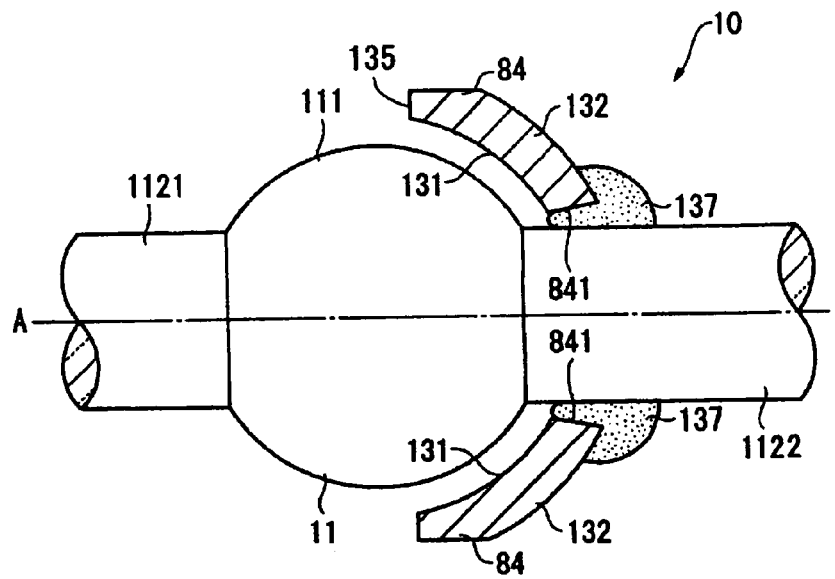
FIG. 20 is a schematic showing the structure of a principal portion of the secondary reflecting mirror constituting the light source unit according to a sixth exemplary embodiment of the present invention.

The adhering surface 841 of the secondary reflecting mirror 84 is, as shown in FIG. 20 as well, formed into a truncated conical shaped tapered surface gradually reducing in diameter from the outer peripheral surface 132 toward the reflecting surface 131. The distance between the adhering surface 841 and the sealed section 1122 is small on the side of the reflecting surface 131, and the area of the reflecting surface 131 is increased correspondingly. To the side of the reflecting surface 131, the distance between the adhering surface 841 and the sealed section 1122 is large on the side of the outer peripheral surface 132.

The light source unit provided with the secondary reflecting mirror 84 can be manufactured in the same manner as the method of manufacturing in the first exemplary embodiment using the manufacturing device 60 in the first exemplary embodiment.

Since the secondary reflecting mirror 84 is formed with the adhering surface 841 of the truncated conical shaped hole gradually increasing in diameter from the reflecting surface 131 toward the outer peripheral surface 132, if a sufficient amount of adhesive agent can be injected between the adhering surface 841 of the secondary reflecting mirror 84, which is adjusted to the position at which the maximum illumination intensity is achieved, and the outer peripheral surface of the light source lamp 11, the operation to move the secondary reflecting mirror 84 to distribute the adhesive agent evenly may be omitted in (Step S7).

According to the sixth exemplary embodiment as described above the following and other effects, in addition to the effects described in the aforementioned exemplary embodiments, are achieved.

(22) The adhesive agent 137 can easily be injected from the side of the outer peripheral surface 132 being larger in distance between the adhering surface 841 and the sealed section 1122. The likelihood that the adhesive agent 137 flows over the portion near the adhering surface 841 on the side of the reflecting mirror 131, being smaller in diameter is reduced or eliminated, thereby reducing or preventing deterioration of reflecting property of the secondary reflecting mirror 84. In addition, since the reflecting surface 131 is increased at the reduced diameter portion, it can further contribute to enhance the luminous efficiency of light from the light source.

Also, after the adhesive agent 137 is cured, the secondary reflecting mirror 83 may be restricted mechanically from moving rearwardly of the direction of emission of the luminous flux with respect to the light source lamp 11 by the tapered portion which is reduced in diameter.

7 Seventh Exemplary Embodiment

A seventh exemplary embodiment of the invention will now be described. In the description below, parts and members which have already been described are represented by the identical numerals and the description will be omitted or simplified.

A shoulder or a projection is not formed on the adhering surfaces 134, 754, 812, 841 of the secondary reflecting mirrors in the aforementioned exemplary embodiments.

A secondary reflecting mirror 83 according to the present exemplary embodiment includes an adhering surface 831 formed with a shoulder. As regards other structures, such as the outer peripheral surface, the exemplary embodiments described above can be applied.

Figure 21:
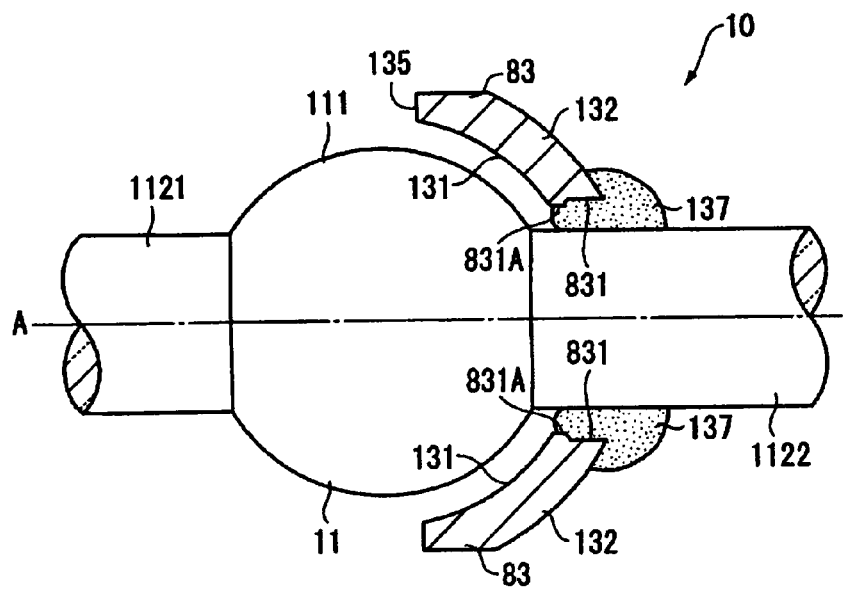
FIG. 21 is a schematic showing the structure of a principal portion of the secondary reflecting mirror constituting the light source unit according to a seventh exemplary embodiment of the present invention.

As shown in FIG. 21 as well, according to the secondary reflecting mirror 83, the end of the adhering surface 831 on the side of the reflecting surface 131 projects toward the outer peripheral surface of the sealed section 1122, and is formed with a shouldered portion having a surface continuing from the reflecting surface 131. This part is represented as a shoulder 831A. The shoulder 831A corresponds to the meeting point between the adhering surface 831 and the reflecting surface 131 on the side of the reflecting surface 131.

The distance between the adhering surface 831 and the sealed section 1122 is increased from the meeting point between the outer peripheral surface 132 and the adhering surface 831 to the shoulder 831A.

The light source unit provided with the secondary reflecting mirror 83 can be manufactured in the same manner as the method of manufacturing in the first exemplary embodiment using the manufacturing device 60 in the first exemplary embodiment.

As regards the secondary reflecting mirror 83, since the distance between the adhering surface 831 and the sealed section 1122 is increased from the meeting point between the outer peripheral surface 132 and the adhering surface 831 to the shoulder 831A, if sufficient adhesive agent can be injected between the adhering surface 831 of the secondary reflecting mirror 83, which is adjusted to the position at which the maximum illumination intensity is achieved, and the outer peripheral surface of the light source lamp 11, the operation to move the secondary reflecting mirror 83 to distribute the adhesive agent evenly may be omitted in (Step S7).

According to the seventh exemplary embodiment, the following and other effects, in addition to the effects described in the aforementioned exemplary embodiments are achieved.

(23) Since the adhesive agent 137 can be injected easily from the side of the outer peripheral surface 132 in which the distance between the adhering surface 132 and the sealed section 1122 is large and, in addition, the adhesive agent 137 can be blocked by the shoulder 831A, the likelihood that the adhesive agent 137 flows over and contaminates the reflecting surface 131 is reduced or eliminated.

In addition, with the shoulder 831A, the secondary reflecting mirror 83 is restricted mechanically from moving rearwardly of the direction of emission of the luminous flux with respect to the light source lamp 11, after the adhesive agent 137 is cured.

In addition, since the luminous flux radiated from the light emitting section 111 can be reflected at the meeting point between the shoulder 831A and the reflecting surface 131, it can contribute to enhancements of the luminous efficiency of light from the light source.

8 Eighth Exemplary Embodiment

An eighth exemplary embodiment of the present invention will now be described. In the description below, parts and members which have already been described are represented by the identical numerals and the description will be omitted or simplified.

The adhering surface 134, 812 of the secondary reflecting mirror, according to the aforementioned exemplary embodiments, are formed into a cylindrical shape of the same diameter from the reflecting surface 131 to the outer peripheral surface or to the distal end surface.

Figure 22:
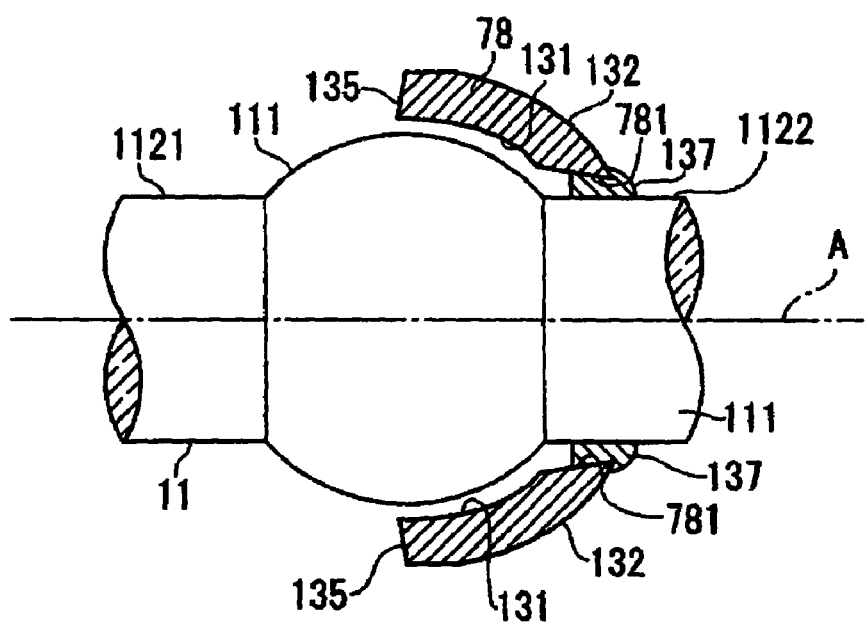
FIG. 22 is a schematic showing the structure of a principal portion of the secondary reflecting mirror constituting the light source unit according to an eighth exemplary embodiment of the present invention.

A secondary reflecting mirror 78 of the present exemplary embodiment is, as shown in FIG. 22, different in that an adhering surface 781 on the inner peripheral surface of the opening is formed into a truncated conical shaped tapered surface gradually reducing in diameter from the reflecting surface 131 to the outer peripheral surface 132. As regards other structure, such as the outer peripheral surface, the aforementioned exemplary embodiment can be applied.

The secondary reflecting mirror 78, as described above, is mounted to the sealed section 1122 of the light source lamp 11. The adhesive agent 137 is applied thereon from the side of the outer peripheral surface 132. In this case, the adhesive agent 137 can be applied so as to be mounted on the outside of the outer peripheral surface 132.

Figure 23:
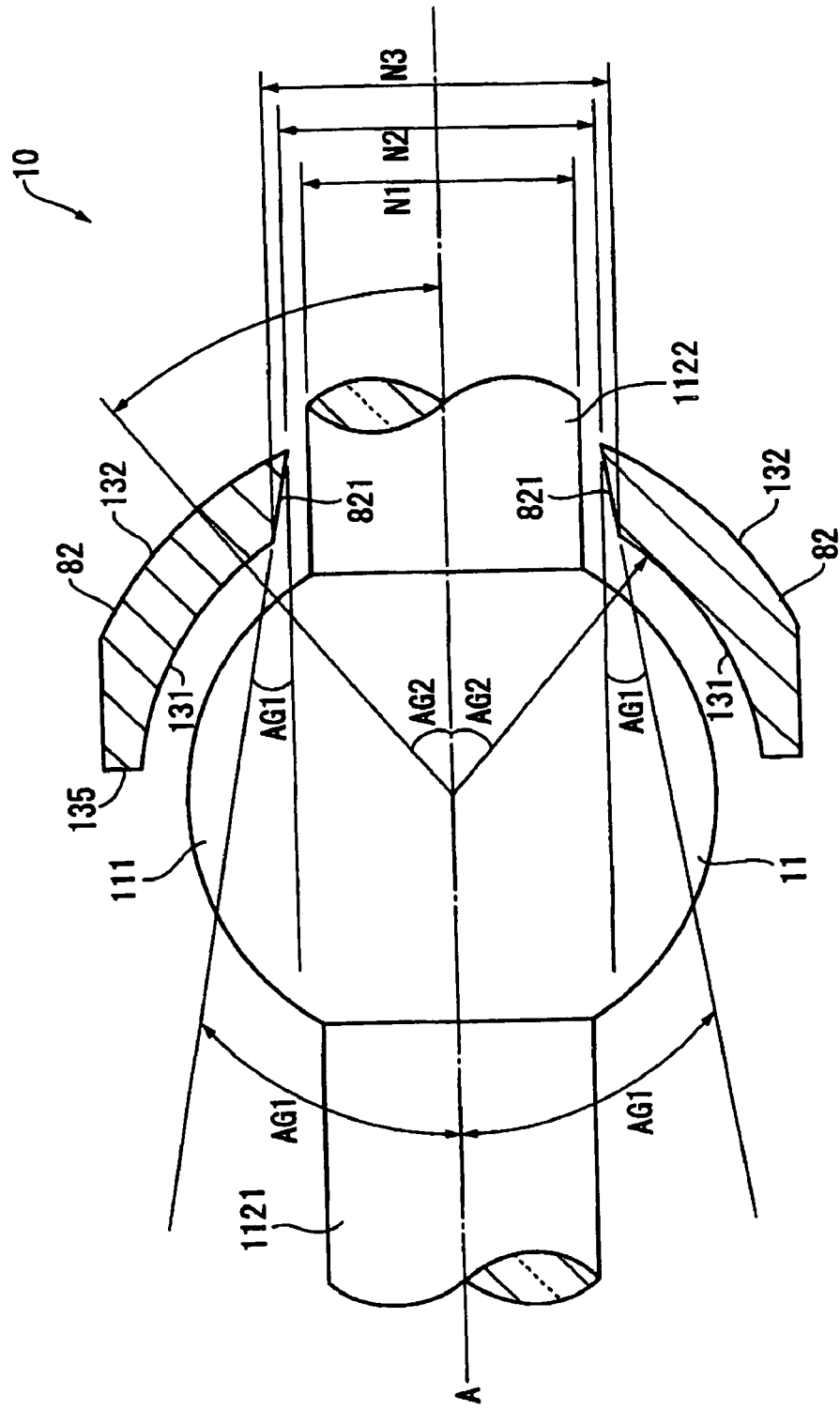
FIG. 23 is a schematic showing the structure of the principal portion of the secondary reflecting mirror constituting the light source unit according to the eighth exemplary embodiment of the present invention.

In the case of the secondary reflecting mirror 82, the tapered angle AG 1 of the adhering surface 821 is set to 10° with respect to the illumination axis A, as shown in FIG. 23 as well.

When the outer peripheral surface of the sealed section 1122 and the illumination axis A are parallel to each other, the adhering surface 821 also forms the tapered angle AG1 with respect to the outer peripheral surface of the sealed section 1122.

Figure 24:
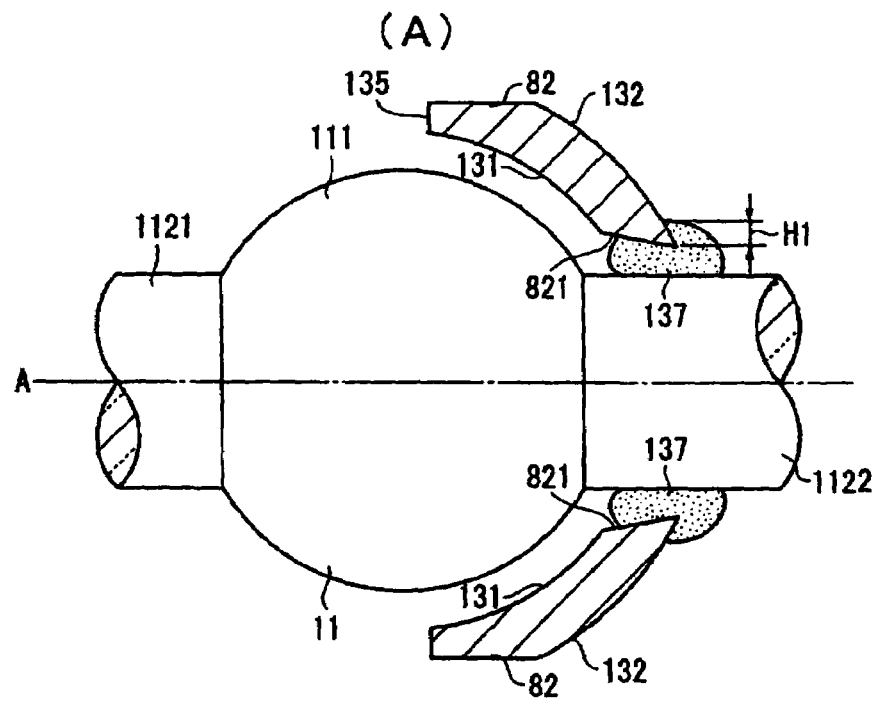
FIGS. 24(A) and 24(B) are schematics showing the structure of the principal portion of the secondary reflecting mirror constituting the light source unit including view from the front side in the direction of emission of the luminous flux according to the eighth exemplary embodiment of the present invention.
Figure 24:
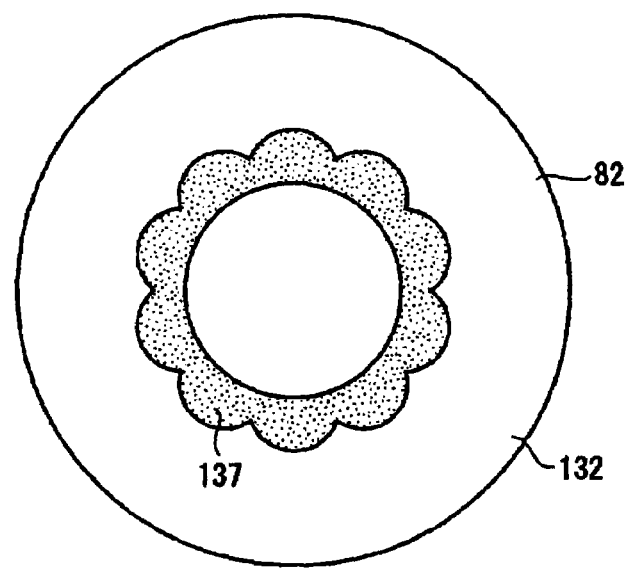

The adhesive agent 137 to be applied between the adhering surface 821 and the sealed section 1122 is applied so as to be mounded roundly to about 1 mm in height from the adhering surface 821 on the outside of the outer peripheral surface 132 (See H1 in FIG. 24(A)), as shown in FIG. 24(A). When the portion on which the adhesive agent 137 is applied is viewed from the front side of the light emitting section 111 in the direction of emission of the luminous flux, as shown in FIG. 24(B), the adhesive agent 137 is formed into a ring-shape such that the mounded portion is continues along the peripheral edge of the opening to insert the sealed section 1122 of the secondary reflecting mirror 82.

Here, the tapered angle AG1 (FIG. 23) may be set as appropriate within the range between 1° and 10° inclusive, depending on the shapes of the secondary reflecting mirror 82, the elliptic reflector 12, and the light source lamp 11.

In the present exemplary embodiment, for example, the diameter of the opening to insert the sealed section 1122 of the secondary reflecting mirror 82, on the side of the outer peripheral surface 132, is set to N2, which is the largest outer diameter N1 of the sealed portion 1122 plus 0.5 mm. Then, sufficient reflecting surface 131 is secured so that the light-usable angle AG2 formed between the ridge at the meeting point between the reflecting surface 131 and the adhering surface 821 and the illumination axis A becomes 40° or smaller. The diameter of the opening of the secondary reflecting mirror 82, on the side of the reflecting surfaces 131 at this time, is shown as N3 in FIG. 23.

The adhesive agent 137 is filled as needed depending on the shapes of the secondary reflecting mirror 81 and the light source lamp 11, material quality or viscosity of adhesive agent 137. For example, the dimension of the adhering surface 821 in the direction of the illumination axis A is set to 2.94 mm. The dimension of the adhesive gent 137 on the outside of the outer peripheral surface 132 in the same direction is set to 1 mm. Also, the adhesive agent 137 is applied so as to be mounted by 1 mm from the adhering surface 821.

The light source unit provided with the secondary reflecting mirrors 78 and 82 according to an exemplary aspect of the invention can be manufactured in the same manner as the method of manufacturing in the first exemplary embodiment using the manufacturing device 60 in the first exemplary embodiment.

According to the eighth exemplary embodiment the following and other effects, in addition to the effects described in (1) to (21) in the aforementioned exemplary embodiments are achieved.

(24) Since the adhesive agent 137 is applied so as to be mounded on the outside of the outer peripheral surface 132 of the secondary reflecting mirror 78, the secondary reflecting mirror 78 can be restricted from moving toward the distal (front) side (right side in FIG. 22) of the illumination axis A with respect to the light source lamp 11 after the adhesive agent 137 is cured. Since the adhering surface 781 is formed into a tapered surface increasing in diameter toward the proximal (rear) side, the secondary reflecting mirror 78 can be restricted from moving toward the distal (rear) side (left side in FIG. 22) of the illumination axis A in the direction of emission of the luminous flux when the adhesive agent 137 is cured. Therefore, with the secondary reflecting mirror 78 having such an adhering surface 781, when it is fixed to the light source lamp 11 with the adhesive agent 137, movement in the direction of the illumination axis A can be restricted. Hence the likelihood of lowering of the illumination intensity of illumination emitted from the light source unit 10 can be reduced or eliminated.

(25) Since the meeting point between the adhering surface 821 and the outer peripheral surface 132 forms an acute angle, the adhesive agent 137 is filled in such a manner that the portion of acute angle is stuck in the adhesive agent of the both side of the adhering surface 821 and the outer peripheral surface 132, and firm adhesion is achieved. Even when the adhesive agent of silica/alumina, which is high in heat resistance but insufficient in adhesion properties, is employed as the adhesive agent 137, the movement of the secondary reflecting mirror 82 is reliably restricted.

Also, since the tapered angle AG1 of the adhering surface 821 is set to the range between 1° and 10° inclusive, the larger reflecting surface 131 can be secured and the luminous flux radiated from the light emitting section 111 can be utilized laconically.

Therefore, the secondary reflecting mirror 81 having such an adhering surface 821, when it is adhered to the light source lamp 11 with the adhesive agent 137, may contributes to enhance the luminous efficiency of light from the light source emitted from the light emitting section while restricting the movement of the secondary reflecting mirror 82 in the direction of the illumination axis A sufficiently, whereby the illumination intensity of illumination emitted from the light source unit 10 may be enhanced.

9 Ninth Exemplary Embodiment

A ninth exemplary embodiment of the present invention will now be described. In the description below, parts and members which have already been described are represented by the identical numerals and the description will be omitted or simplified.

In the aforementioned exemplary embodiment, the surfaces of the adhering surfaces 134, 754, 781, 812, 821, 831, 841 of the secondary reflecting mirror are not machined specifically.

Figure 25:
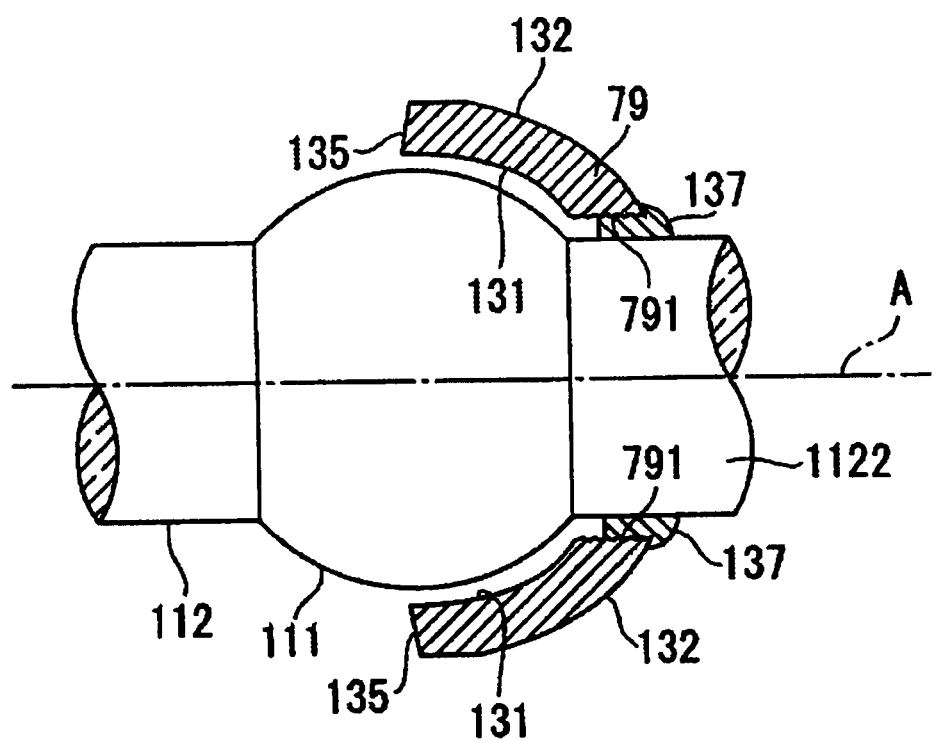
FIG. 25 is a schematic showing the structure of a principal portion of the secondary reflecting mirror constituting the light source unit according to a ninth exemplary embodiment of the present invention.

A secondary reflecting mirror 79 according to the present exemplary embodiment is, as shown in FIG. 25, different in that an adhering surface 791 of the secondary reflecting mirror 79 is formed into a roughened surface with concavity and convexity. As regards other structures, such as the outer peripheral surface, the exemplary embodiments described above can be applied.

The concavity and convexity on the adhering surface 791 can be formed by roughening the surface by machining, or by conducting chemical processing in the stage of material.

When the adhesive agent 137 is applied on the adhering surface 791, as in the case described above, movement in the direction of the illumination axis A is restricted by the adhesive agent 137 crept into the concavity and convexity and, in addition, rotation about the illumination axis A and displacement in the direction of the illumination axis A can also be restricted.

The light source unit provided with the secondary reflecting mirror 79 can be manufactured in the same manner as the method of manufacturing in the first exemplary embodiment using the manufacturing device 60 in the first exemplary embodiment.

According to the secondary reflecting mirror 79 of the ninth exemplary embodiment, the following and other effects in addition to the effects of the aforementioned exemplary embodiments, are achieved.

(26) Since the adhering surface 791 of the secondary reflecting mirror 79 has such structure that the adhesive agent 137 creeps into the concavity and convexity, movement in the direction of the illumination axis A with respect to the light source lamp 11 is restricted after the adhesive agent 137 is cured. In addition, rotation about the illumination axis A can also be restricted. Therefore, with the secondary reflecting mirror 78 having such an adhering surface 781, when it is fixed to the light source lamp 11 with the adhesive agent 137, movement in the direction of the illumination axis A can be restricted, and the likelihood of lowering of the illumination intensity of illumination emitted from the light source unit 10 can be reduced or eliminated.

10 Tenth Exemplary Embodiment

A tenth exemplary embodiment of the present invention will be described. In the description below, parts and members which have already been described are represented by the identical numerals and the description will be omitted or simplified.

In the aforementioned exemplary embodiment, processes other than cutting, polishing and press-molding are not specifically performed on the outer peripheral surface of the secondary reflecting mirror.

Figure 26:
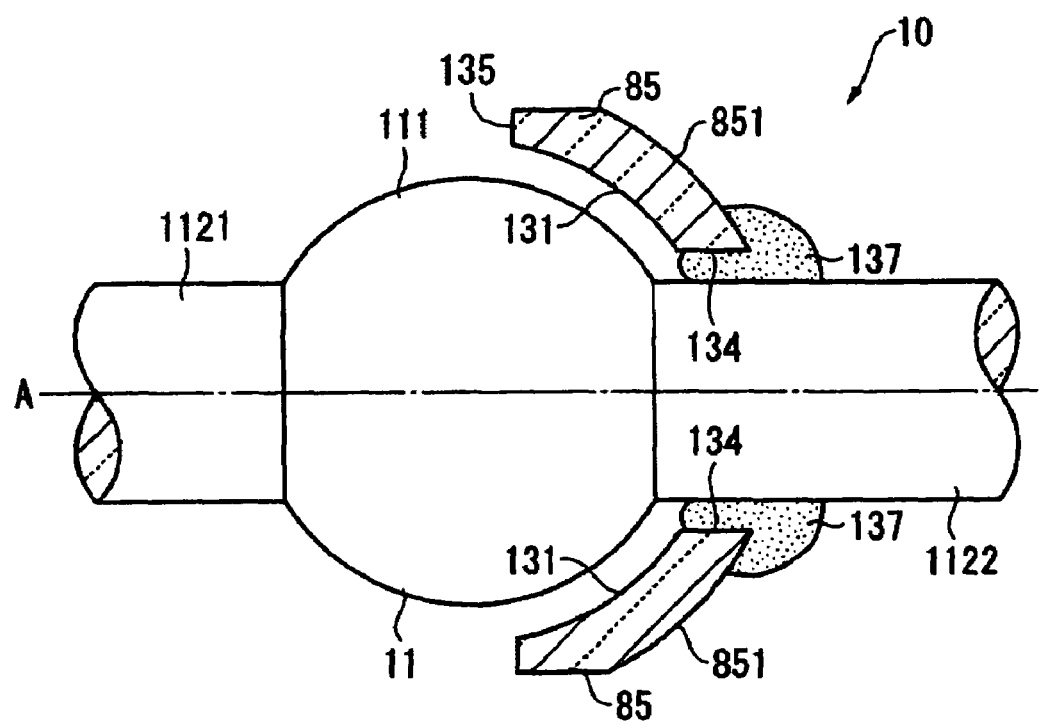
FIG. 26 is a schematic showing the structure of a principal portion of the secondary reflecting mirror constituting the light source unit according to a tenth exemplary embodiment of the present invention.

A secondary reflecting mirror 85, according to the present exemplary embodiment, is different in that an outer peripheral surface 851 is mirror polished and provided with translucency so that the adhering surface 134 can be seen from the outer peripheral surface 851 (FIG. 26). As regards other structures, such as the shape of the outer peripheral surface, the exemplary embodiments described above can be applied.

The secondary reflecting mirror 85 is, as described above, formed by polishing the cylindrical member 136 formed of crystallized glass, such as quartz or NEO CERAM (trade mark of a product from Asahi Glass Co.,Ltd.), or translucent material, such as sapphire or alumina ceramics, and then mirror polished by additional polishing process on the outer peripheral surface 851 thereof. The secondary reflecting mirror 85 is transparent from the outer peripheral surface 851 to the back side of the dielectric multi-film on the reflecting surface 131, and from the outer peripheral surface 851 to the adhering surface 13 as shown in FIG. 26.

In this case, coating formation or heat treatment on the outer peripheral surface 851 may be employed as the mirror-polishing.

It is also conceivable to provide the translucency so that, for example, only the portion from the above-described specific machined portion on the outer peripheral surface 851 to the end of the adhering surface 134 on the side of the reflecting surface 131 can be seen through, by partial polishing or coating.

Since the secondary reflecting mirror 85 is shaped out from the translucent cylindrical member 136, the portion from the outer peripheral surface 851 to the adhering surface 134 is provided with translucency without polishing into a further smooth surface. Hence the adhering surface 134 can be seen through from the side of the outer peripheral surface 851.

It is also possible to polish the adhering surface 134 further smoothly or to heat up the adhering surface in substantially the same manner as the outer peripheral surface 851, as a matter of course.

In addition, the distance between the adhering surface 134 and the sealing portion 1122 is set to a small distance, and, the area of the reflecting surface 131 is expanded correspondingly.

The light source unit provided with the secondary reflecting mirror 85 can be manufactured in the same manner as the method of manufacturing in the first exemplary embodiment using the manufacturing device 60 in the first exemplary embodiment. Since the reflecting surface 131 of the secondary reflecting mirror 85 can be seen through from the outer peripheral surface 851, if the adhesive agent can be injected between the adhering surface 841 of the secondary reflecting mirror 84, which is adjusted to the position at which the maximum illumination intensity is achieved, and the outer peripheral surface of the light source lamp 11, while viewing the range of application, the operation to move the secondary reflecting mirror 84 to distribute the adhesive agent evenly may be omitted in (Step S7).

According to the tenth exemplary embodiment, the following and other effects in addition to the effects described in the aforementioned exemplary embodiments are achieved.

(27) The outer peripheral surface 851 of the secondary reflecting mirror 85 is machined to provide translucency so that the adhering surface 134 can be seen through from the side of the outer peripheral surface 851. Hence the amount of injection of the adhesive agent 137 can be adjusted to the optimal amount while monitoring the state of filling thereof between the adhering surface 134 and the sealed section 1122 so that the likelihood that the adhesive agent 137 flows over the reflecting surface 131 is reduced or eliminated.

Therefore, the likelihood that the reflecting property of the secondary reflecting mirror 85 is hindered by the adhesive agent 137 is reduced or eliminated. In addition, since the management of injection of the adhesive agent 137 is easy as described above, the distance between the adhering surface 134 and the sealed section 1122 is reduced to increase the area of the reflecting surface 131, and hence it can contribute to enhance the luminous efficiency of light from the light source.

11 Eleventh Exemplary Embodiment

The present exemplary embodiment will now be described. In the description below, parts and members, which have already been described, are represented by the identical numerals and the description will be omitted or simplified.

In the method of manufacturing the light source unit provided with the secondary reflecting mirror according to the aforementioned exemplary embodiments, the position of the secondary reflecting mirror in the aforementioned exemplary embodiments with respect to the light source lamp 11 using the manufacturing device 60 is adjusted by illuminating the light source lamp 11, detecting the illumination intensity of the luminous flux emitted from the projecting optical system 50 by the integrating sphere 621 in the luminous flux detecting unit 62, and adjusting the position of the secondary reflecting mirror with respect to the light source lamp 11, so that the maximum illumination intensity detected by the integrating sphere 621 is achieved.

The method of manufacturing the light source unit according to an eleventh exemplary embodiment is different in that, in positional adjustment of the secondary reflecting mirror with respect to the light source lamp 11, the position of the secondary reflecting mirror with respect to the light source lamp 11 is adjusted by using the manufacturing device provided with the luminous flux detecting unit to detect the amount of displacement between the arc image D formed between the electrodes in the light emitting section 111 and the reflected arc image DM formed by the secondary reflecting mirror 13, picking up the arc image D and the reflected arc image DM of the illuminated light source lamp 11 by an image pickup device, such as CCD of the luminous flux detecting unit through the reflecting portion 122 of the elliptic reflector 12, detecting the amount of displacement between the arc image D and the reflected arc image DM from the images picked up by an image processing unit, and simultaneously, adjusting the position of the secondary reflecting mirror with respect to the light source lamp 11 so that the amount of displacement detected by the luminous flux detecting unit becomes the optimum amount of displacement.

The manufacturing device according to the present exemplary embodiment is provided with the retaining frame 61 and the position adjusting mechanism 63, as in the manufacturing device 60. Further, the manufacturing device according to the present exemplary embodiment includes a plurality of image pickup devices, such as CCD to pick up the arc image D formed between the electrode in the light emitting section 111 and the reflected arc image DM formed by the secondary reflecting mirror 13 through the reflecting portion 122 of the elliptic reflector 12, an image processing unit to process the image picked up by the image pickup devices and calculating the amount of displacement between the arc image D and the reflected arc image DM, and a determination unit to determine whether or not the amount of displacement calculated by the image processing unit is the optimal amount of displacement.

Figure 27:
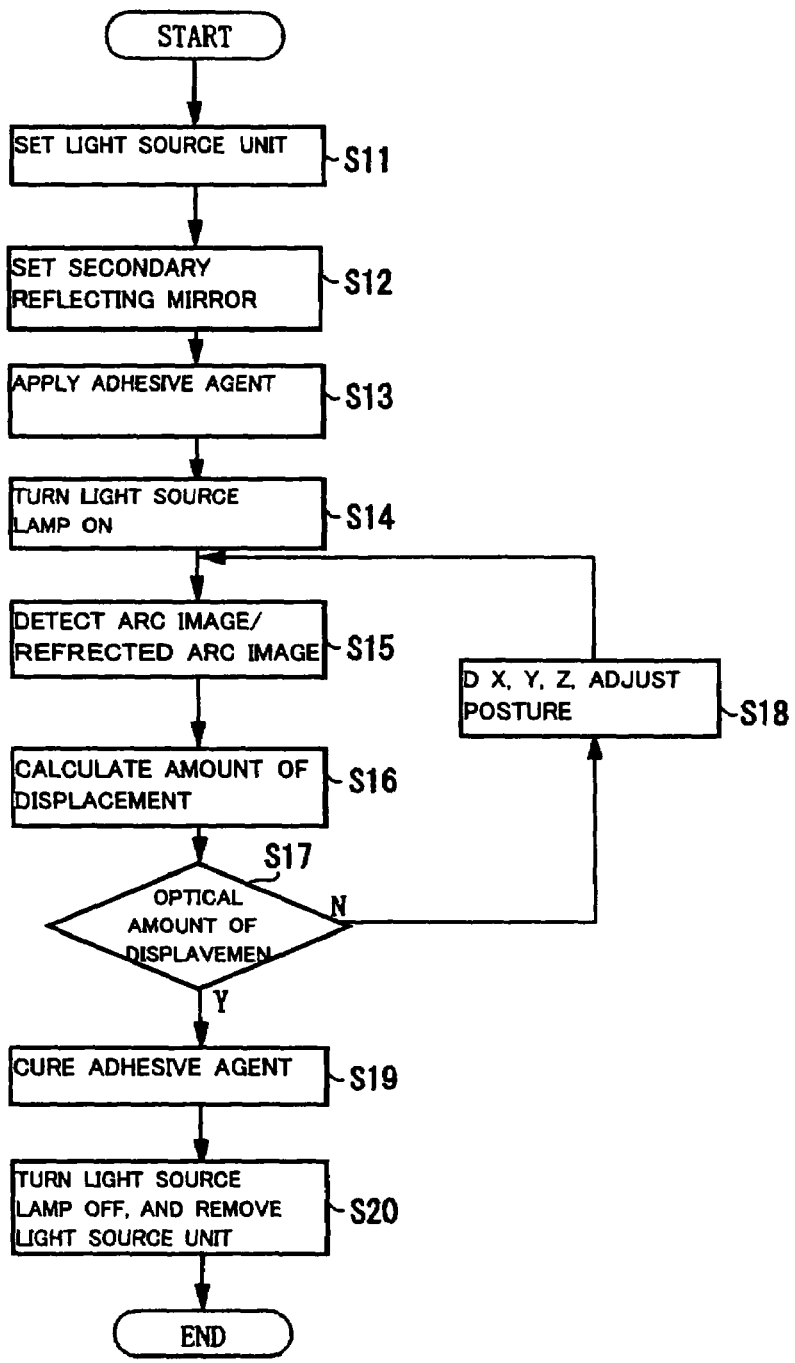
FIG. 27 is a flowchart showing a method of manufacturing the light source unit according to the eleventh exemplary embodiment of the present invention.

Subsequently, a method of manufacturing the light source unit provided with the secondary reflecting mirror 71 using the manufacturing device will be described based on a flowchart shown in FIG. 27. The light source unit provided with other secondary reflecting mirrors of the aforementioned exemplary embodiments may also be manufactured according to the same manufacturing method.

(Step S11) Set the integrated light source lamp 11 and the elliptic reflector 12 before mounting the secondary reflecting mirror 71 into the retaining frame 61.

(Step S12) Set the secondary reflecting mirror 71 to the grip members 643, 644 of the secondary reflecting mirror holder 640.

Figure 28:
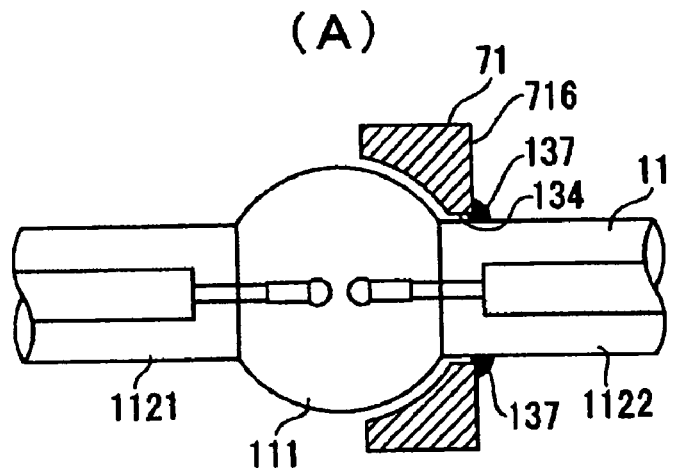
FIGS. 28(A)-28(C) are schematics showing a method of applying the adhesive agent according to an eleventh exemplary embodiment of the present invention.
Figure 28:
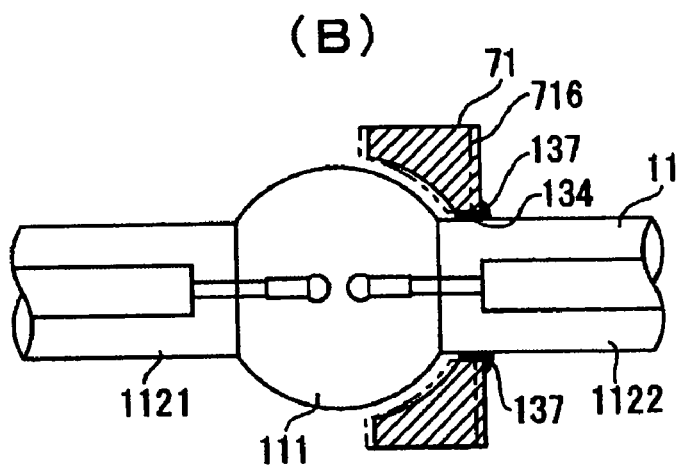
Figure 28:
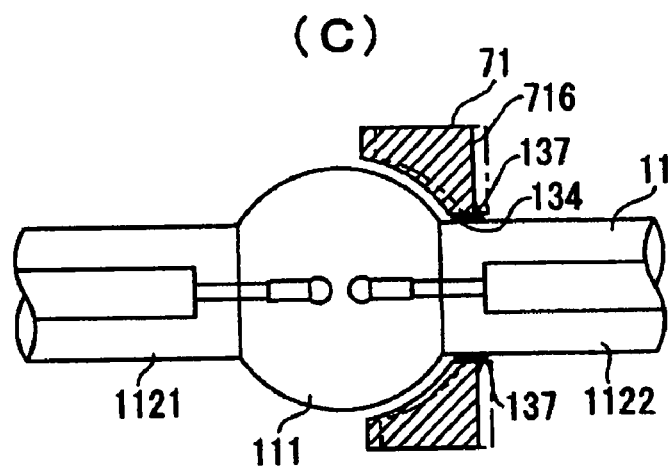

(Step S13) Apply the adhesive agent so as to cross over the distal end surface 716 of the secondary reflecting mirror 71 and the outer peripheral surface of the sealed section 112 as shown in FIG. 28(A).

(Step S14) Turn the light source lamp 11 on.

(Step S15) Pick up an image of the actual arc image D in the light emitting section 111 and the reflected arc image DM formed by the secondary reflecting mirror 71 by the image pickup devices, such as CCD.

(Step S16) Calculate the amount of displacement between the arc image D and the reflected arc image DM from the arc image D and the reflected arc image DM picked up by the image pickup device by the image processing unit.

(Step S17) Determine whether or not the amount of displacement between the arc image D and the reflected arc image DM calculated by the image processing unit is an optimal amount by the determination unit.

Here, determination of the amount of displacement between the arc image D and the reflected arc image DM is performed in the following manner. As shown in FIG. 29(A), when the arc image D formed between the electrodes 111A and the reflected arc image DM formed between the reflected images 111AM of the electrodes 111A are too far, the reflected arc image DM comes apart from the first focal position of the elliptic reflector. Hence the reflected arc image DM cannot be used sufficiently as light from the light source. As shown in FIG. 29(B), when the arc image D and the reflected arc image DM are completely matched, the temperature in the light emitting section 111 increases by plasma absorption. Hence the light amount of the reflected arc image DM is decreased. Therefore, as shown in FIG. 29(C), such amount of displacement that the arc image D and the reflected arc image DM are slightly displaced, and partly overlapped is selected as the optimal amount of displacement.

(Step S18) When the determination unit determines that the amount of displacement between the arc image D and the reflected arc image DM is not optimal amount, the Y-axis direction adjusting unit 632, the X-axis direction adjusting unit 633, the Z-axis direction adjusting unit 634, the angular position about Y-axis adjusting unit 635, and the angular position about X-axis adjusting unit of the position adjusting mechanism 63 are operated to adjust the posture of the secondary reflecting mirror 71 in the X-, Y- and Z-axis direction. In this case, as shown in FIG. 28(B), (C), the position is adjusted while repeating the operation of moving the secondary reflecting mirror 71 toward the distal side of the light source lamp 11 and then restoring the original position to distribute the adhesive agent between the outer peripheral surface of the sealed section 112 and the adhering surface 134.

(Step S19) When the determination unit determines that the amount of displacement between the arc image D and the reflected arc image DM is the optimal amount of displacement, the adhesive agent is cured.

(Step S20) When the adhesive agent is cured, the light source lamp is turned off, and the light source unit 10 is removed from the manufacturing device.

The adhesive agent used in the present exemplary embodiment may be provided so that a certain period is required until it is cured, and may be a special type, such as a thermosetting adhesive agent.

According to the eleventh exemplary embodiment as described above, the following effects and others are achieved.

(28) Since the relative position between the light source lamp 11 and the secondary reflecting mirror 71 is adjusted while detecting the amount of displacement between the arc image D and the reflected arc image DM, the luminous efficiency of light from the light source can be enhanced positively by adjusting the positions of the arc image D and the reflected arc image DM to the state in which the largest light energy is obtained.

(29) By applying the adhesive agent prior to the position adjustment, the adhesive agent can be distributed evenly between the outer peripheral surface of the sealed section 1122 and the adhering surface simultaneously with the position adjustment. Hence the manufacturing procedure can be simplified, thereby achieving strong adhesion and fixation.

12 Twelfth Exemplary Embodiment

Subsequently, a twelfth exemplary embodiment of the present invention will be described. In the description below, parts and members which have already been described are represented by the identical numerals and the description will be omitted or simplified.

In the eleventh exemplary embodiment described above, when manufacturing the light source unit, the position adjustment of the secondary reflecting mirror 71 with respect to the light source lamp 11 is performed with the light source lamp 11 turned on while detecting the arc image D and the reflected arc image DM by an image pickup device 621 a so that the optimal amount of displacement is achieved between the arc image D formed between the electrodes in the light emitting section 111 and the reflected arc image DM formed by the secondary reflecting mirror 13.

The method of manufacturing the light source unit according to the twelfth exemplary embodiment is different in that the position of the secondary reflecting mirror, with respect to the light source lamp 11 is adjusted, so that the optimal amount of displacement between the respective electrodes 111A and the reflected images 111AM is obtained while picking the images of the pair of electrodes 111A in the light emitting section 111 and the reflected images 111AM of the respective electrodes 111A formed by the secondary reflecting mirror by the image pickup devices, such as CCD without illuminating the light source lamp 11.

Figure 30:
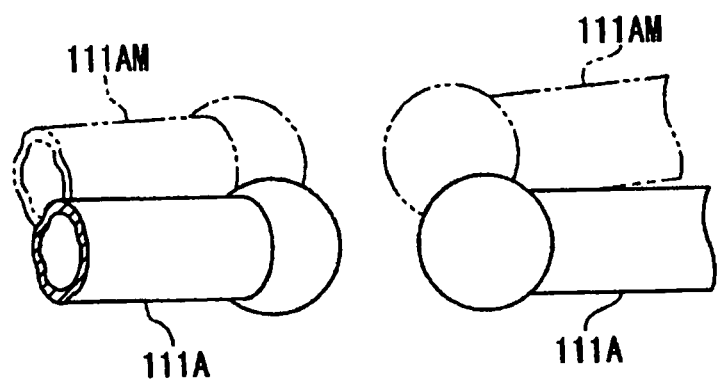
FIGS. 30(A) and 30(C) are schematics showing a procedure of determination of the optimal value for the amount of displacement between an image of electrodes and a reflected image of the electrodes according to a method of manufacturing the light source unit according to a twelfth exemplary embodiment of the present invention.
Figure 30:
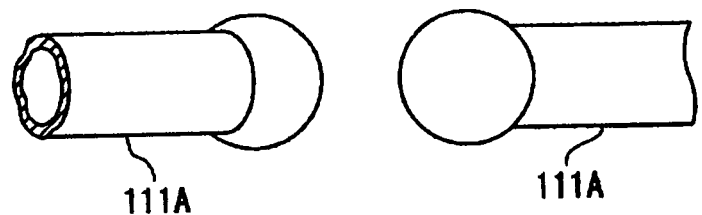
Figure 30:
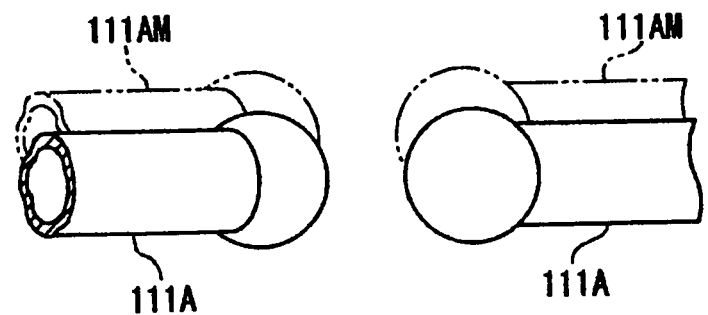

As shown in FIG. 30, the pair of electrodes 111A disposed at a distance from each other and the reflected images 111AM formed by the secondary reflecting mirror are picked up by the image pickup devices. Then the picked up images are processed, and the position of the secondary reflecting mirror is adjusted while confirming the positions of the both electrode images 111A, 111AM.

The position of the secondary reflecting mirror 71, with respect to the light source lamp 11, is adjusted in the same manner as the manufacturing method according to the eleventh exemplary embodiment. However, instead of turning the light source lamp 11 on and determining whether or not the detected amount of displacement between the arc image D and the reflected arc image DM is the optimal amount of displacement, the amount of displacement between the electrodes 111A and the reflected images 111AM is detected without turning the light source lamp 11 on, and the optimal amount of displacement is determined. The light source unit provided with other secondary reflecting mirrors in the aforementioned exemplary embodiments may be manufactured in the same manufacturing method.

As shown in FIG. 30(A), when the positions of the images of the electrodes 111A and the reflected images 111AM are too far from each other, the positions of the arc image D and the reflected arc image DM formed therebetween come apart too much correspondingly. Hence it is considered that the reflected arc image DM cannot be used as light from the light source efficiently.

Also, as shown in FIG. 30(B), when the positions of the images of the electrodes 111A and the reflected images 111AM are completely matched, the arc image D and the reflected arc image DM generated between the electrodes 111A are overlapped, thereby increasing plasma absorption.

Therefore, as shown in FIG. 30(C), the relative position where the images of the electrodes 111A and the reflected images 111AM are partly overlapped is determined to be the optimal amount of displacement and used as a criteria of determination of the position adjustment.

According to the present exemplary embodiment as described above, the following and other effects are achieved.

(29) Since the images of the electrodes 111A and the reflected images 111AM are picked up to adjust the position, it is not necessary to turn the light source lamp on to adjust the position, whereby the procedure may be simplified. In addition, since light is not emitted from the light source lamp, even when removing the light source unit from the manufacturing device, the respective portions of the manufacturing device, such as the retaining frame, are not heated and hence it can be removed quickly.

13 Thirteenth Exemplary Embodiment

Subsequently, a thirteenth exemplary embodiment will be described. In the description below, parts and members which have already been described are represented by the identical numerals and the description will be omitted or simplified.

According to the aforementioned twelfth exemplary embodiment, the images of the electrodes 111A and the reflected image 111AM of the electrodes 111A via the secondary reflecting mirror are picked up by the image pickup device. Based on the picked up images, the position of the secondary reflecting mirror, with respect to the light source lamp 11, is adjusted so that the optimal amount of displacement between the electrodes 111A and the reflected images 111AM is achieved.

The method of manufacturing the light source unit according to the thirteenth exemplary embodiment is different in that the position of the center O2 of light emission of the light emitting section 111 is obtained from the positions of the pair of electrodes and the position of the center O1 of the curvature of the spherical reflecting surface is obtained from the image of the reflecting surface of the secondary reflecting mirror. Based on these positions, the position of the secondary reflecting mirror, with respect to the light source lamp 11, is adjusted so that the optimal amount of displacement between the center O1 of the curvature of the reflecting surface 131 and the center O2 of light emission is achieved.

According to the present exemplary embodiment, as shown in FIG. 31(A), the curved shape of the spherical reflecting surface 131 of the secondary reflecting mirror 71 is figured out, and based on the curved shape, the center O1 of the curvature of the reflecting surface 131 and then the center O2 of light emission are obtained from the positions of the pair of electrodes 111A, which are disposed apart from each other.

The center O1 of the curvature of the reflecting surface 131 can be obtained by figuring out the inner cross-sectional shape of the secondary reflecting mirror 71 using the X-ray analysis unit or the like, and processing the image of the arcuate cross section of the reflecting surface 131. Alternatively, the center O1 of the curvature can be obtained using the depth of the focal point, which is obtained by picking up the image of the reflecting surface 131 by the image pickup device, such as CCD from the direction indicated by an arrow in FIG. 31(A).

The center O2 of light emission is determined by picking up the images of the pair of electrodes 111A by the image pickup devices, such as CCD and performing the image processing thereon, and then obtaining the mid point between the electrodes 111A as the center O2 of the light emission.

The same procedure as the manufacturing method in the eleventh exemplary embodiment can be used except that the center O1 of the curvature and the center O2 of light emission are to be obtained. However, instead of turning the light source lamp 11 on, detecting the amount of displacement between the arc image D and the reflected arc image DM, and determining whether or not the amount of displacement is the optimal amount of displacement between the center O1 of the curvature of the reflecting surface 131 and the center O2 of light emission, the determining whether or not the amount of displacement is optimal amount of displacement is performed without illuminating the light source lamp 11. The light source unit provided with other types of secondary reflecting mirror in the aforementioned exemplary embodiments may be manufactured in the same manufacturing method.

Figure 31:
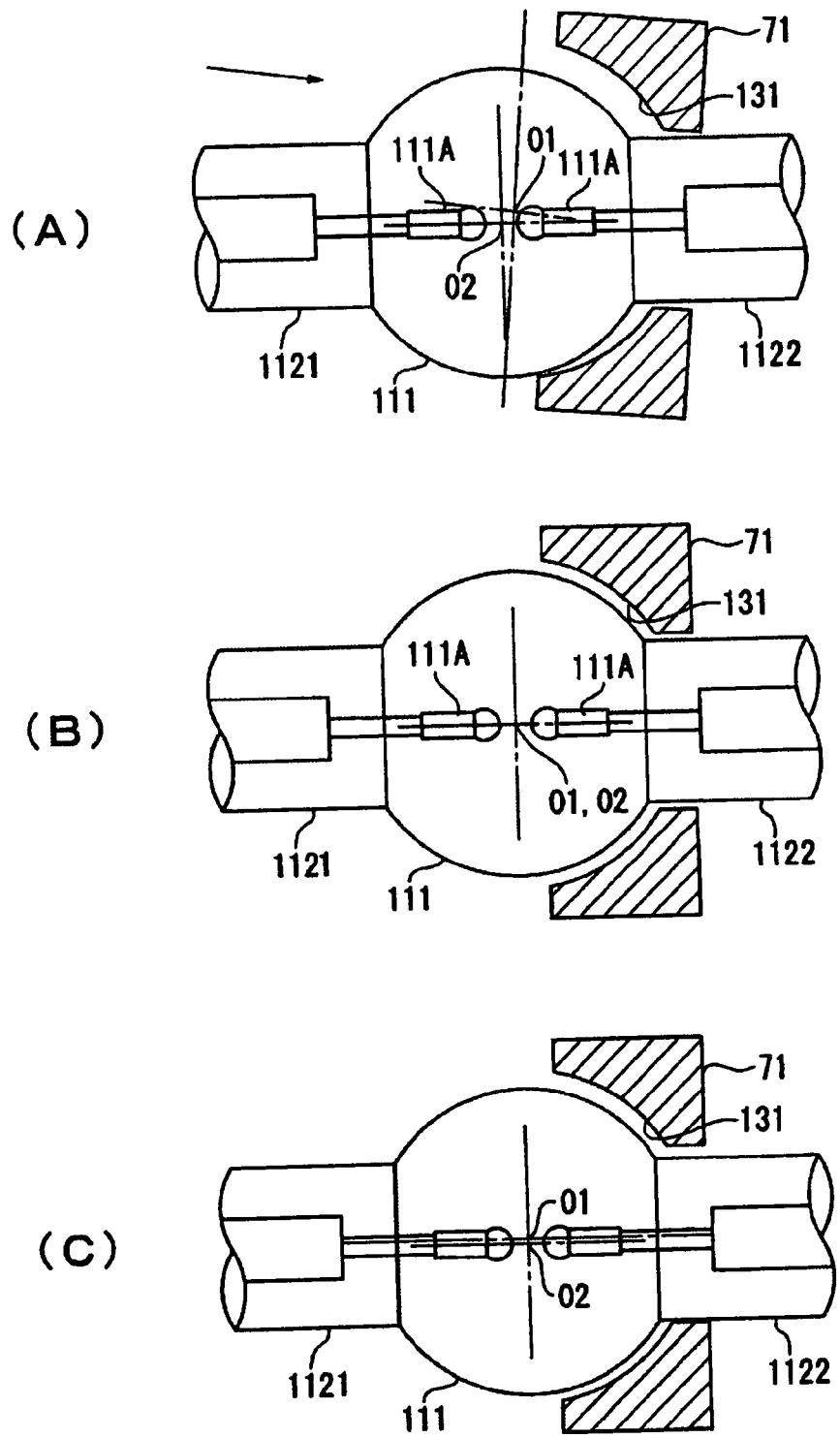
FIGS. 31(A)-31(C) are schematics showing a procedure of determination of the optimal value for the amount of displacement between the center of light emission and the center of curvature of the reflecting surface according to a method of manufacturing the light source unit according to a thirteenth exemplary embodiment of the present invention.

Determination whether or not the amount of displacement of the center position is optimal or not is based on an idea that when the center O1 of the curvature and the center O2 of light emission are too far, as shown in FIG. 31(A) the reflected arc image DM cannot be utilized efficiently as light from the light source because the arc image D and the reflected arc image DM are also too apart from each other. Also, as shown in FIG. 31 (B), if the center O1 of the curvature and the center O2 of light emission are completely matched, there arises a problem that the temperature increases due to plasma absorption. Therefore, as shown in FIG. 31(C), the relative position in which it is estimated that the center O1 of the curvature and the center O2 of light emission are slightly displaced and the arc image D and the reflected arc image DM are partly overlapped is determined to be the amount of deviation of the optimal displacement.

(30) According to the thirteenth exemplary embodiment, in the same manner as the third exemplary embodiment, the secondary reflecting mirror 71 can be adhered and fixed to the light emitting section 111 of the light source lamp 11 without turning the light source lamp on.

14 Modifications of Exemplary Embodiments

The present invention is not limited to the aforementioned exemplary embodiments, and the following modifications shown below are also included.

The proximal end surface of the secondary reflecting mirror 74 in the aforementioned exemplary embodiments may be formed into an inclined surface extending along the maximum angle θ formed between the proximal side of the illumination axis A in the direction of emission of the luminous flux and the luminous flux emitted from the light emitting section 111 and directly entering the elliptic reflector 12 as in the first exemplary embodiment described above.

The inclined surface or the proximal end surface of the secondary reflecting mirror 13, 71, 73-79, 81-85 of the aforementioned exemplary embodiment may be formed into an inclined surface having an angle of inclination larger than that formed between the inclined surface matching the angle θ and the proximal (rear) side of the illumination axis A in the direction of emission of the luminous flux in the same manner as the proximal end surface 745 of the secondary reflecting mirror 74 in the second exemplary embodiment.

The tapered surface 726C may be formed at the meeting point between the outer peripheral surface or the distal end surface of the secondary reflecting mirror 13, 73-77, 78, 79, 82-85 in the aforementioned exemplary embodiments in the same manner as the second exemplary embodiment described above.

The notched grooves 761 or the grooves 771 may be formed on the ridge at the meeting point between the outer peripheral surface or the distal end surface of the secondary reflecting mirror 13, 71, 73-75, 78, 79, 82-85 and the adhering surface in the aforementioned exemplary embodiments, as in the third exemplary embodiment described above.

Masking may be performed on the adhering surface, as in the fourth exemplary embodiment described above, when depositing the dielectric multi-layer film on the reflecting surface of the secondary reflecting mirror 13, 71, 73-77, 78, 79, 82-85 in the aforementioned exemplary embodiments so that the dielectric multi-layer film is prevented from being adhered on the adhering surface.

The adhering surface of the secondary reflecting mirror 13, 71, 73, 74, 76, 77, 79, 81, 85 in the aforementioned exemplary embodiment may be formed into a truncated conical shaped tapered surface gradually reducing in diameter from the outer peripheral surface or the distal end surface toward the reflecting surface as in the sixth exemplary embodiment described above.

The adhering surface of the secondary reflecting mirror 13, 71, 73-77, 79, 81, 83, 85 in the aforementioned exemplary embodiments may be formed with a shoulder having a surface continuing from the reflecting surface as in the seventh exemplary embodiment described above.

The adhering surface of the secondary reflecting mirror 13, 71, 73-76, 79, 81, 85 in the aforementioned exemplary embodiments may be formed into a truncated conical shaped tapered surface gradually reducing in diameter from the reflecting surface toward the outer peripheral surface or the distal end surface as in the eighth exemplary embodiment described above.

The adhering surface of the secondary reflecting mirror 13, 71, 73-78, 81-85 in the aforementioned exemplary embodiments may be machined to form concavity and convexity thereon, as in the ninth exemplary embodiment described above.

The outer peripheral surface and/or the distal end surface of the secondary reflecting mirror 13, 71, 73-79, 81-84 in the aforementioned exemplary embodiments may be mirror polished so that the adhering surface can be seen through, as in the tenth exemplary embodiment described above.

In the method of manufacturing the light source unit provided with the secondary reflecting mirror in the aforementioned first exemplary embodiment, the secondary reflecting mirror is fixed to the light source lamp 11 by applying the adhesive agent after the secondary reflecting mirror is adjusted to the optimal position. However, the present invention is not limited thereto, and it is also possible to employ a method of manufacturing a light source unit including applying the adhesive agent before adjusting the position of the secondary reflecting mirror and when the position of the secondary reflecting mirror is adjusted to the optimal position, curing the adhesive agent to fix the secondary reflecting mirror to the light source lamp 11, as in the case of the method of manufacturing the light source unit provided with the secondary reflecting mirror in the eleventh exemplary embodiment.

In the methods of manufacturing the light source unit provided with the secondary reflecting mirrors in the eleventh and thirteenth exemplary embodiments, the adhesive agent is applied before adjusting the position of the secondary reflecting mirror. Then after the secondary reflecting mirror is adjusted to the optimal position, the adhesive agent is cured to fix the secondary reflecting mirror to the light source lamp 11. However, the present invention is not limited thereto, and may employ the method of manufacturing the light source unit in which the adhesive agent is not applied before the position of the secondary reflecting mirror is adjusted and, after the secondary reflecting mirror is adjusted to the optimal position, the adhesive agent is applied to fix the secondary reflecting mirror to the light source lamp 11, in the same manner as the method of manufacturing the light source unit provided with the secondary reflecting mirror in the first exemplary embodiment.

Although only the example of the projector I using the three liquid crystal panels 42R, 42G, 42B is shown in the aforementioned exemplary embodiments, the present invention may be applied to a projector using only one liquid crystal panel, a projector using two liquid crystal panels, or a projector using four or more liquid crystal panels.

Although the liquid crystal panel, in which translucency on the light incoming surface is different from that on the light outgoing surface, is used in the aforementioned exemplary embodiments, a liquid crystal panel of reflecting type having the identical translucency on the light incoming surface and the light outgoing surface may be employed.

Although the liquid crystal panels 42R, 42G, 42B are employed as a light modulating unit in the aforementioned exemplary embodiments, the present invention is not limited thereto, and the present invention may be employed as the light source unit to illuminate a device which modulates light using a micro-mirror. In this case, the polarizing plates on the optical flux incoming side and the optical flux outgoing side may be omitted.

Although the light source unit of an exemplary aspect of the present invention is employed in the projector provided with the light modulating unit in the aforementioned exemplary embodiments, the present invention is not limited thereto. The light source unit of exemplary aspects of the present invention may be applied to other types of optical instruments.

Although only the example of a front-type projector which projects from the direction to view the screen is shown in the aforementioned exemplary embodiments, the present invention may be applied to a rear-type projector which projects in the opposite direction from the direction to view the screen.

The shapes of the secondary reflecting mirror describe in the aforementioned exemplary embodiments are simply examples. Other shapes are also possible as long as the contour thereof can be accommodated within the circular cone shown by lines connecting the second focal position of the elliptic reflector with the end of the sealed section of the arc tube.

Other detailed structures and shapes to implement the exemplary aspects of the present invention may also be employed.

An exemplary aspect of the present invention may be used not only for a projector, but also for other types of optical instrument.

What is claimed is:

1. A light source unit, comprising:
    an arc tube including a front side, electrodes, sealed sections and a light emitting section in which discharging emission is performed between the electrodes and the sealed sections which are provided at both ends of the light emitting section, the light emitting section having a front side and a rear side;
    an elliptic reflector including a reflecting surface to reflect a luminous flux radiated from the arc tube in a certain uniform direction; and
    a secondary reflecting mirror having a reflecting surface disposed so as to oppose the reflecting surface of the elliptic reflector, covering the front side of the light emitting section, and reflecting the luminous flux radiated from the light emitting section toward the elliptic reflector,
    the sealed sections being provided on the front side and the rear side of the light emitting section,
    the arc tube including a center of discharging emission disposed at a first focal position of the elliptic reflector,
    the secondary reflecting mirror being mounted on the front side sealed section of the arc tube as a separate member from the arc tube, and
    an outer peripheral surface of the secondary reflecting mirror being accommodated within a circular cone formed by a line connecting a second focal position of the elliptic reflector and a distal end of the front side sealed section of the arc tube;
    the secondary reflecting mirror having an adhering surface opposing to an outer peripheral surface of the front side sealed section of the arc tube, and being fixed to the arc tube by applying an adhesive agent between the outer peripheral surface of the front side sealed section and the adhering surface.

2. The light source unit according to claim 1, the secondary reflecting mirror covering the light emitting section so that an angle $\theta$ becomes 105° or below, where $\theta$ represents a maximum angle formed between a rear portion of a center axis of the luminous flux reflected by the elliptic reflector and the luminous flux emitted from the arc tube and directly entering the elliptic reflector.

3. The light source unit according to claim 1, a rear end surface of the secondary reflecting mirror being formed into an inclined surface such that an angle formed with respect to a rear portion of a center axis of the luminous flux reflected by the elliptic reflector is larger than an angle θ, where θ represents a maximum angle formed between the rear portion of the center axis of the luminous flux reflected by the elliptic reflector and the luminous flux emitted from the arc tube and directly entering the elliptic reflector.

4. The light source unit according to claim 1, the secondary reflecting mirror having an outer peripheral surface of a truncated conical shape which is tapered gradually toward a distal end of the front side sealed section.

5. The light source unit according to claim 4, an angle of inclination of the outer peripheral surface of the secondary reflecting mirror of a truncated conical shape with respect to a center axis of the luminous flux reflected by the elliptic reflector being substantially equal to, or larger than an angle of inclination of the line connecting the second focal position and the distal end of the front side sealed section with respect to a center axis of the luminous flux reflected by the elliptic reflector.

6. The light source unit according to claim 1, the reflecting surface of the secondary reflecting mirror having a spherical surface corresponding to an external shape of the light emitting section, and the outer peripheral surface of the secondary reflecting mirror being a spherical surface having a center of curvature positioned forward of a center of curvature of the reflecting surface on a center axis of the luminous flux reflected by the elliptic reflector.

7. The light source unit according to claim 1, the secondary reflecting mirror having a reflecting surface formed by polishing an inner surface of a cylindrical member into a curved surface according to an external shape of the light emitting section, and being formed with a reflecting film on the inner surface of the cylindrical member.

8. The light source unit according to claim 7, the secondary reflecting mirror being formed into a bowl shape obtained by polishing an outer peripheral portion of the cylindrical member so as to follow the curved polished portion on the inner surface of the cylindrical member.

9. The light source unit according to claim 7, the secondary reflecting mirror having an inclined surface, an angle of inclination with respect to a rear portion of a center axis of the luminous flux reflected by the elliptic reflector being larger than an angle θ when the secondary reflecting mirror is mounted to the front side sealed section of the arc tube, where θ represents a maximum angle formed between a rear portion of the center axis of the luminous flux reflected by the elliptic reflector and the luminous flux emitted from the arc tube and directly entering the elliptic reflector, and is formed by polishing an end surface of the cylindrical member on a side where the reflecting surface is polished.

10. The light source unit according to claim 1, the secondary reflecting mirror being formed by integrally press-molding the outer peripheral surface of the secondary reflecting mirror and an inner surface of the secondary reflecting mirror in a curved shape corresponding to an external surface of the light emitting section, and being formed with a neck portion extending toward the distal end of the front sealed section at a front end of the secondary reflecting mirror.

11. The light source unit according to claim 1, the secondary reflecting mirror being provided with translucency so that an adhering surface can be seen from an outer peripheral surface.

12. The light source unit according to claim 1, the adhesive surface is not coated with a reflecting film to form the reflecting surface of the secondary reflecting mirror.

13. The light source unit according to claim 1, the adhesive agent being applied entirely between the outer peripheral surface of the front side sealed section and the adhering surface.

14. The light source unit according to claim 1, the adhesive agent being applied intermittently between the outer peripheral surface of the front side sealed section and the adhering surface.

15. The light source unit according to claim 1, the adhering surface being formed into a tapered surface so as to gradually approach the outer peripheral surface of the front side sealed section from a side of the outer peripheral surface of the secondary reflecting mirror toward the reflecting surface thereof.

16. The light source unit according to claim 1, the adhering surface being formed into a tapered surface so as to gradually approach the outer peripheral surface of the front side sealed section from a side of the reflecting surface of the secondary reflecting mirror toward the side of the outer peripheral surface of the secondary reflecting mirror.

17. The light source unit according to claim 16, the angle of the tapered surface being set to the range between 1° and 10° inclusive with respect to an illumination axis of the luminous flux reflected by the elliptic reflector.

18. The light source unit according to claim 1, the adhering surface being formed with a shoulder projecting toward the front side sealed section, the shoulder includes a surface continuing from the reflecting surface of the secondary reflecting mirror.

19. The light source unit according to claim 1, the secondary reflecting mirror being formed with a chamfered portion at a meeting point between a rear end surface of the secondary reflecting mirror and the adhering surface.

20. The light source unit according to claim 1, the secondary reflecting mirror being formed with a plurality of grooves by notching a ridge formed at a meeting point between a rear end surface of the secondary reflecting mirror and the adhering surface.

21. The light source unit according to claim 1, the adhesive agent applied between the adhering surface of the secondary reflecting mirror and the outer peripheral surface of the front side sealed section being applied so as to be mounded on an outer peripheral surface of the secondary reflecting mirror.

22. A projector to form an optical image by modulating a luminous flux injected from a light source according to image information, and project it in an enlarged form, the light source unit according to claim 1 being provided.

23. The projector unit according to claim 22, the secondary reflecting mirror covering the light emitting section so that an angle θ becomes 105° or below, where θ represents a maximum angle formed between a rear portion of a center axis of the luminous flux reflected by the elliptic reflector and a luminous flux emitted from the arc tube and directly entering the elliptic reflector.

24. The projector unit according to claim 22, a rear end surface of the secondary reflecting mirror being formed into an inclined surface such that an angle formed with respect to a rear portion of a center axis of the luminous flux reflected by the elliptic reflector is larger than an angle θ, where θ represents a maximum angle formed between the rear portion of the center axis of the luminous flux reflected by the elliptic reflector and a luminous flux emitted from the arc tube and directly entering the elliptic reflector.

25. The projector unit according to claim 22, the secondary reflecting mirror having an outer peripheral surface of a truncated conical shape which is tapered gradually toward a distal end of the front side sealed section.

26. The projector unit according to claim 25, an angle of inclination of the outer peripheral surface of the secondary reflecting mirror having the truncated conical shape, with respect to a center axis of a luminous flux reflected by the elliptic reflector, being substantially equal to, or larger than, an angle of inclination of a line connecting the second focal position and a distal end of the front side sealed section, with respect to a center axis of the luminous flux reflected by the elliptic reflector.

27. The projector unit according to claim 22, the reflecting surface of the secondary reflecting mirror having a spherical surface corresponding to an external shape of the light emitting section, and the outer peripheral surface of the secondary reflecting mirror being a spherical surface having a center of curvature positioned forwardly of a center of curvature of the reflecting surface on a center axis of the luminous flux reflected by the elliptic reflector.

28. The projector unit according to claim 22, the secondary reflecting mirror having a reflecting surface formed by polishing the inner surface of a cylindrical member into a curved surface according to an external shape of the light emitting section, and being formed with a reflecting film on the inner surface of the cylindrical member.

29. The projector unit according to claim 28, the secondary reflecting mirror being formed into a bowl shape obtained by polishing the outer peripheral surface of the cylindrical member so as to follow the curved polished portion on the inner surface of the cylindrical member.

30. The projector unit according to claim 28, the secondary reflecting mirror including an inclined surface, an angle of inclination with respect to a rear portion of a center axis of the luminous flux reflected by the elliptic reflector being larger than an angle $\theta$ when the secondary reflecting mirror is mounted to the front side sealed section of the arc tube, where $\theta$ represents a maximum angle formed between the rear portion of the center axis of the luminous flux reflected by the elliptic reflector and a luminous flux emitted from the arc tube and directly entering the elliptic reflector, and being formed by polishing an end surface of the cylindrical member on the side where the reflecting surface is polished.

31. The projector unit according to claim 22, the secondary reflecting mirror being formed by integrally press-molding the outer peripheral portion and an inner surface in a curved shape corresponding to an external shape of the light emitting section, and being formed with a neck portion extending toward the distal end of the front side sealed section at a front end of the secondary reflecting mirror.

32. The projector unit according to claim 22, the secondary reflecting mirror being provided with translucency so that an adhering surface can be seen from the outer peripheral surface.

33. The projector unit according to claim 22, the adhesive surface is not coated with a reflecting film to form the reflecting surface of the secondary reflecting mirror.

34. The projector unit according to claim 22, the adhesive agent being applied entirely between the outer peripheral surface of the front side sealed section and the adhering surface.

35. The projector unit according to claim 22, the adhesive agent being applied intermittently between the outer peripheral surface of the front side sealed section and the adhering surface.

36. The projector unit according to claim 22, the adhering surface being formed into a tapered surface so as to gradually approach the outer peripheral surface of the front side sealed section from a side of the outer peripheral surface of the secondary reflecting mirror toward the reflecting surface of the secondary reflecting surface.

37. The projector unit according to claim 22, the adhering surface being formed into a tapered surface so as to gradually approach the outer peripheral surface of the front side sealed section from a side of the reflecting surface of the secondary reflecting mirror toward the side of the outer peripheral surface of the secondary reflecting mirror.

38. The projector unit according to claim 37, an angle of the tapered surface being set to the range between 1° and 10° inclusive with respect to an illumination axis of the luminous flux reflected by the elliptic reflector.

39. The projector unit according to claim 22, the adhering surface being formed with a shoulder projecting toward the front side sealed section, the shoulder includes a surface continuing from the reflecting surface of the secondary reflecting mirror.

40. The projector unit according to claim 22, the secondary reflecting mirror being formed with a chamfered portion at a meeting point between a rear end surface of the secondary reflecting mirror and the adhering surface.

41. The projector unit according to claim 22, the secondary reflecting mirror being formed with a plurality of grooves formed by notching a ridge formed at a meeting point between a rear end surface of the secondary reflecting mirror and the adhering surface.

42. A projector unit according to claim 22, the adhesive agent applied between the adhering surface of the secondary reflecting mirror and the outer peripheral surface of the front side sealed section being applied so as to be mounded on an outer peripheral surface of the secondary reflecting mirror.

43. A projector to form an optical image by modulating a luminous flux injected from a light source according to image information, and project it in an enlarged form, the light source unit comprising:
   an arc tube including a front side, electrodes, sealed sections and a light emitting section in which discharging emission is performed between the electrodes and the sealed sections which are provided at both ends of the light emitting section, the light emitting section having a front side and a rear side;
   an elliptic reflector including a reflecting surface to reflect a luminous flux radiated from the arc tube in a certain uniform direction; and
   a secondary reflecting mirror having a reflecting surface disposed so as to oppose the reflecting surface of the elliptic reflector, covering the front side of the light emitting section, and reflecting the luminous flux radiated from the light emitting section toward the elliptic reflector,
   the sealed sections being provided on the front side and the rear side of the light emitting section,
   the arc tube including a center of discharging emission disposed at a first focal position of the elliptic reflector,
   the secondary reflecting mirror being mounted on the front side sealed section of the arc tube as a separate member from the arc tube, and
   an outer peripheral surface of the secondary reflecting mirror being accommodated within a circular cone formed by a line connecting a second focal position of the elliptic reflector and a distal end of the front side sealed section of the arc tube.

44. The projector unit according to claim 43, the secondary reflecting mirror covering the light emitting section so that an angle $\theta$ becomes 105° or below, where $\theta$ represents a maximum angle formed between a rear portion of a center axis of the luminous flux reflected by the elliptic reflector and a luminous flux emitted from the arc tube and directly entering the elliptic reflector.

45. The projector unit according to claim 43, a rear end surface of the secondary reflecting mirror being formed into an inclined surface such that an angle formed with respect to a rear portion of a center axis of the luminous flux reflected by the elliptic reflector is larger than an angle θ, where θ represents a maximum angle formed between the rear portion of the center axis of the luminous flux reflected by the elliptic reflector and a luminous flux emitted from the arc tube and directly entering the elliptic reflector.

46. The projector unit according to claim 43, the secondary reflecting mirror having an outer peripheral surface of a truncated conical shape which is tapered gradually toward a distal end of the front side sealed section.

47. The projector unit according to claim 46, an angle of inclination of the outer peripheral surface of the secondary reflecting mirror having the truncated conical shape, with respect to a center axis of a luminous flux reflected by the elliptic reflector, being substantially equal to, or larger than, an angle of inclination of a line connecting the second focal position and a distal end of the front side sealed section, with respect to a center axis of the luminous flux reflected by the elliptic reflector.

48. The projector unit according to claim 43, the reflecting surface of the secondary reflecting mirror having a spherical surface corresponding to an external shape of the light emitting section, and the outer peripheral surface of the secondary reflecting mirror being a spherical surface having a center of curvature positioned forwardly of a center of curvature of the reflecting surface on a center axis of the luminous flux reflected by the elliptic reflector.

49. The projector unit according to claim 43, the secondary reflecting mirror having a reflecting surface formed by polishing the inner surface of a cylindrical member into a curved surface according to an external shape of the light emitting section, and being formed with a reflecting film on the inner surface of the cylindrical member.

50. The projector unit according to claim 49, the secondary reflecting mirror being formed into a bowl shape obtained by polishing the outer peripheral surface of the cylindrical member so as to follow the curved polished portion on the inner surface of the cylindrical member.

51. The projector unit according to claim 49, the secondary reflecting mirror including an inclined surface, an angle of inclination with respect to a rear portion of a center axis of the luminous flux reflected by the elliptic reflector being larger than an angle θ when the secondary reflecting mirror is mounted to the front side sealed section of the arc tube, where θ represents a maximum angle formed between the rear portion of the center axis of the luminous flux reflected by the elliptic reflector and a luminous flux emitted from the arc tube and directly entering the elliptic reflector, and being formed by polishing an end surface of the cylindrical member on the side where the reflecting surface is polished.

52. The projector unit according to claim 43, the secondary reflecting mirror being formed by integrally press-molding the outer peripheral portion and an inner surface in a curved shape corresponding to an external shape of the light emitting section, and being formed with a neck portion extending toward the distal end of the front side sealed section at a front end of the secondary reflecting mirror.

53. The projector unit according to claim 43, the secondary reflecting mirror being provided with translucency so that an adhering surface can be seen from the outer peripheral surface.

54. The projector unit according to claim 43, the secondary reflecting mirror having an adhering surface opposing to an outer peripheral surface of the front side sealed section of the arc tube, and being fixed to the arc tube by applying an adhesive agent between the outer peripheral surface of the front side sealed section and the adhering surface.

55. The projector unit according to claim 54, the adhesive surface is not coated with a reflecting film to form the reflecting surface of the secondary reflecting mirror.

56. The projector unit according to claim 54, the adhesive agent being applied entirely between the outer peripheral surface of the front side sealed section and the adhering surface.

57. The projector unit according to claim 54, the adhesive agent being applied intermittently between the outer peripheral surface of the front side sealed section and the adhering surface.

58. The projector unit according to claim 54, the adhering surface being formed into a tapered surface so as to gradually approach the outer peripheral surface of the front side sealed section from a side of the outer peripheral surface of the secondary reflecting mirror toward the reflecting surface of the secondary reflecting surface.

59. The projector unit according to claim 54, the adhering surface being formed into a tapered surface so as to gradually approach the outer peripheral surface of the front side sealed section from a side of the reflecting surface of the secondary reflecting mirror toward the side of the outer peripheral surface of the secondary reflecting mirror.

60. The projector unit according to claim 59, an angle of the tapered surface being set to the range between 1° and 10° inclusive with respect to an illumination axis of the luminous flux reflected by the elliptic reflector.

61. The projector unit according to claim 54, the adhering surface being formed with a shoulder projecting toward the front side sealed section, the shoulder includes a surface continuing from the reflecting surface of the secondary reflecting mirror.

62. The projector unit according to claim 54, the secondary reflecting mirror being formed with a chamfered portion at a meeting point between a rear end surface of the secondary reflecting mirror and the adhering surface.

63. The projector unit according to claim 54, the secondary reflecting mirror being formed with a plurality of grooves formed by notching a ridge formed at a meeting point between a rear end surface of the secondary reflecting mirror and the adhering surface.

64. A projector unit according to claim 54, the adhesive agent applied between the adhering surface of the secondary reflecting mirror and the outer peripheral surface of the front side sealed section being applied so as to be mounded on an outer peripheral surface of the secondary reflecting mirror.

\* \* \* \* \*